(12) United States Patent
Forstall et al.

(10) Patent No.: US 8,014,760 B2
(45) Date of Patent: Sep. 6, 2011

(54) MISSED TELEPHONE CALL MANAGEMENT FOR A PORTABLE MULTIFUNCTION DEVICE

(75) Inventors: Scott Forstall, Mountain View, CA (US); Greg Christie, San Jose, CA (US); Scott Herz, Santa Clara, CA (US); Imran Chaudhri, San Francisco, CA (US); Michael Matas, Palo Alto, CA (US); Marcel Van Os, San Francisco, CA (US); Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 766 days.

(21) Appl. No.: 11/769,694

(22) Filed: Jun. 27, 2007

(65) Prior Publication Data

US 2008/0057926 A1 Mar. 6, 2008

Related U.S. Application Data

(60) Provisional application No. 60/879,469, filed on Jan. 8, 2007, provisional application No. 60/879,253, filed on Jan. 7, 2007, provisional application No. 60/883,782, filed on Jan. 6, 2007, provisional application No. 60/824,769, filed on Sep. 6, 2006.

(51) Int. Cl.
*H04M 1/725* (2006.01)
*H04M 1/56* (2006.01)
*H04M 3/42* (2006.01)
*H04M 3/00* (2006.01)

(52) U.S. Cl. ........... 455/412.2; 379/142.01; 379/201.01; 379/418

(58) Field of Classification Search ................ 455/412.2; 379/142.01, 201.01, 418
See application file for complete search history.

(56) References Cited

U.S. PATENT DOCUMENTS

| 5,619,555 | A | 4/1997 | Fenton et al. ................. 379/67 |
| 5,627,567 | A | 5/1997 | Davidson ..................... 345/173 |
| 5,633,912 | A | 5/1997 | Tsoi .............................. 379/58 |
| 5,644,628 | A | 7/1997 | Schwarzer et al. ........ 379/93.19 |

(Continued)

FOREIGN PATENT DOCUMENTS

DE 199 83 569 10/2001

(Continued)

OTHER PUBLICATIONS

International Search Report and Written Opinion for International Application No. PCT/US2007/077307, mailed Jul. 22, 2008.

(Continued)

*Primary Examiner* — Marivelisse Santiago Cordero
(74) *Attorney, Agent, or Firm* — Morgan, Lewis & Bockius LLP

(57) ABSTRACT

In one aspect of the invention, a computer-implemented method is disclosed for use in conjunction with a portable electronic device with a touch screen display. A list of items comprising missed telephone calls is displayed. Upon detecting user selection of an item in the list, contact information is displayed for a respective caller corresponding to the user selected item. The displayed contact information includes a plurality of contact objects that include a first contact object, comprising a telephone number object having a first telephone number associated with the missed telephone call, and a second contact object. Upon detecting user selection of the second contact object, a communication with the respective caller is initiated via a modality corresponding to the second contact object.

22 Claims, 64 Drawing Sheets

U.S. PATENT DOCUMENTS

| | | | |
|---|---|---|---|
| 5,701,340 A | 12/1997 | Zwick | 379/204 |
| 6,047,054 A | 4/2000 | Bayless et al. | 379/202 |
| 6,070,068 A | 5/2000 | Sudo | 455/414 |
| 6,088,696 A | 7/2000 | Moon et al. | 707/10 |
| 6,236,854 B1 | 5/2001 | Bradshaw, Jr. | 455/416 |
| 6,259,436 B1 | 7/2001 | Moon et al. | 345/173 |
| 6,269,159 B1 | 7/2001 | Cannon et al. | 379/202 |
| 6,298,045 B1 | 10/2001 | Pang et al. | 370/261 |
| 6,392,999 B1 | 5/2002 | Liu et al. | 370/260 |
| 6,396,531 B1 | 5/2002 | Gerszberg et al. | 348/14.01 |
| 6,424,711 B1 | 7/2002 | Bayless et al. | 379/355.09 |
| 6,430,284 B1 | 8/2002 | Jones | 379/229 |
| 6,505,040 B1 | 1/2003 | Kim | 455/416 |
| 6,516,202 B1 | 2/2003 | Hawkins et al. | 455/556 |
| 6,535,730 B1 | 3/2003 | Chow et al. | 455/416 |
| 6,538,806 B2 | 3/2003 | Endo et al. | 348/14.08 |
| 6,577,721 B1 | 6/2003 | Vainio et al. | 379/202.01 |
| 6,593,949 B1* | 7/2003 | Chew et al. | 715/841 |
| 6,768,722 B1 | 7/2004 | Katseff et al. | 370/260 |
| 6,839,417 B2 | 1/2005 | Weisman et al. | 379/204.01 |
| 7,007,239 B1 | 2/2006 | Hawkins et al. | 715/780 |
| 7,031,728 B2 | 4/2006 | Beyer, Jr. | 455/456.3 |
| 7,050,557 B2 | 5/2006 | Creamer et al. | 379/205.01 |
| 7,184,428 B1 | 2/2007 | Gerszberg et al. | 370/352 |
| 7,185,058 B2 | 2/2007 | Blackwell et al. | 709/206 |
| 7,231,208 B2 | 6/2007 | Robertson et al. | 455/416 |
| 7,251,479 B2* | 7/2007 | Holder et al. | 455/412.2 |
| 7,289,614 B1* | 10/2007 | Twerdahl et al. | 379/142.01 |
| 7,295,852 B1 | 11/2007 | Davis et al. | 455/518 |
| 7,680,513 B2* | 3/2010 | Haitani et al. | 455/556.2 |
| 7,685,530 B2* | 3/2010 | Sherrard et al. | 715/764 |
| 7,720,218 B2 | 5/2010 | Abramson et al. | 379/428.03 |
| 2001/0049283 A1 | 12/2001 | Thomas | 455/426 |
| 2002/0045438 A1 | 4/2002 | Tagawa et al. | 455/412 |
| 2002/0073207 A1 | 6/2002 | Widger et al. | 709/207 |
| 2002/0077158 A1 | 6/2002 | Scott | 455/567 |
| 2002/0093531 A1 | 7/2002 | Barile | 345/753 |
| 2002/0128036 A1 | 9/2002 | Yach et al. | 455/552 |
| 2003/0073430 A1 | 4/2003 | Robertson et al. | 455/416 |
| 2003/0138080 A1 | 7/2003 | Nelson et al. | 379/88.16 |
| 2003/0142138 A1 | 7/2003 | Brown et al. | 345/797 |
| 2003/0142200 A1 | 7/2003 | Canova, Jr. et al. | 348/14.08 |
| 2003/0198329 A1 | 10/2003 | McGee | 379/202.01 |
| 2004/0047461 A1 | 3/2004 | Weisman et al. | 379/202.01 |
| 2004/0203674 A1 | 10/2004 | Shi et al. | 455/415 |
| 2005/0015495 A1 | 1/2005 | Florkey et al. | 709/227 |
| 2005/0048958 A1 | 3/2005 | Mousseau et al. | 455/415 |
| 2005/0074107 A1 | 4/2005 | Renner et al. | 379/202.01 |
| 2005/0078613 A1 | 4/2005 | Covell et al. | 370/260 |
| 2005/0094792 A1 | 5/2005 | Berthoud et al. | 379/202.01 |
| 2005/0101308 A1 | 5/2005 | Lee | 455/416 |
| 2005/0123116 A1 | 6/2005 | Gau | 379/202.01 |
| 2005/0157174 A1 | 7/2005 | Kitamura et al. | 348/207.99 |
| 2005/0286693 A1 | 12/2005 | Brown et al. | 379/114.28 |
| 2006/0002536 A1* | 1/2006 | Ambrose | 379/201.01 |
| 2006/0015819 A1 | 1/2006 | Hawkins et al. | 715/780 |
| 2006/0030369 A1 | 2/2006 | Yang | 455/566 |
| 2006/0035632 A1 | 2/2006 | Sorvari et al. | 455/418 |
| 2006/0063539 A1 | 3/2006 | Beyer, Jr. | 455/456.3 |
| 2006/0121925 A1 | 6/2006 | Jung | 455/518 |
| 2006/0132595 A1 | 6/2006 | Kenoyer et al. | 348/14.08 |
| 2006/0168539 A1 | 7/2006 | Hawkins et al. | 715/780 |
| 2006/0178137 A1 | 8/2006 | Loveland | 455/414.1 |
| 2006/0199612 A1 | 9/2006 | Beyer, Jr. et al. | 455/556.2 |
| 2006/0205432 A1 | 9/2006 | Hawkins et al. | 455/552.1 |
| 2006/0222168 A1 | 10/2006 | Curley | 379/267 |
| 2006/0264205 A1 | 11/2006 | Gibbs | 455/413 |
| 2006/0281449 A1* | 12/2006 | Kun et al. | 455/418 |
| 2007/0082697 A1 | 4/2007 | Bumiller et al. | 455/552.1 |
| 2007/0091830 A1 | 4/2007 | Coulas et al. | 370/260 |
| 2007/0111743 A1 | 5/2007 | Leigh et al. | 455/518 |
| 2007/0115919 A1 | 5/2007 | Chahal et al. | 370/352 |
| 2007/0116226 A1 | 5/2007 | Bennett et al. | 379/202.01 |
| 2007/0117508 A1 | 5/2007 | Jachner | 455/3.06 |
| 2007/0123239 A1 | 5/2007 | Leigh | 455/416 |
| 2007/0123320 A1 | 5/2007 | Han et al. | 455/575.1 |
| 2007/0133771 A1* | 6/2007 | Stifelman et al. | 379/142.01 |
| 2007/0149188 A1 | 6/2007 | Miyashita et al. | 455/426.1 |
| 2009/0280868 A1 | 11/2009 | Hawkins et al. | 455/566 |
| 2010/0273466 A1 | 10/2010 | Robertson et al. | 455/416 |

FOREIGN PATENT DOCUMENTS

| | | |
|---|---|---|
| EP | 0 804 009 A2 | 10/1997 |
| EP | 0 804 009 A3 | 10/1997 |
| EP | 0 859 498 A2 | 8/1998 |
| EP | 1 069 791 A1 | 1/2001 |
| EP | 1 621 983 A2 | 2/2006 |
| EP | 1 635 543 A1 | 3/2006 |
| EP | 1 763 243 A2 | 3/2007 |
| GB | 2 338 141 A | 12/1999 |
| WO | WO 97/08879 | 3/1997 |
| WO | WO 98/30002 A2 | 7/1998 |
| WO | WO 98/48551 A2 | 10/1998 |
| WO | WO 99/16181 | 4/1999 |
| WO | WO 00/16186 | 3/2000 |
| WO | WO 00/38042 A1 | 6/2000 |
| WO | WO 02/32088 A2 | 4/2002 |
| WO | WO 03/060622 A2 | 7/2003 |
| WO | WO 03/060622 A3 | 7/2003 |
| WO | WO 2004/031902 A2 | 4/2004 |
| WO | WO 2005/053279 A1 | 6/2005 |
| WO | WO 2006/070228 A2 | 7/2006 |

OTHER PUBLICATIONS

Invitation to Pay Additional Fees for International Application PCT/US2007/077307, mailed Mar. 6, 2008.

Coolsmartphone, "Orange SPV C600 Review," http://www.coolsmartphone.com/article569.html, Apr. 14, 2006, 58 pages.

Pocket PC Phone User Manual, Microsoft Corporation, Audiovox PPC 5050, pp. 1 & 48-50, http://www.cellphones.ca/cell-phones/audiovox-ppc-5050/.

International Search Report and Written Opinion for International Application PCT/US2007/077436, mailed Jan. 28, 2008.

Office Action dated Aug. 13, 2009, received in the European Patent Application which corresponds to U.S. Appl. No. 11/769,695 (related).

Office Action dated Oct. 9, 2009, received in Australian Patent Application No. 2009100723.

Office Action dated Oct. 5, 2009, received in Australian Patent Application No. 2009100722.

Office Action dated Feb. 19, 2010, received in Australian Patent Application No. 2008203349, which corresponds to U.S. Appl. No. 11/769,695.

Office Action dated May 25, 2010, received in European Application No. 07 841 759.9, which corresponds to U.S. Appl. No. 11/769,695.

Office Action dated Sep. 3, 2010, received in U.S. Appl. No. 11/769,695.

iChat AV, "Videoconferencing For the Rest of Us," Apr. 13, 2006, 3 pages, http://www.apple.com/macosx/features/ichat.html.

Nokia-Enhancements, "Nokia Video Call Stand PT-8," Apr. 13, 2006, two pages, http://www.nokia.com.au/nokia/0,,60572,00.html.

Nokia-Phone Features, "Nokia 6630 Imaging Smartphone," printed Apr. 13, 2006, 5 pages, http://europe.nokia.com/nokia/0,8764,58711,00.html.

International Search Report and Written Opinion dated Apr. 15, 2008, received in International Application PCT/US2007/080971, which corresponds to U.S. Appl. No. 11/553,429.

International Search Report and Written Opinion dated May 21, 2008, for International Application No. PCT/US2007/088884, which corresponds to U.S. Appl. No. 11/960,673.

Office Action dated Jun. 21, 2010, received in U.S. Appl. No. 11/553,429.

Office Action dated Oct. 6, 2010, received in U.S. Appl. No. 11/553,429.

Notice of Allowance dated Feb. 14, 2011, received in U.S. Appl. No. 11/553,429.

Notice of Allowance dated Apr. 4, 2011, received in U.S. Appl. No. 11/553,429.

Final Office Action dated Jan. 21, 2011, received in U.S. Appl. No. 11/769,695.

Office Action dated Sep. 14, 2010, received in German Patent Application No. 11 2007 001 109.2, which comes sonds to U.S. Appl. No. 11/769,695.

Office Action dated Oct. 28, 2010, received in U.S. Appl. No. 11/960,673.

Notice of Allowance dated Mar. 31, 2011, received in U.S. Appl. No. 11/960,673.

* cited by examiner

MISSED TELEPHONE CALL MANAGEMENT FOR A PORTABLE MULTIFUNCTION DEVICE

RELATED APPLICATIONS

This application claims priority to: (A) U.S. Provisional Patent Application No. 60/879,469, filed Jan. 8, 2007, entitled "Portable Multifunction Device"; (B) U.S. Provisional Patent Application No. 60/879,253, filed Jan. 7, 2007, entitled "Portable Multifunction Device"; (C) U.S. Provisional Patent Application No. 60/883,782, filed Jan. 6, 2007, entitled "Telephone Call Management for a Portable Multifunction Device"; and (D) U.S. Provisional Patent Application No. 60/824,769, filed Sep. 6, 2006, entitled "Portable Multifunction Device." All of these applications are incorporated by referenced herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to portable devices that are capable of performing multiple communication functions including telephony.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

In particular, user interfaces for managing missed telephone calls and prior telephone calls may be frustrating to users. Multiple key sequences and complex menu hierarchies may prevent a user from being able to respond to a missed call easily or to access information about prior calls easily.

Accordingly, there is a need for portable multifunction devices with more transparent and intuitive user interfaces for managing missed telephone calls and prior telephone calls that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

A computer-implemented method is disclosed for use in conjunction with a portable electronic device with a touch screen display. A list of items comprising missed telephone calls is displayed. Upon detecting user selection of an item in the list, contact information is displayed for a respective caller corresponding to the user selected item. The displayed contact information includes a plurality of contact objects that include a first contact object, comprising a telephone number object having a first telephone number associated with the missed telephone call, and a second contact object. Upon detecting user selection of the second contact object, a communication with the respective caller is initiated via a modality corresponding to the second contact object.

A computer-implemented method is disclosed for use in conjunction with a portable electronic device with a touch screen display. A list of items comprising missed telephone calls is displayed. Upon detecting finger contact with a first portion of a user selected item in the list, a return telephone call is initiated to a return telephone number associated with the user selected item. Upon detecting finger contact with a second portion of the respective item in the list, contact information is displayed for a respective caller associated with the user selected item. The displayed contact information includes a plurality of contact objects that include a first contact object, comprising a telephone number object having the return telephone number, and a second contact object. Upon detecting user selection of the second contact object, a communication is initiated with the respective caller via a modality corresponding to the second contact object.

A computer-implemented method is disclosed for use in conjunction with a portable electronic device with a touch screen display. Missed telephone call information is displayed, including a list of items, wherein at least one of the items corresponds to a plurality of missed telephone calls from a respective caller.

A computer-implemented method is disclosed for use in conjunction with a portable electronic device with a touch screen display with a plurality of user interface objects. Telephone call information is displayed, including a list of items, wherein at least one of the items corresponds to a plurality of telephone calls with a respective caller. A scrolling gesture is detected comprising substantially vertical movement of a user contact with the touch screen display. In response to the scrolling gesture, the display of telephone call information is scrolled.

A computer-implemented method is disclosed for use in conjunction with a portable electronic device with a touch screen display with a plurality of user interface objects. A list of items for prior telephone calls is displayed. Upon detecting finger contact with a first portion of a user selected item in the list, a telephone call is initiated to a primary telephone number associated with the user selected item. Upon detecting finger contact with a second portion of the respective item in the list, contact information is displayed for a respective caller associated with the user selected item. The displayed contact information includes a plurality of contact objects that include a first contact object, comprising a telephone number object having the primary telephone number, and a second contact object. Upon detecting user selection of the second contact object, a communication is initiated with the respective caller via a modality corresponding to the second contact object.

A computer program product for use in conjunction with a portable electronic device with a touch screen display with a plurality of user interface objects is disclosed. The computer program product comprises a computer readable storage medium and a computer program mechanism embedded therein. The computer program mechanism comprises instructions for displaying a list of items for missed telephone calls. The computer program mechanism also comprises instructions for displaying, upon detecting user selection of an item in the list, contact information for a respective caller corresponding to the user selected item. The displayed contact information includes a plurality of contact objects that include a first contact object, comprising a telephone number object having a first telephone number associated with the missed telephone call, and a second contact object. The computer program mechanism further comprises instructions for initiating, upon detecting user selection of the second contact object, a communication with the respective caller via a modality corresponding to the second contact object.

A computer program product for use in conjunction with a portable electronic device with a touch screen display with a plurality of user interface objects is disclosed. The computer program product comprises a computer readable storage medium and a computer program mechanism embedded therein. The computer program mechanism comprises instructions for displaying a list of items for missed telephone calls and instructions for initiating, upon detecting finger contact with a first portion of a user selected item in the list, a return telephone call to a return telephone number associated with the user selected item. The computer program mechanism also comprises instructions for displaying, upon detecting finger contact with a second portion of the respective item in the list, contact information for a respective caller associated with the user selected item. The displayed contact information includes a plurality of contact objects that include a first contact object, comprising a telephone number object having the return telephone number, and a second contact object. The computer program mechanism further comprises instructions for initiating, upon detecting user selection of the second contact object, a communication with the respective caller via a modality corresponding to the second contact object.

A computer program product for use in conjunction with a portable electronic device with a touch screen display with a plurality of user interface objects is disclosed. The computer program product comprises a computer readable storage medium and a computer program mechanism embedded therein. The computer program mechanism comprises instructions for displaying missed telephone call information, including a list of items, wherein at least one of the items corresponds to a plurality of missed telephone calls from a respective caller.

A computer program product for use in conjunction with a portable electronic device with a touch screen display with a plurality of user interface objects is disclosed. The computer program product comprises a computer readable storage medium and a computer program mechanism embedded therein. The computer program mechanism comprises instructions for displaying telephone call information, including a list of items, wherein at least one of the items corresponds to a plurality of telephone calls with a respective caller. The computer program mechanism also comprises instructions for detecting a scrolling gesture comprising substantially vertical movement of user contact with the touch screen display and instructions for responding to the scrolling gesture by scrolling the display of telephone call information.

A computer program product for use in conjunction with a portable electronic device with a touch screen display with a plurality of user interface objects is disclosed. The computer program product comprises a computer readable storage medium and a computer program mechanism embedded therein. The computer program mechanism comprises instructions for displaying a list of items for prior telephone calls and instructions for initiating, upon detecting finger contact with a first portion of a user selected item in the list, a telephone call to a primary telephone number associated with the user selected item. The computer program mechanism also comprises instructions for displaying, upon detecting finger contact with a second portion of the respective item in the list, contact information for a respective caller associated with the user selected item. The displayed contact information includes a plurality of contact objects that include a first contact object, comprising a telephone number object having the primary telephone number, and a second contact object. The computer program mechanism further comprises instructions for initiating, upon detecting user selection of the second contact object, a communication with the respective caller via a modality corresponding to the second contact object.

A portable electronic device with a touch screen display with a plurality of user interface objects is disclosed, comprising memory, one or more processors, and one or more programs stored in the memory and configured for execution by the one or more processors. The one or more programs include instructions for displaying a list of items for missed telephone calls and instructions for displaying, upon detecting user selection of an item in the list, contact information for a respective caller corresponding to the user selected item. The displayed contact information includes a plurality of contact objects that include a first contact object, comprising a telephone number object having a first telephone number associated with the missed telephone call, and a second contact object. The one or more programs also include instructions for initiating, upon detecting user selection of the second contact object, a communication with the respective caller via a modality corresponding to the second contact object.

A portable electronic device with a touch screen display with a plurality of user interface objects is disclosed, comprising memory, one or more processors, and one or more programs stored in the memory and configured for execution by the one or more processors. The one or more programs include instructions for displaying a list of items for missed telephone calls and instructions for initiating, upon detecting finger contact with a first portion of a user selected item in the list, a return telephone call to a return telephone number associated with the user selected item. The one or more programs also include instructions for displaying, upon detecting finger contact with a second portion of the respective item in the list, contact information for a respective caller associated with the user selected item. The displayed contact information includes a plurality of contact objects that include a first contact object, comprising a telephone number object having the return telephone number, and a second contact object. The one or more programs further include instructions for initiating, upon detecting user selection of the second contact object, a communication with the respective caller via a modality corresponding to the second contact object.

A portable electronic device with a touch screen display with a plurality of user interface objects is disclosed, comprising memory, one or more processors, and one or more programs stored in the memory and configured for execution by the one or more processors. The one or more programs include instructions for displaying missed telephone call information, including a list of items, wherein at least one of the items corresponds to a plurality of missed telephone calls from a respective caller.

A portable electronic device with a touch screen display with a plurality of user interface objects is disclosed, comprising memory, one or more processors, and one or more programs stored in the memory and configured for execution by the one or more processors. The one or more programs include instructions for displaying telephone call information, including a list of items, wherein at least one of the items corresponds to a plurality of telephone calls with a respective caller. The one or more programs also include instructions for detecting a scrolling gesture comprising substantially vertical movement of user contact with the touch screen display and instructions for responding to the scrolling gesture by scrolling the display of telephone call information.

A portable electronic device with a touch screen display with a plurality of user interface objects is disclosed, comprising memory, one or more processors, and one or more programs stored in the memory and configured for execution by the one or more processors. The one or more programs include instructions for displaying a list of items for prior telephone calls and instructions for initiating, upon detecting finger contact with a first portion of a user selected item in the list, a telephone call to a primary telephone number associated with the user selected item. The one or more programs also include instructions for displaying, upon detecting finger contact with a second portion of the respective item in the list, contact information for a respective caller associated with the user selected item. The displayed contact information includes a plurality of contact objects that include a first contact object, comprising a telephone number object having the primary telephone number, and a second contact object. The one or more programs further include instructions for initiating, upon detecting user selection of the second contact object, a communication with the respective caller via a modality corresponding to the second contact object.

The disclosed embodiments provide more transparent and intuitive user interfaces for managing missed telephone calls and prior telephone calls, thereby reducing user frustrations.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
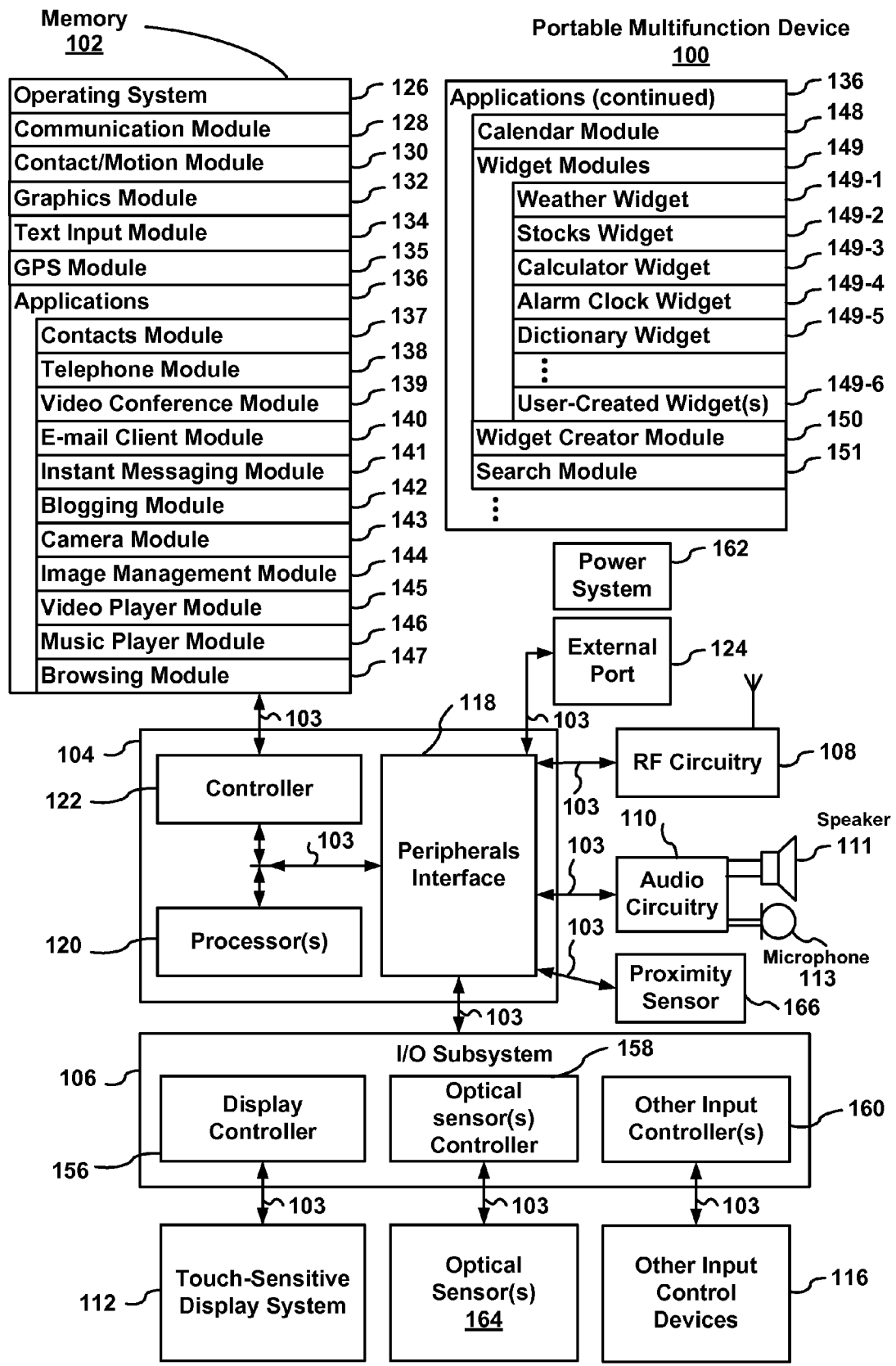
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a click wheel in addition to a touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent applications Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components.

The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549 (Unlocking a Device by Performing Gestures on an Unlock Image, filed Dec. 23, 2005), which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. No.: 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output. The touch screen 112 may have a resolution in excess of 100 dpi. In an exemplary embodiment, the touch screen has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel. The click wheel may also be used to select one or more of the displayed icons. For example, the user may press down on at least a portion of the click wheel or an associated physical button. User commands and navigation commands provided by the user via the click wheel may be processed by an input controller 160 as well as one or more of the modules and/or sets of instructions in memory 102.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 144, the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005, and Ser. No. 11/240,788, "Proximity Detector In Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a pre-defined, finite amount of time, typically between 0.2 and 1.0 seconds, and generally less than two seconds.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a blogging module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6; and/or
  search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth. Embodiments of user interfaces and associated processes using contacts module 137 are described further below.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies. Embodiments of user interfaces and associated processes using telephone module 138 are described further below.

In conjunction with RF circuitry 108, audio circuitry 110, speaker 111, microphone 113, touch screen 112, display controller 156, optical sensor 164, optical sensor controller 158, contact module 130, graphics module 132, text input module 134, contacts module 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143. Embodiments of user interfaces and associated processes using e-mail module 140 are described further below.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS). Embodiments of user interfaces and associated processes using instant messaging module 141 are described further below.

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise rearranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
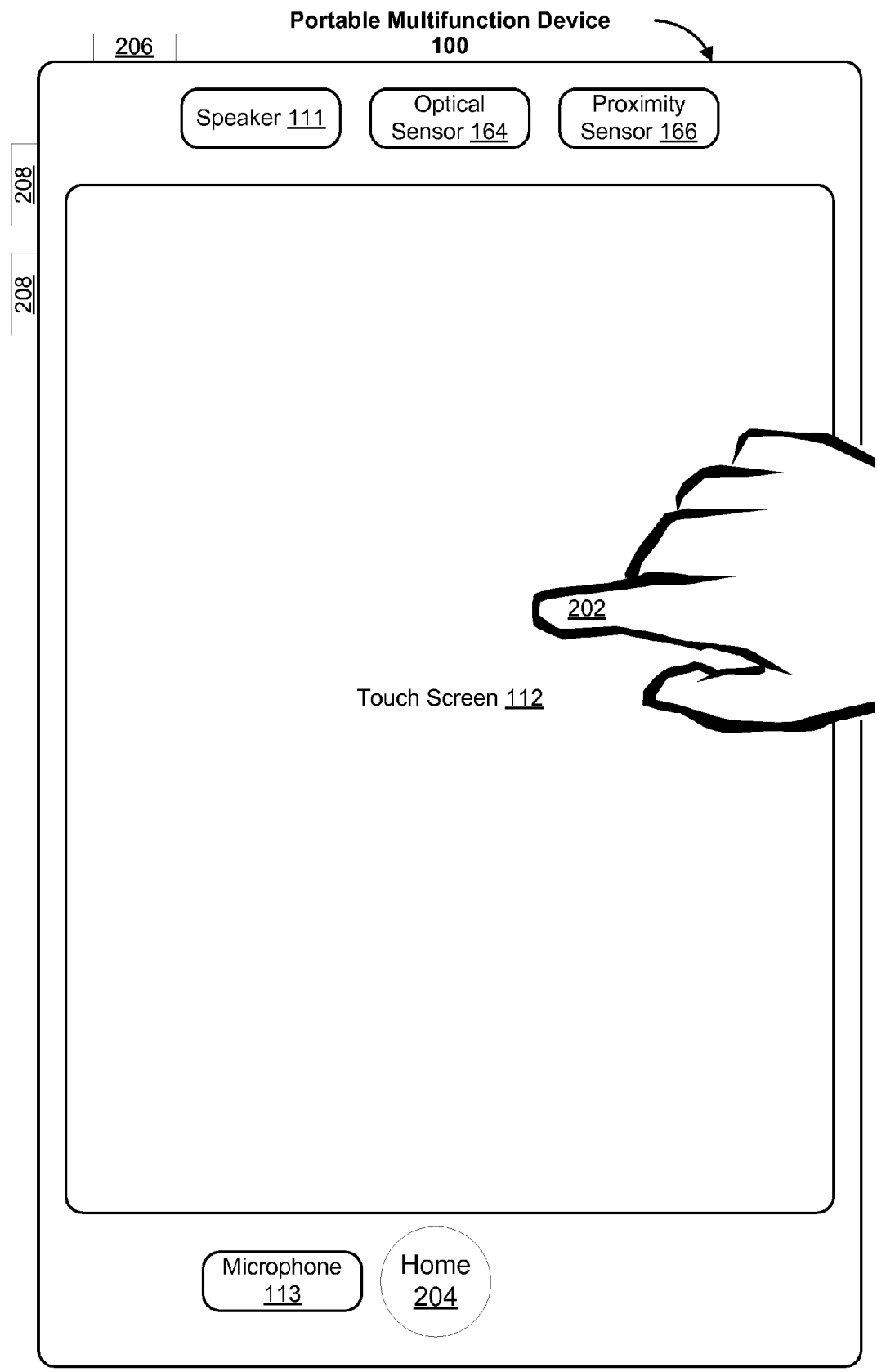
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward and/or a rolling of a finger (from right to left, left to right, upward and/or downward) that has made contact with the device 100. In some embodiments, inadvertent contact with a graphic may not select the graphic. For example, a swipe gesture with that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
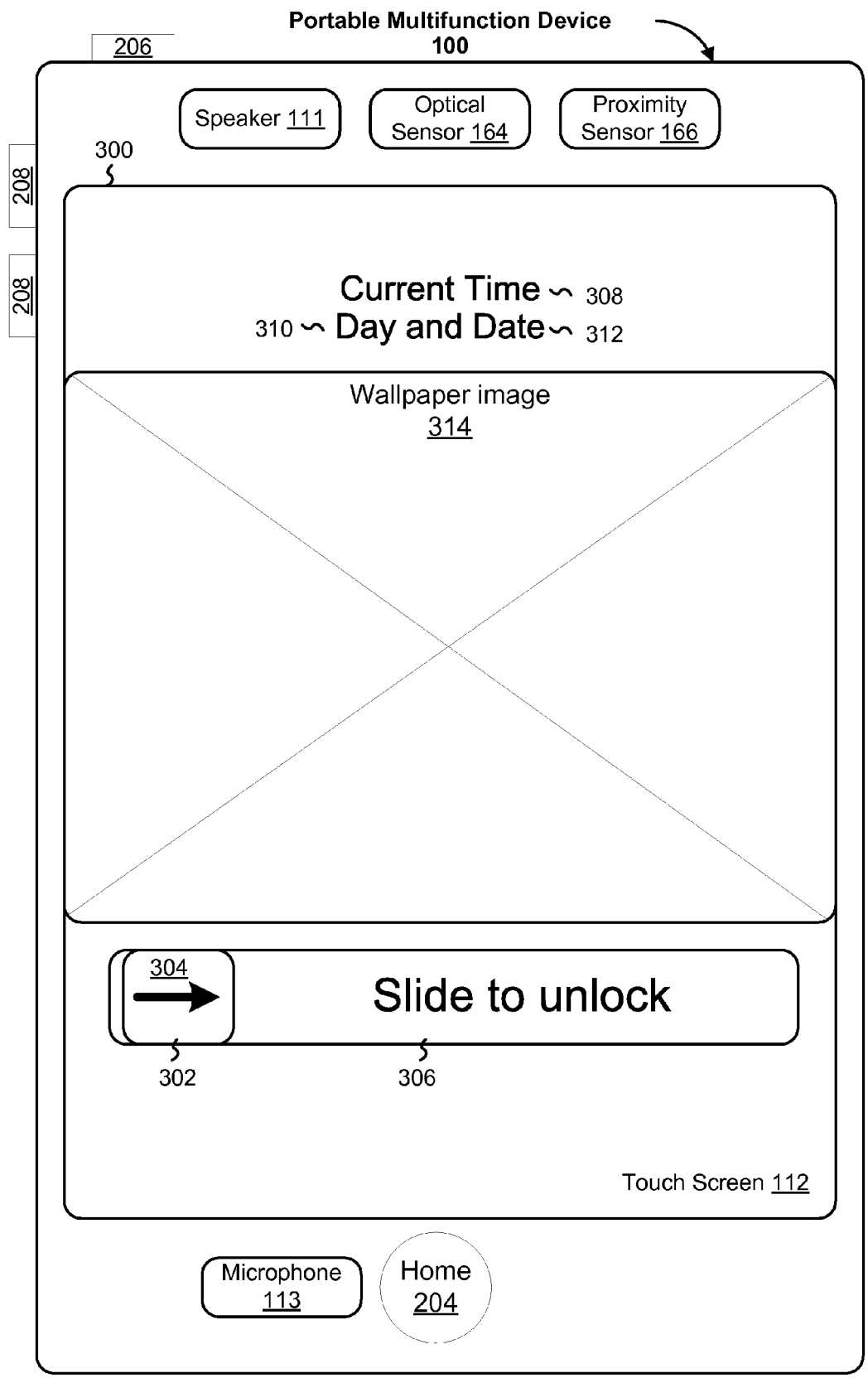
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

- Unlock image 302 that is moved with a finger gesture to unlock the device;
- Arrow 304 that provides a visual cue to the unlock gesture;
- Channel 306 that provides additional cues to the unlock gesture;
- Time 308;
- Day 310;
- Date 312; and
- Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference.

Figure 4:
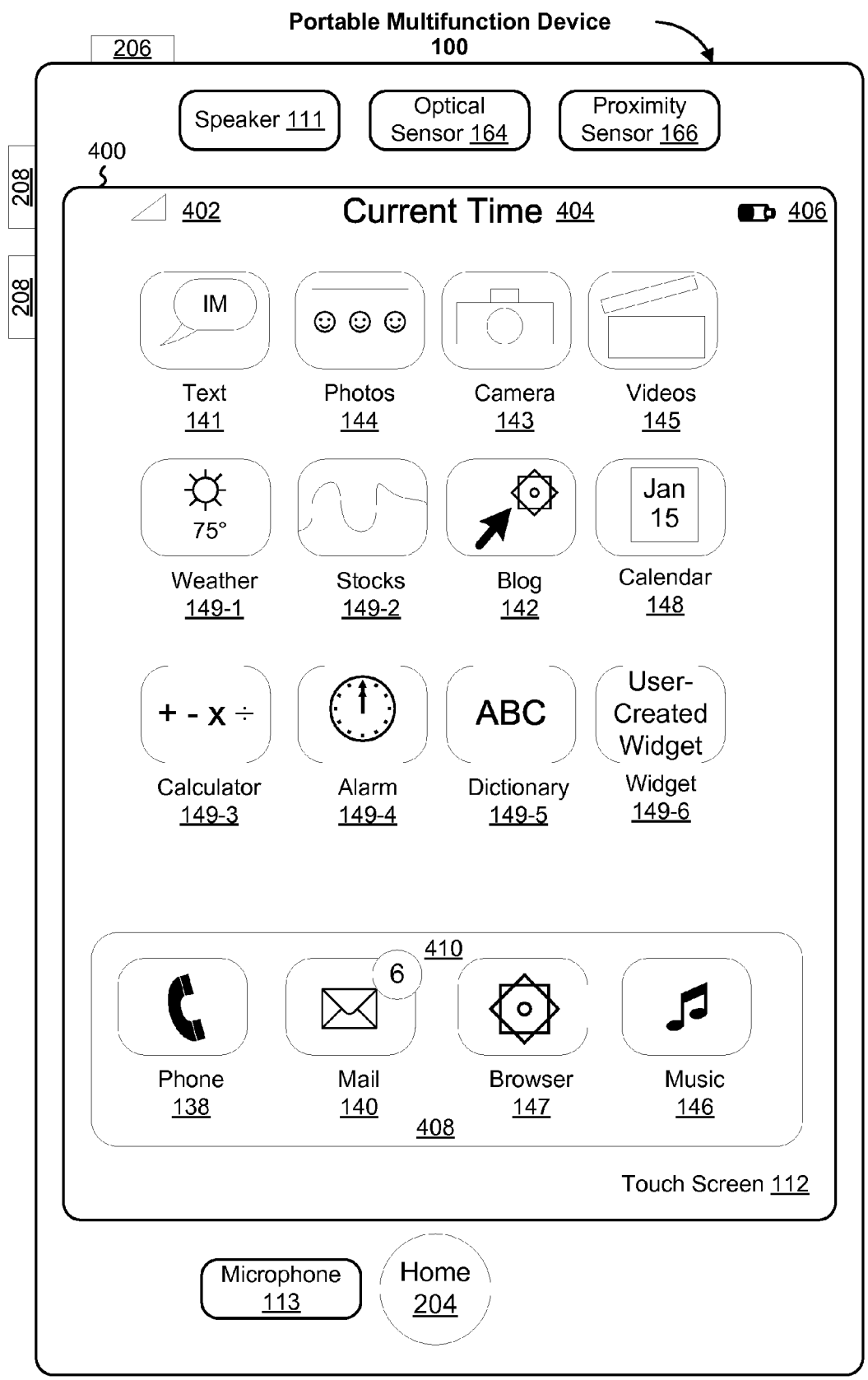
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:

- Signal strength indicator 402 for wireless communication;
- Time 404;
- Battery status indicator 406;
- Tray 408 with icons for frequently used applications, such as:
  - Phone 138;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Blog 142;
  - Calendar 148;
  - Calculator 149-3;
  - Alarm clock 149-4;
  - Dictionary 149-5; and
  - User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

Figure 5:
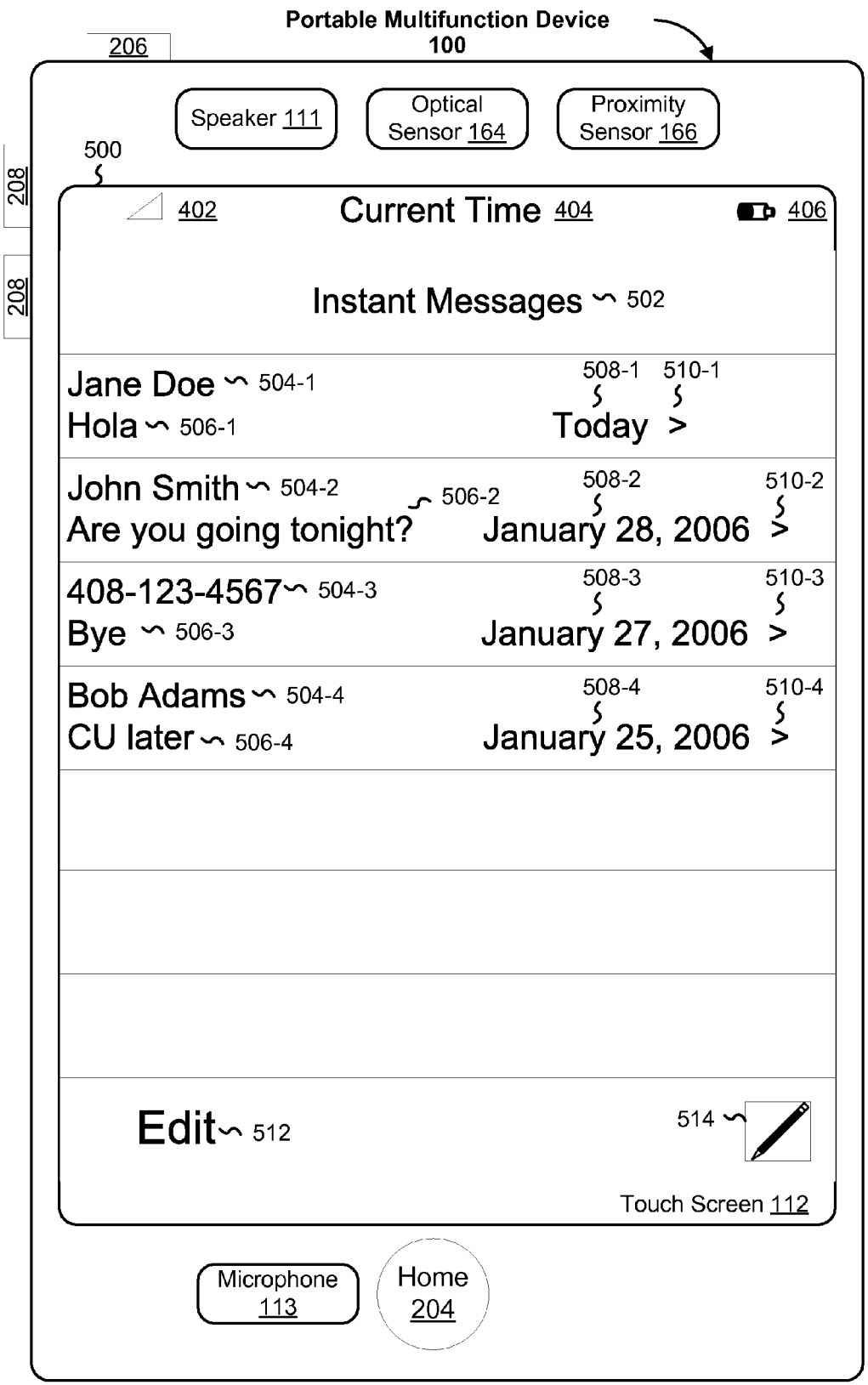
FIG. 5 illustrates an exemplary user interface for listing instant message conversations on a portable multifunction device in accordance with some embodiments.
Figure 6A:
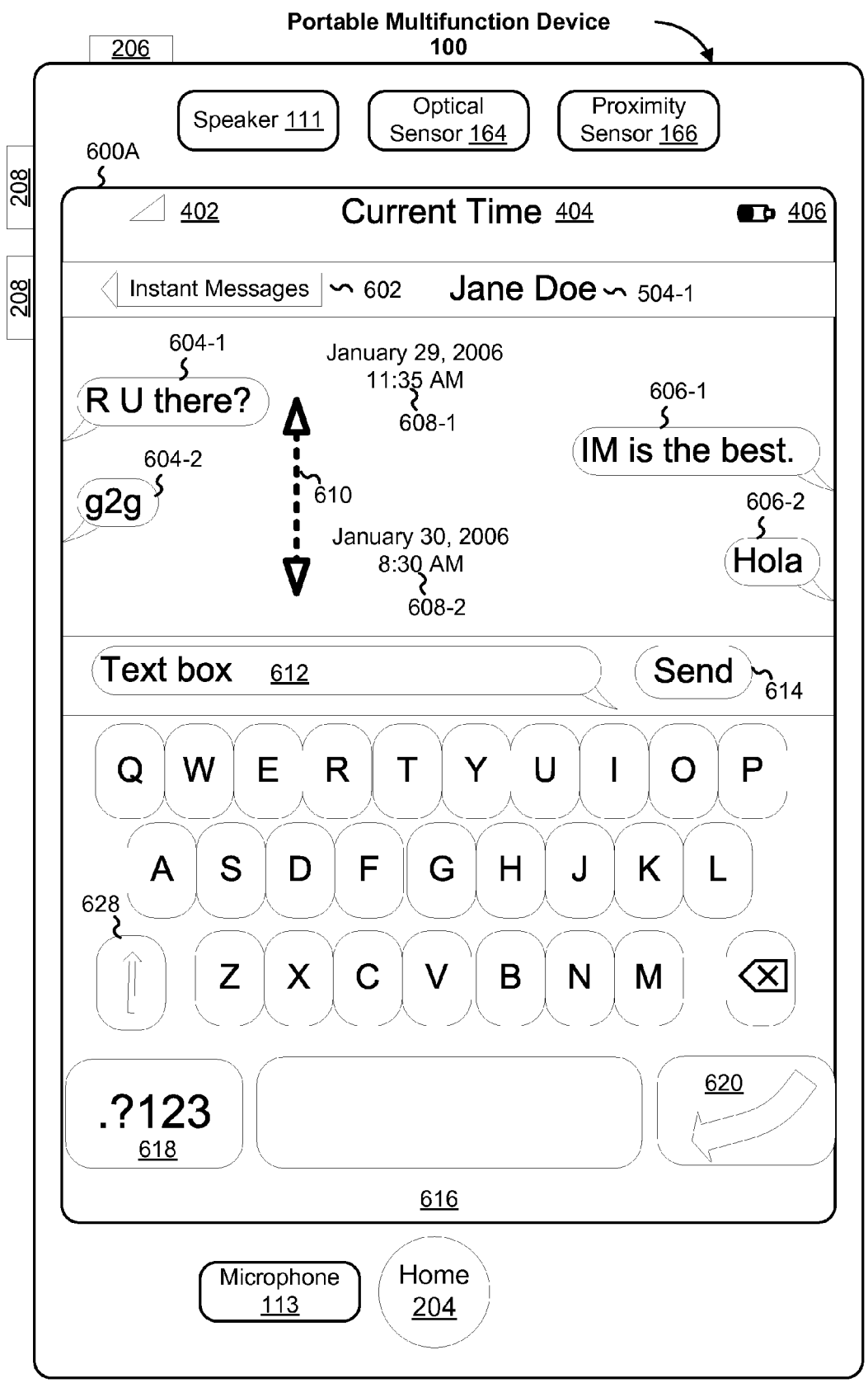
FIGS. 6A-6E illustrate an exemplary user interface for inputting text for an instant message in accordance with some embodiments.
Figure 6B:
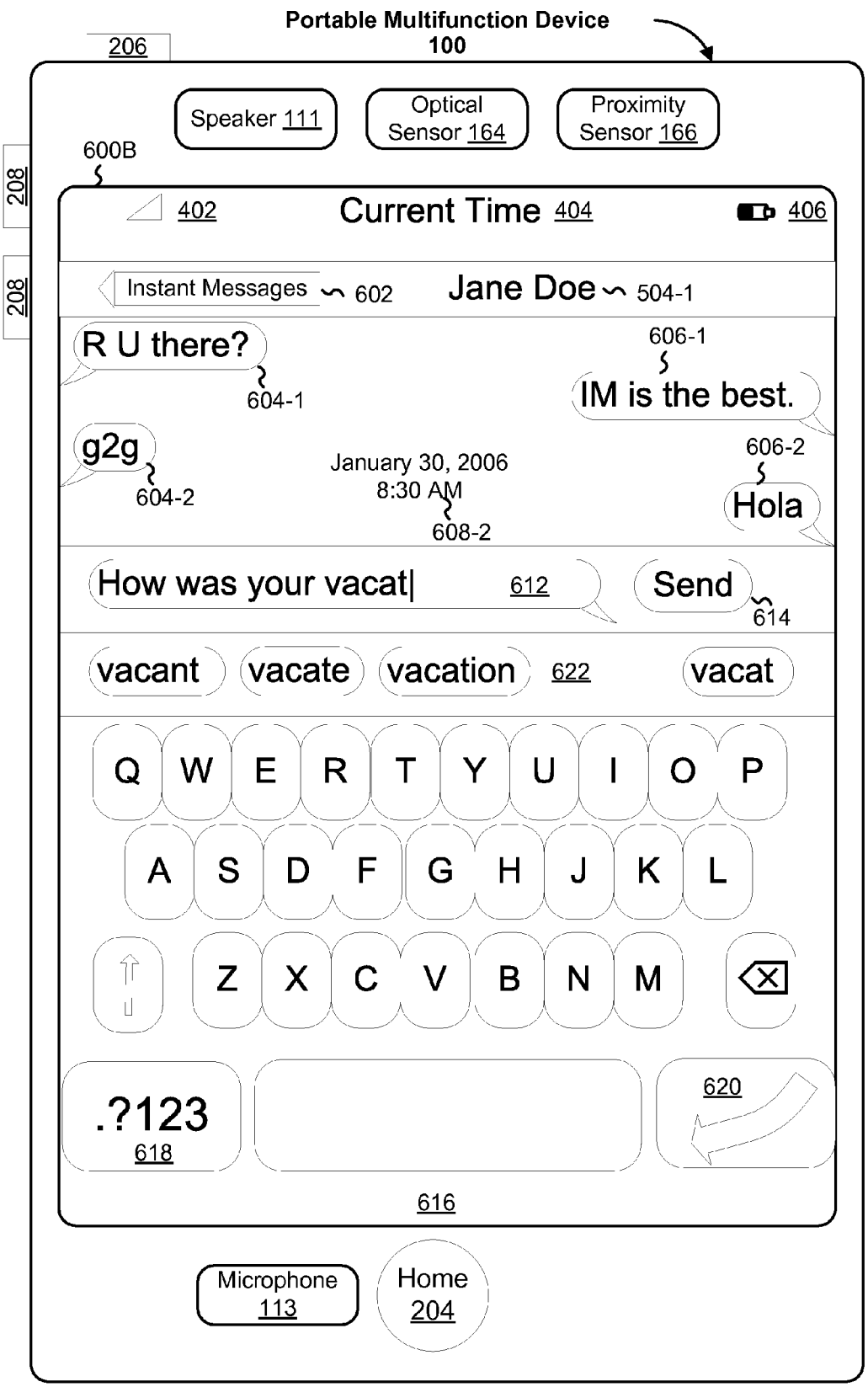
Figure 6C:
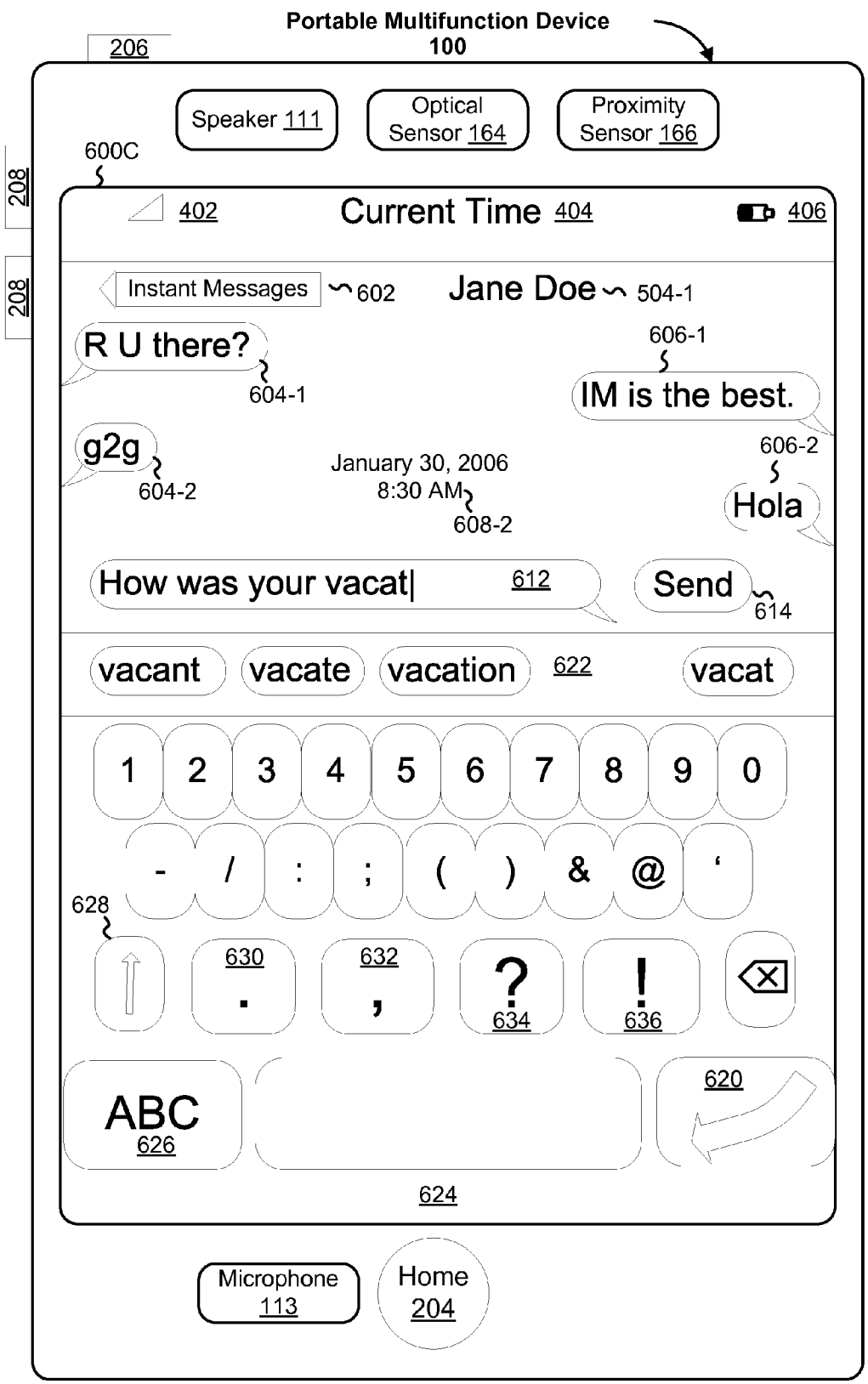
Figure 7:
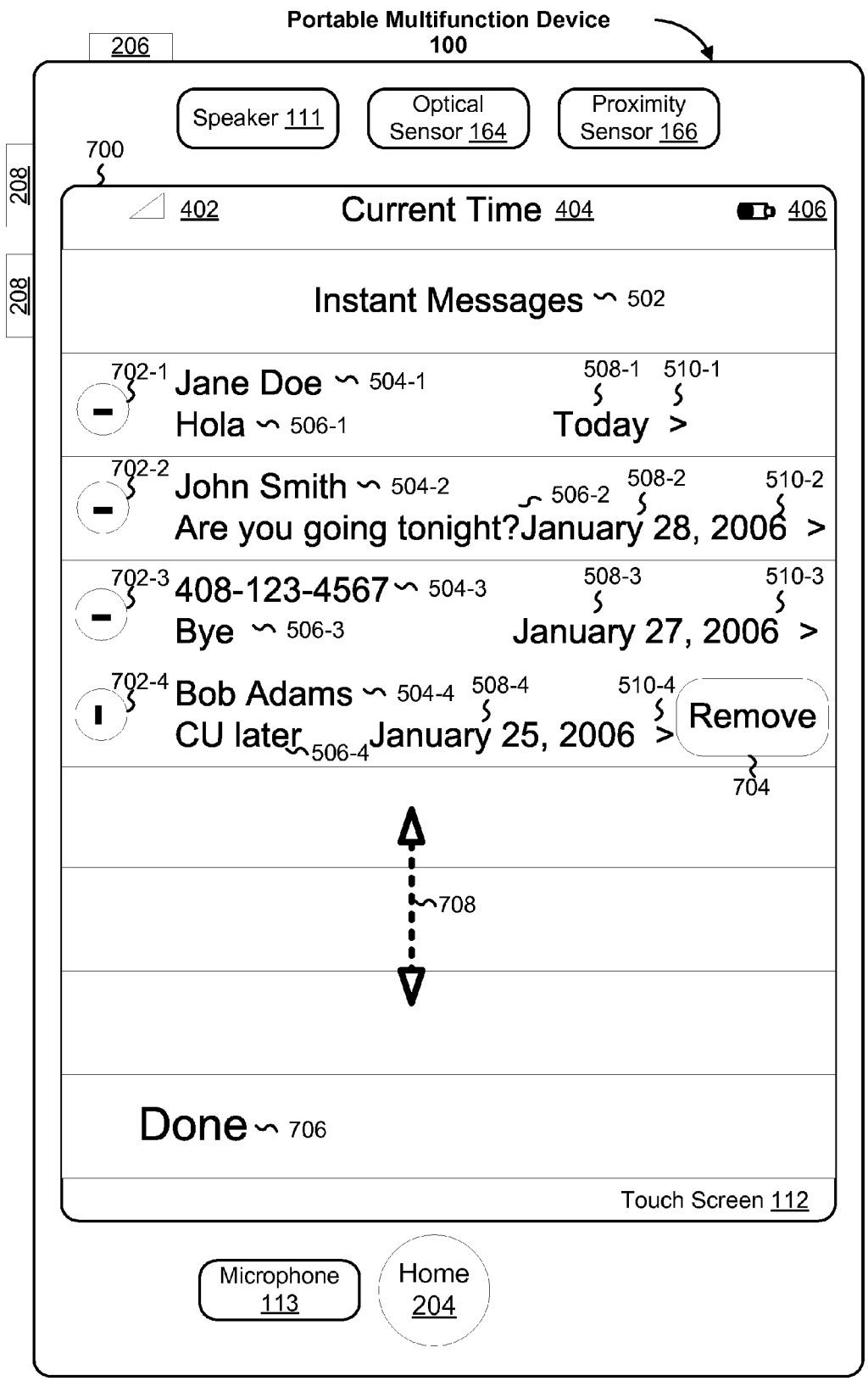
FIG. 7 illustrates an exemplary user interface for deleting an instant message conversation in accordance with some embodiments.
Figure 8A:
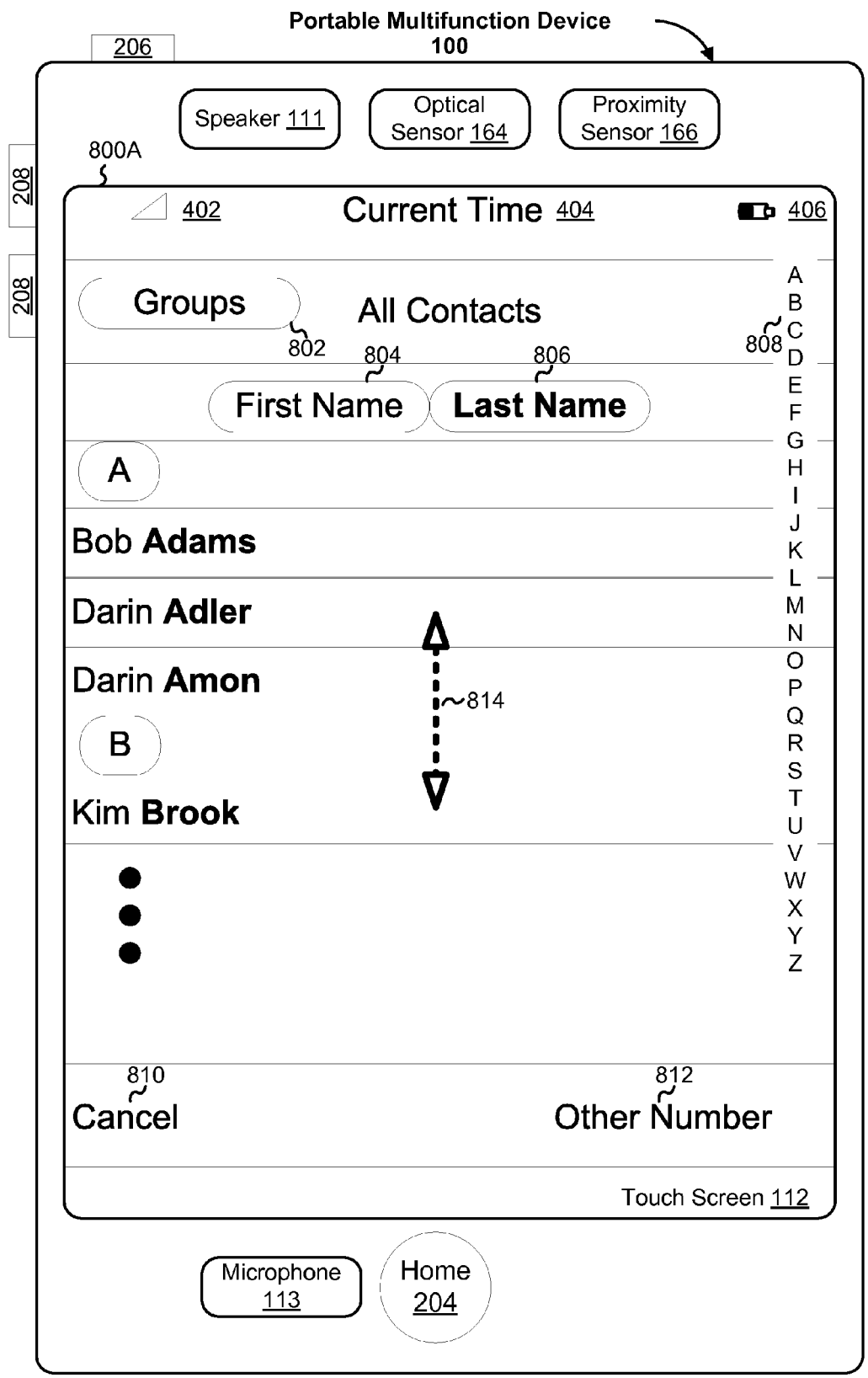
FIGS. 8A and 8B illustrate an exemplary user interface for a contact list in accordance with some embodiments.

FIG. 5 illustrates an exemplary user interface for listing instant message conversations on a portable multifunction device in accordance with some embodiments. In some embodiments, user interface 500 includes the following elements, or a subset or superset thereof:

- 402, 404, and 406, as described above;
- "Instant Messages" or other similar label 502:
- Names 504 of the people with whom a user is having instant message conversations (e.g., Jane Doe 504-1) or the phone number if the person's name is not available (e.g., 408-123-4567 504-3);
- Text 506 of the last message in the conversation;
- Date 508 and/or time of the last message in the conversation;
- Selection icon 510 that when activated (e.g., by a finger tap on the icon) initiates transition to a UI for the corresponding conversation (e.g., FIG. 6A for Jane Doe 504-1);
- Edit icon 512 that when activated (e.g., by a finger tap on the icon) initiates transition to a UI for deleting conversations (e.g., FIG. 7); and
- Create message icon 514 that when activated (e.g., by a finger tap on the icon) initiates transition to the users contact list (e.g., FIG. 8A).

In some embodiments, the name 504 used for an instant message conversation is determined by finding an entry in the user's contact list 137 that contains the phone number used for the instant message conversation. If no such entry is found, the phone number (of the other party with whom the user is exchanging messages) is displayed (e.g., 504-3). In some embodiments, if the other party sends messages from two or more different phone numbers, the messages may appear as a single conversation under a single name if all of the phone numbers used are found in the same entry (i.e., the entry for the other party) in the user's contact list 137.

Automatically grouping the instant messages into "conversations" (instant message exchanges with the same user or the same phone number) makes it easier for the user to carry on and keep track of instant message exchanges with multiple parties.

FIGS. 6A-6E illustrate an exemplary user interface for inputting text for an instant message in accordance with some embodiments.

In some embodiments, user interface 600A includes the following elements, or a subset or superset thereof:
- 402, 404, and 406, as described above;
- Name 504 corresponding to the phone number used in the instant message conversation (or the phone number itself if the name is not available);
- Instant messages icon 602 that when activated (e.g., by a finger tap on the icon) initiates transition to a UI listing instant message conversations (e.g., UI 500);
- Instant messages 604 from the other party, typically listed in order along one side of UI 600A;
- Instant messages 606 to the other party, typically listed in order along the opposite side of UI 600A to show the back and forth interplay of messages in the conversation;
- Timestamps 608 for at least some of the instant messages;
- Text entry box 612;
- Send icon 614 that when activated (e.g., by a finger tap on the icon) initiates sending of the message in text box 612 to the other party (e.g., Jane Doe 504-1);
- Letter keyboard 616 for entering text in box 612;
- Alternate keyboard selector icon 618 that when activated (e.g., by a finger tap on the icon) initiates the display of a different keyboard (e.g., 624, FIG. 6C);
- Send icon 620 that when activated (e.g., by a finger tap on the icon) initiates sending of the message in text box 612 to the other party (e.g., Jane Doe 504-1); and
- Shift key 628 that when activated (e.g., by a finger tap on the icon) capitalizes the next letter chosen on letter keyboard 616.

In some embodiments, a user can scroll through the message conversation (comprised of messages 604 and 606) by applying a vertical swipe gesture 610 to the area displaying the conversation. In some embodiments, a vertically downward gesture scrolls the conversation downward, thereby showing older messages in the conversation. In some embodiments, a vertically upward gesture scrolls the conversation upward, thereby showing newer, more recent messages in the conversation. In some embodiments, as noted above, the last message in the conversation (e.g., 606-2) is displayed in the list of instant messages 500 (e.g., 506-1).

In some embodiments, keys in keyboards 616, 624, and/or 638 briefly change shade and/or color when touched/activated by a user to help the user learn to activate the desired keys.

In some embodiments, user interface 600B (FIG. 6B) includes the following elements, or a subset or superset thereof:
- 402, 404, 406, 602, 604, 606, 608, 612, 614, 616, 618, and 620 as described above; and
- word suggestion area 622 that provides a list of possible words to complete the word fragment being typed by the user in box 612.

In some embodiments, the word suggestion area does not appear in UI 600B until after a predefined time delay (e.g., 2-3 seconds) in text being entered by the user. In some embodiments, the word suggestion area is not used or can be turned off by the user.

Figure 6D:
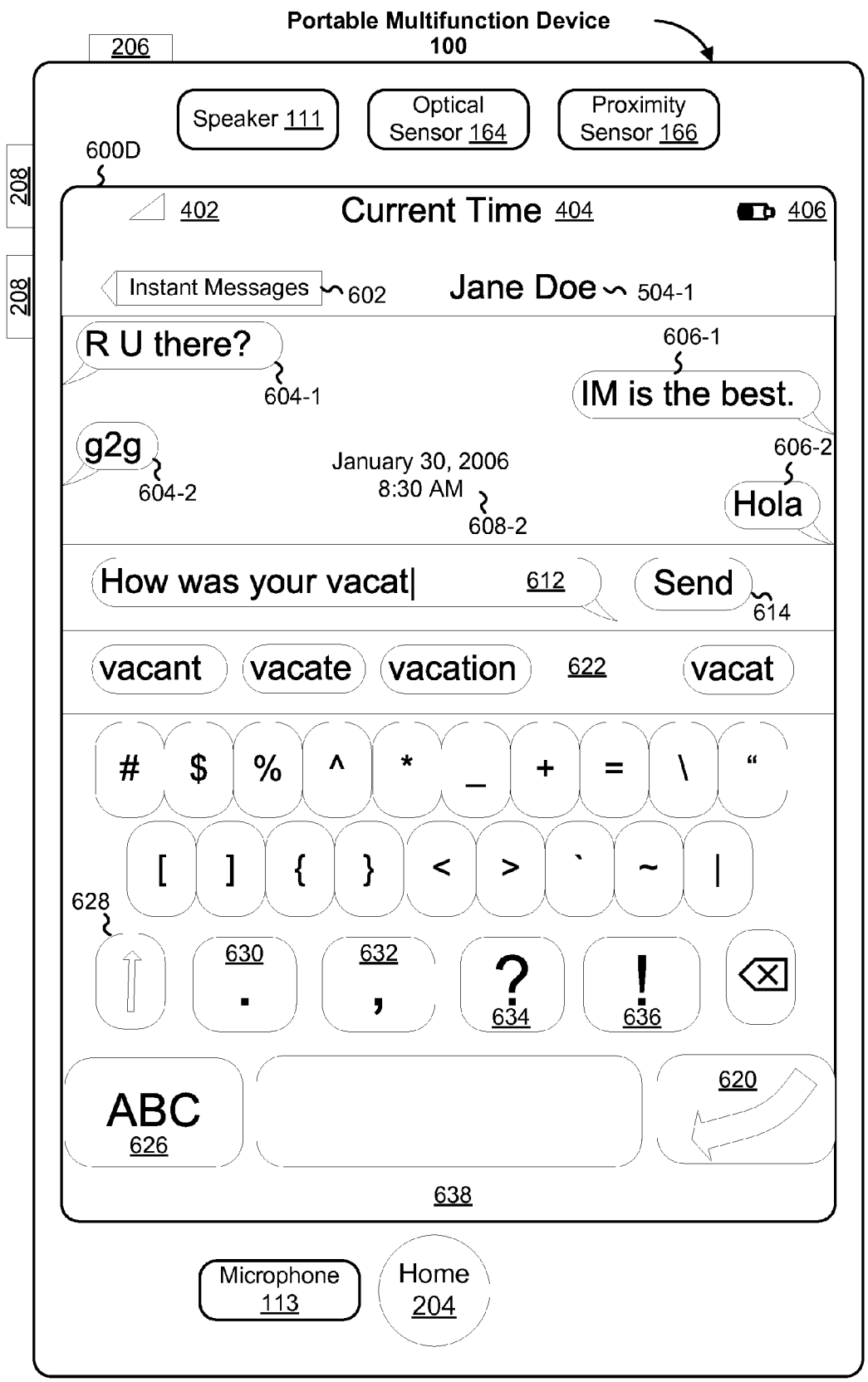

In some embodiments, user interface 600C (FIG. 6C) includes the following elements, or a subset or superset thereof:
- 402, 404, 406, 602, 604, 606, 608, 612, 614, 620, and 622 as described above;
- Alternate keyboard 624, which may be made up primarily of digits and punctuation; in some embodiments, frequently used punctuation keys (e.g., period key 630, comma key 632, question mark key 634, and exclamation point key 636) are larger than the other keys of the keyboard 624;
- Letter keyboard selector icon 626 that when activated (e.g., by a finger tap on the icon) initiates the display of a letter keyboard (e.g., 616, FIG. 6A); and
- Shift key 628 that when activated (e.g., by a finger tap on the icon) initiates display of yet another keyboard (e.g., 638, FIG. 6D).

In some embodiments, keeping the period key 630 near keyboard selector icon 626 reduces the distance that a user's finger needs to travel to enter the oft-used period.

In some embodiments, user interface 600D (FIG. 6D) includes the following elements, or a subset or superset thereof:
- 402, 404, 406, 602, 604, 606, 608, 612, 614, 620, 622, 626, 628 as described above; and
- Another alternate keyboard 638, which may be made up primarily of symbols and punctuation; in some embodiments, frequently used punctuation keys (e.g., period key 630, comma key 632, question mark key 634, and exclamation point key 636) are larger than the other keys.

In some embodiments, user interface 600E (FIG. 6E) includes the following elements, or a subset or superset thereof:
- 402, 404, 406, 602, 604, 606, 608, 612, 614, 616, 618, and 620, as described above; and
- New instant message 606-3 sent to the other party.

Figure 6E:
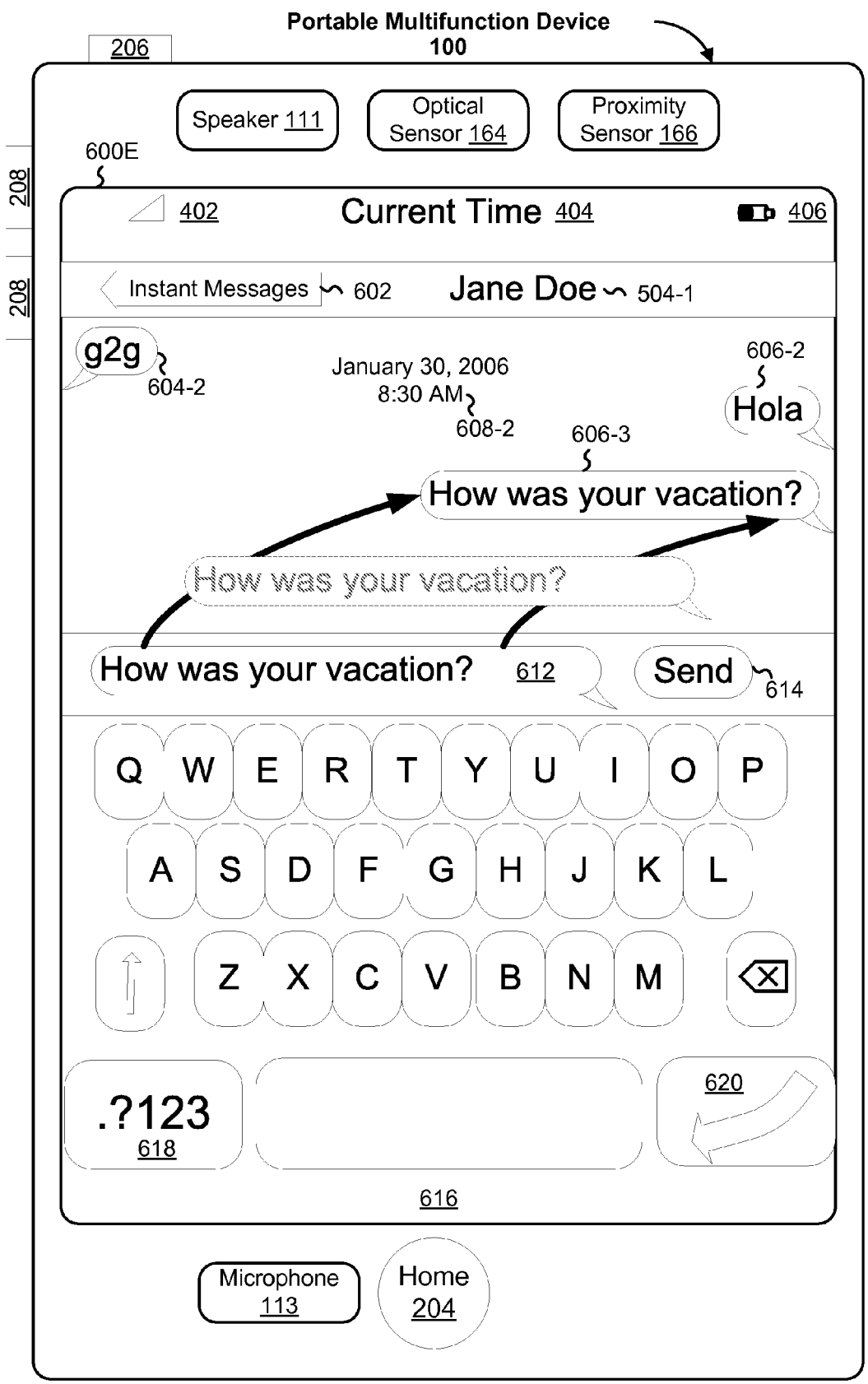

In some embodiments, when the user activates a send key (e.g., either 614 or 620), the text in text box 612 "pops" or otherwise comes out of the box and becomes part of the string of user messages 606 to the other party. The black arrows in FIG. 6E illustrate an animated formation of a quote bubble 606-3. In some embodiments, the size of the quote bubble scales with the size of the message. In some embodiments, a sound is also made when the message is sent, such as a droplet sound, to notify the user.

FIG. 7 illustrates an exemplary user interface for deleting an instant message conversation in accordance with some embodiments. In some embodiments, user interface 700 includes the following elements, or a subset or superset thereof:
- 402, 404, 406, 504, 506, 508, 510, as described above;
- Delete icons 702;
- Remove icon 704; and
- Done icon 706.

In some embodiments, if the user activates edit icon 512 (FIG. 5), the delete icons 702 appear next to each instant message conversation. If a user activates a delete icon (e.g., by tapping it with a finger), the icon may rotate 90 degrees (e.g., 702-4) or otherwise change its appearance and/or a second icon may appear (e.g., remove icon 704). If the user activates the second icon, the corresponding instant message conversation is deleted.

This deletion process, which requires multiple gestures by the user on different parts of the touch screen (e.g., delete icon 702-4 and remove icon 704 are on opposite sides of the touch screen) greatly reduces the chance that a user will accidentally delete a conversation or other similar item.

The user activates the done icon 706 (e.g., by tapping on it with a finger) when the user has finished deleting IM conversations and the device returns to UI 500.

If there is a long list of conversations (not shown) that fill more than the screen area, the user may scroll through the list using vertically upward and/or vertically downward gestures 708 on the touch screen.

Figure 8B:
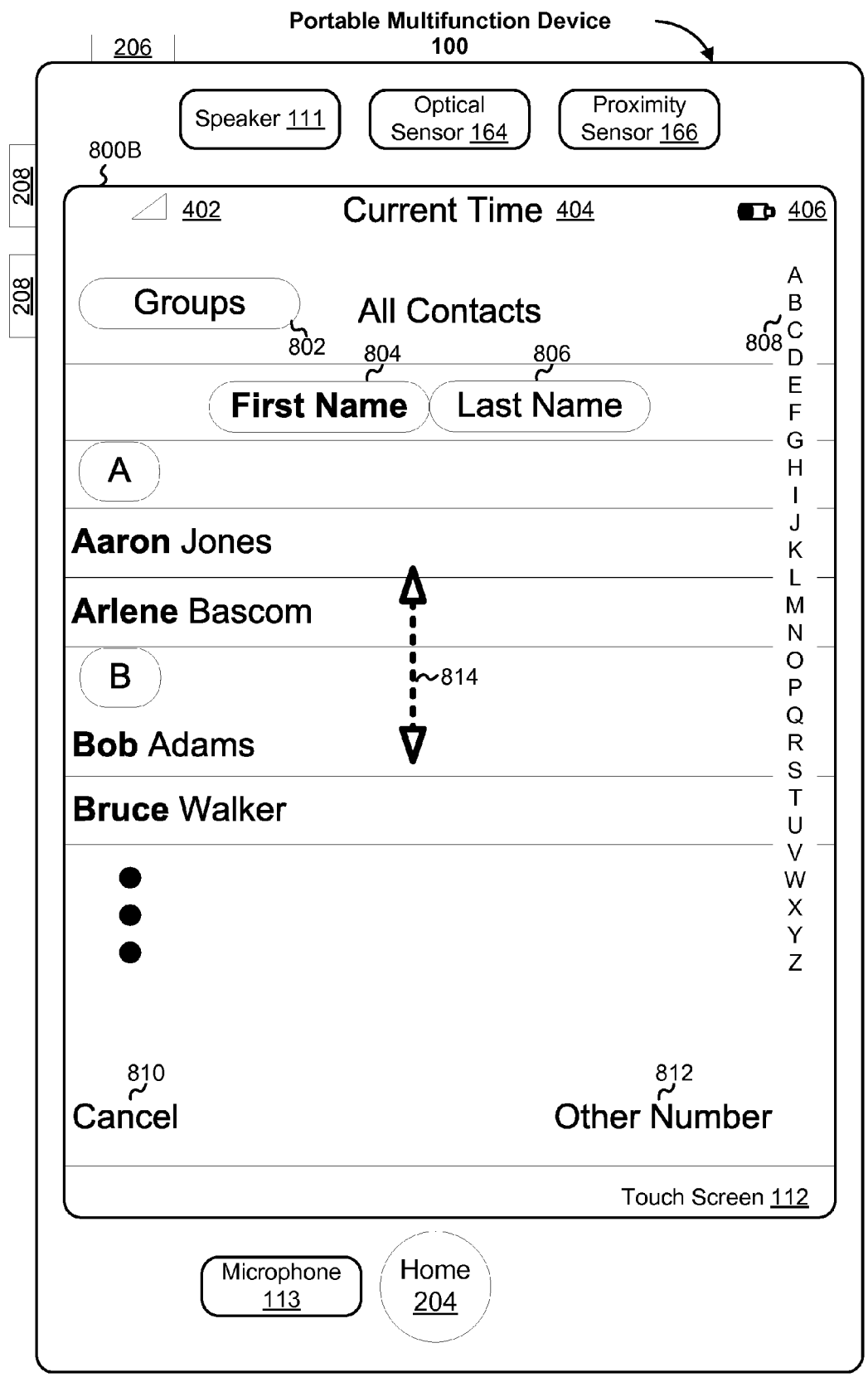

FIGS. 8A and 8B illustrate an exemplary user interface for a contact list in accordance with some embodiments.

Figure 9:
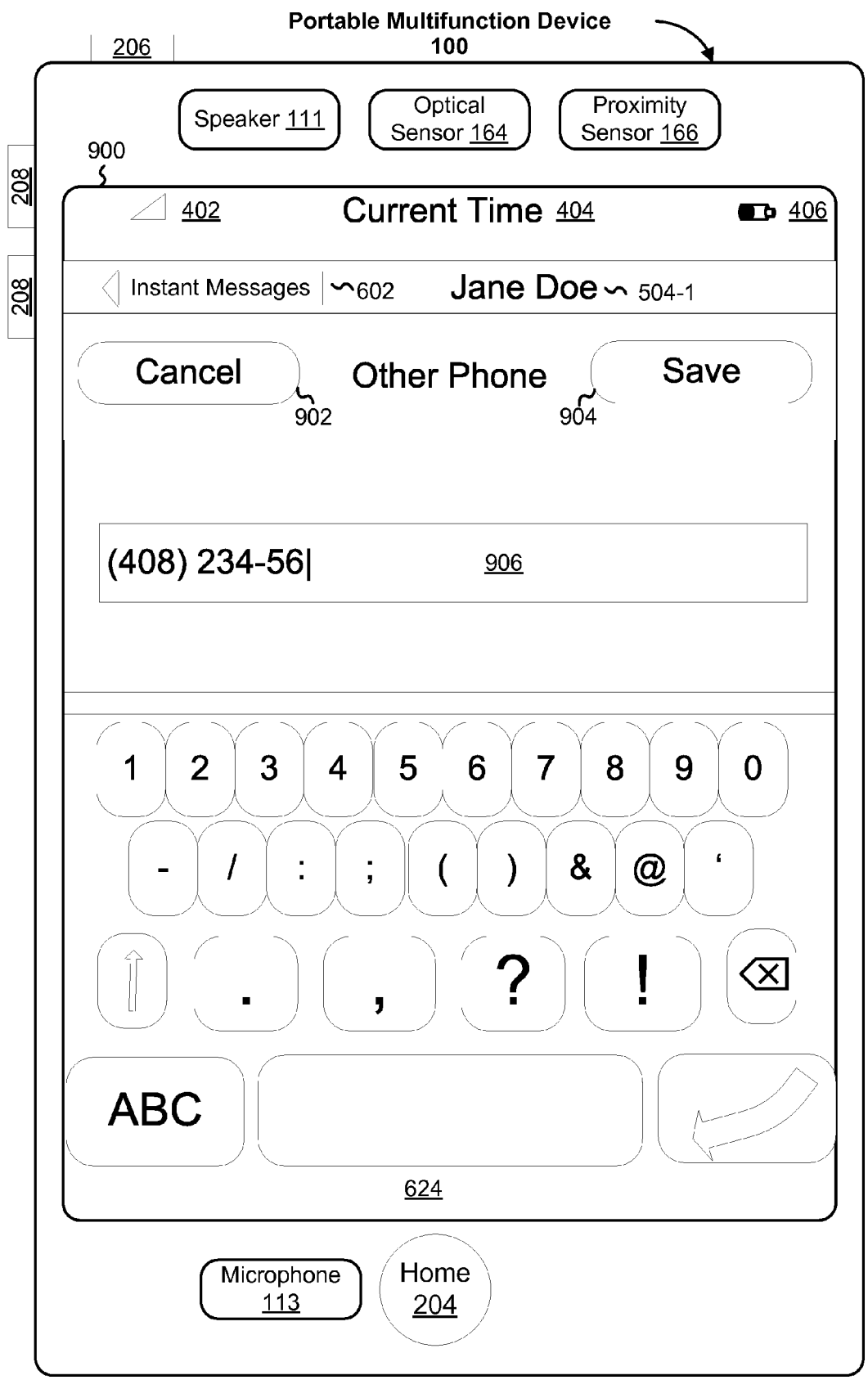
FIG. 9 illustrates an exemplary user interface for entering a phone number for instant messaging in accordance with some embodiments.

In some embodiments, user interfaces 800A and 800B include the following elements, or a subset or superset thereof:

402, 404, 406, as described above;

Groups icon 802 that when activated (e.g., by a finger tap on the icon) initiates display of groups of contacts;

First name icon 804 that when activated (e.g., by a finger tap on the icon) initiates an alphabetical display of the user's contacts by their first names (FIG. 8B);

Last name icon 806 that when activated (e.g., by a finger tap on the icon) initiates an alphabetical display of the user's contacts by their last names (FIG. 8A);

Alphabet list icons 808 that the user can touch to quickly arrive at a particular first letter in the displayed contact list;

Cancel icon 810 that when activated (e.g., by a finger tap on the icon) initiates transfer back to the previous UI (e.g., UI 500); and Other number icon 812 that when activated (e.g., by a finger tap on the icon) initiates transfer to a UI for entering a phone number for instant messaging, such as a phone number that is not in the user's contact list (e.g., UI 900, FIG. 9).

As described in U.S. patent application Ser. No. 11/322,547, "Scrolling List With Floating Adjacent Index Symbols," filed Dec. 23, 2005, which is hereby incorporated by reference, the user may scroll through the contact list using vertically upward and/or vertically downward gestures 814 on the touch screen.

FIG. 9 illustrates an exemplary user interface for entering a phone number for instant messaging in accordance with some embodiments. In some embodiments, user interface 900 includes the following elements, or a subset or superset thereof:

402, 404, 406, 602, and 624, as described above;

Cancel icon 902 that when activated (e.g., by a finger tap on the icon) initiates transfer back to the previous UI (e.g., UI 800A or UI 800B);

Save icon 904 that when activated (e.g., by a finger tap on the icon) initiates saving the entered phone number in the instant messages conversation list (e.g., UI 500) and displaying a UI to compose an instant message to be sent to the entered phone number (e.g., UI 600A); and Number entry box 906 for entering the phone number using keyboard 624.

Note that the keyboard displayed may depend on the application context. For example, the UI displays a soft keyboard with numbers (e.g., 624) when numeric input is needed or expected. The UI displays a soft keyboard with letters (e.g., 616) when letter input is needed or expected.

FIGS. 10A-10M illustrate an exemplary user interface for displaying and managing contacts in accordance with some embodiments.

Figure 10A:
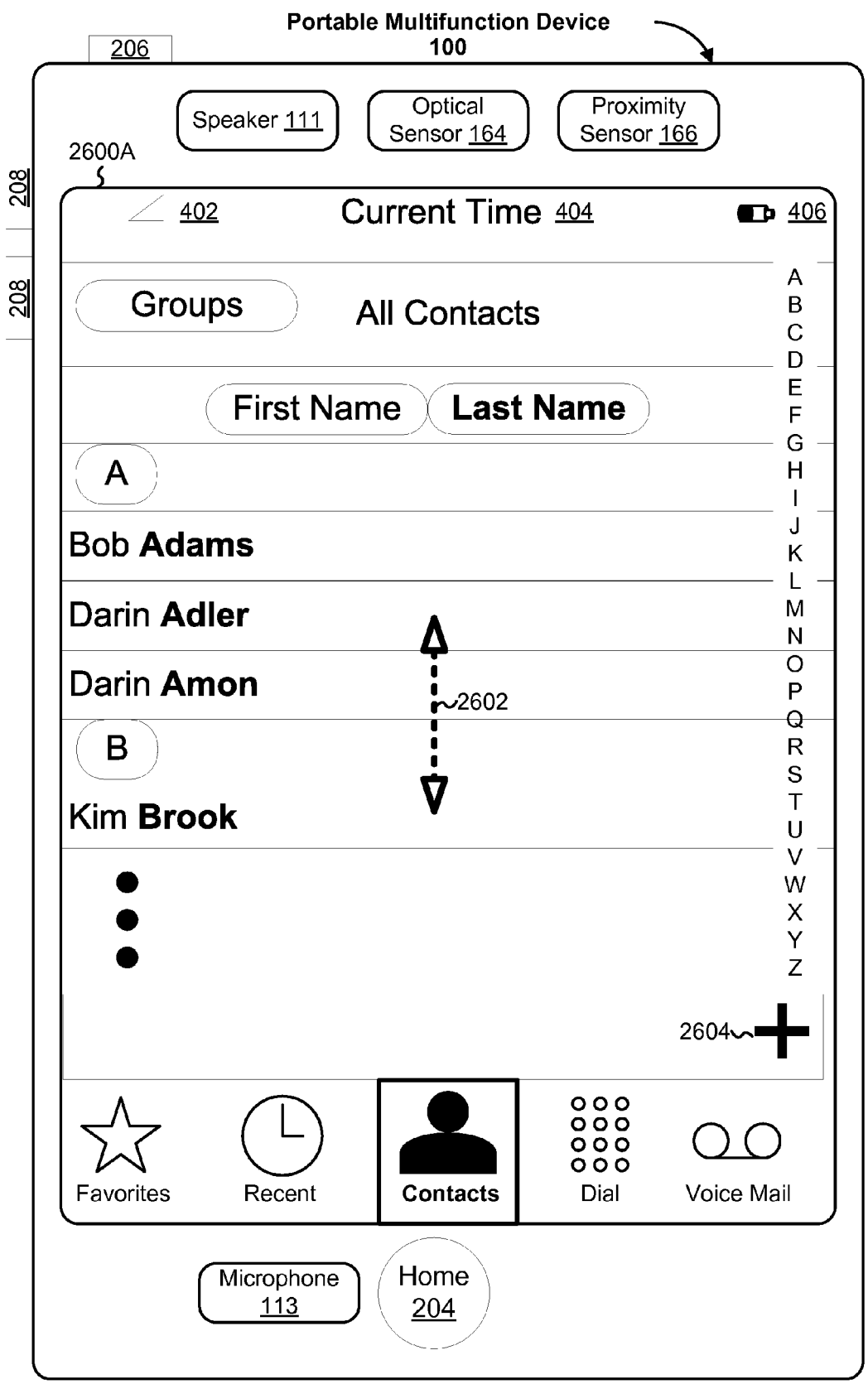
FIGS. 10A-10M illustrate an exemplary user interface for displaying and managing contacts in accordance with some embodiments.

In some embodiments, in response to the user activating phone icon 138 in UI 400 (FIG. 4) (e.g., by a finger tap on the icon), the user's contact list is displayed (e.g., UI 2600A, FIG. 10A).

As described in U.S. patent application Ser. No. 11/322,547, "Scrolling List With Floating Adjacent Index Symbols," filed Dec. 23, 2005, which is hereby incorporated by reference, the user may scroll through the contact list using vertically upward and/or vertically downward gestures 2602 on the touch screen.

Figure 10B:
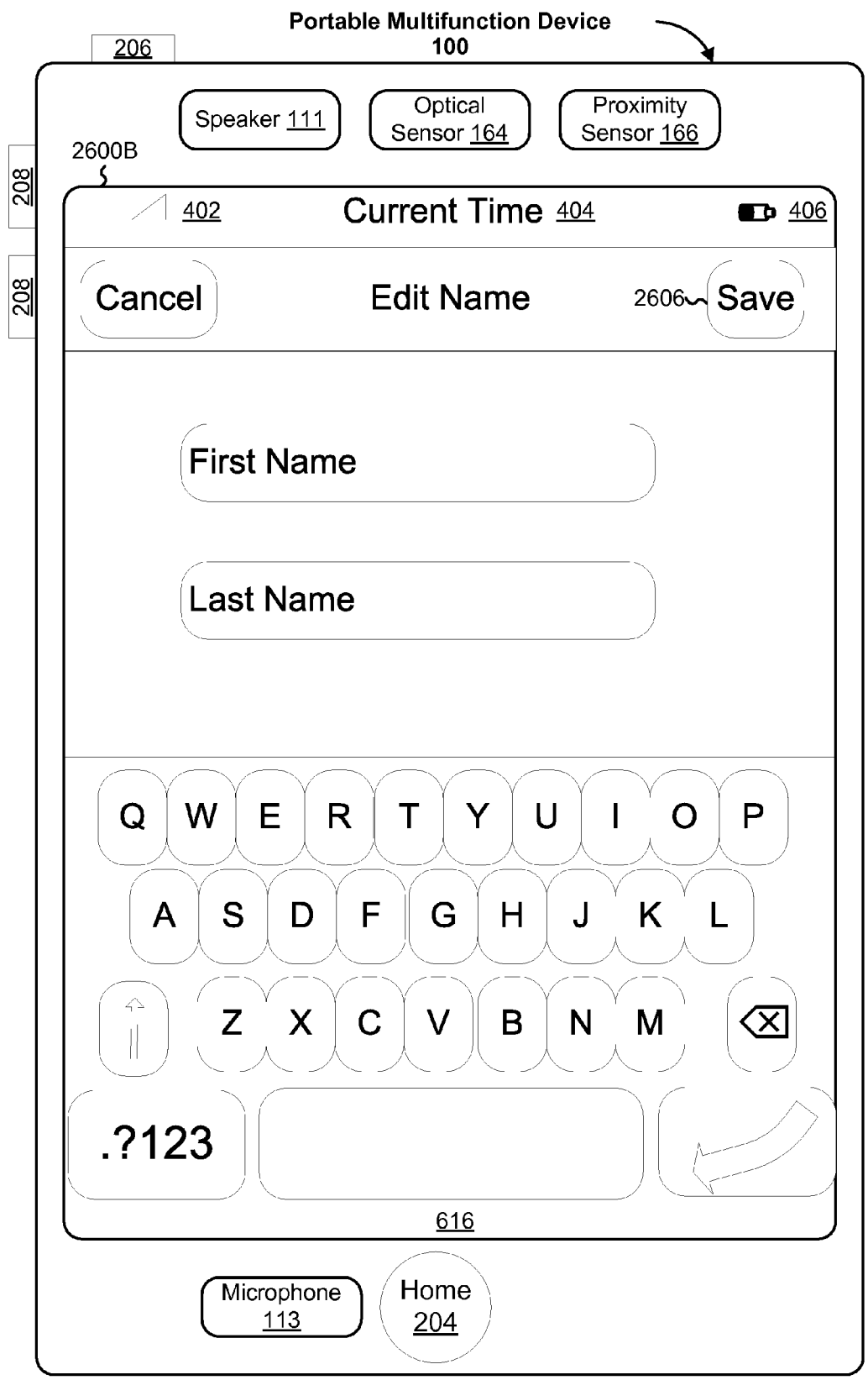
Figure 10C:
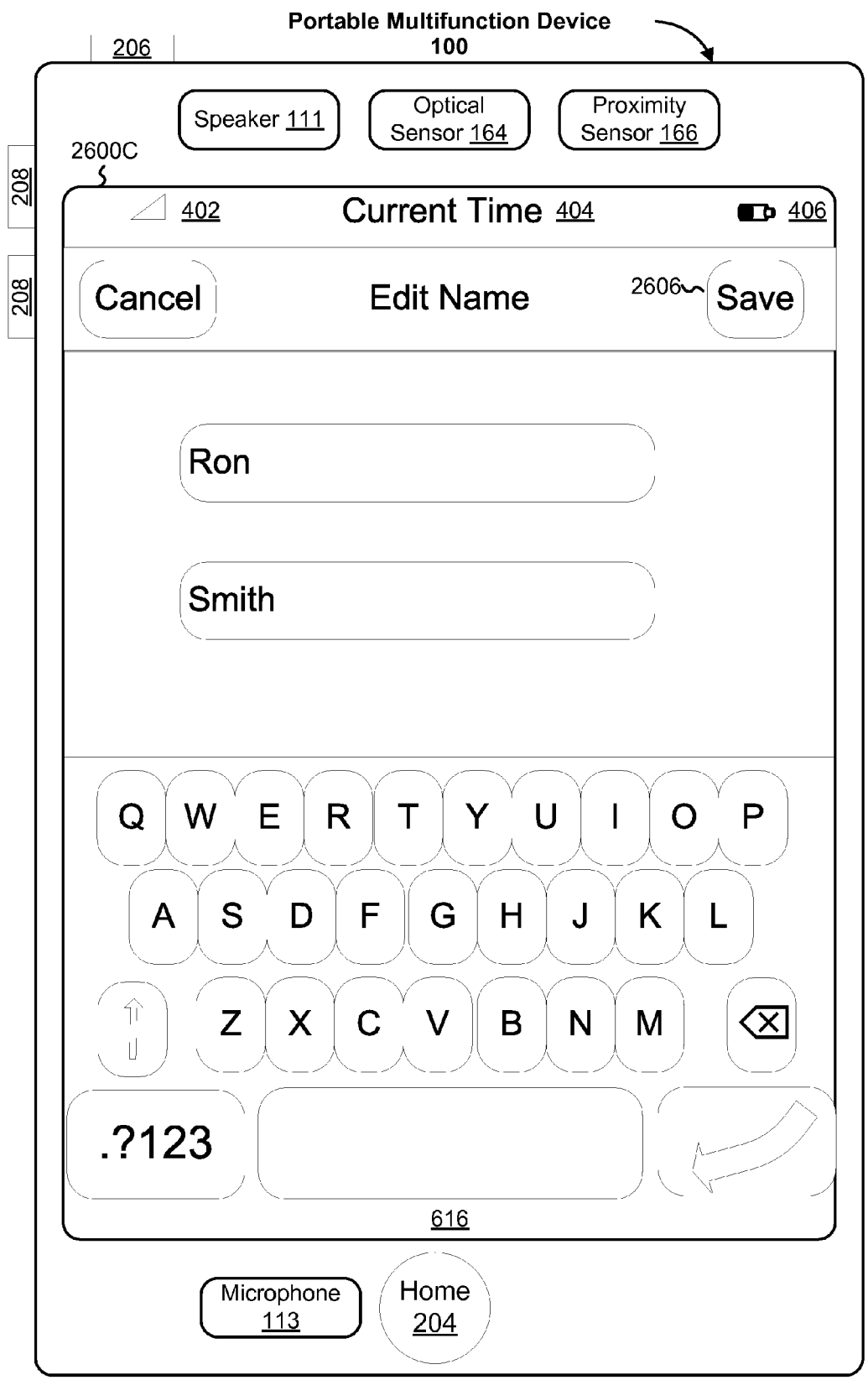

In some embodiments, in response to the user activating add new contact icon 2604 (e.g., by a finger tap on the icon), the touch screen displays a user interface for editing the name of the contact (e.g., UI 2600B, FIG. 10B).

Figure 10D:
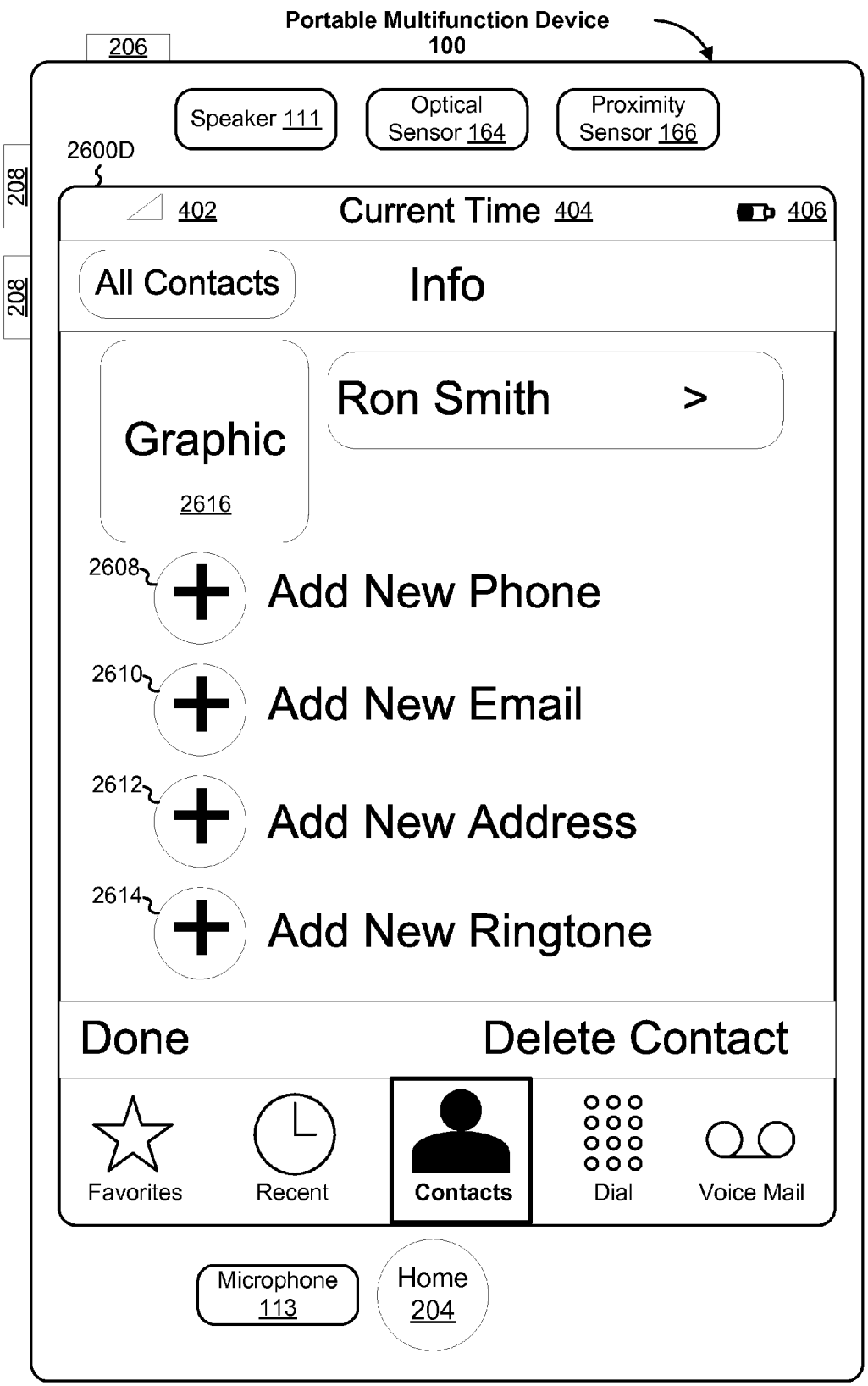

In some embodiments, in response to the user entering the contact name (e.g., entering "Ron Smith" via keyboard 616 in UI 2600C, FIG. 10C) and activating the save icon 2606 (e.g., by a finger tap on the icon), the contacts module creates and displays a new entry for the contact (e.g., UI 2600D, FIG. 10D).

Figure 10E:

In some embodiments, in response to the user activating add new phone icon 2608 (e.g., by a finger tap on the icon or on the row containing the icon), the touch screen displays a user interface for editing the phone number(s) of the contact (e.g., UI 2600E, FIG. 10E).

In some embodiments, in response to the user entering the phone number (e.g., via keyboard 624 in UI 2600E, FIG. 10E); specifying the type of phone number (e.g., by a tap or other predefined gesture on mobile icon 2618, home icon 2620, or work icon 622); and activating the save icon 2618 (e.g., by a finger tap on the icon), the contacts module creates a phone number for the corresponding contact.

In some embodiments, the user can select additional phone number types. For example, in response to the user activating selection icon 2624 (e.g., by a finger tap on the icon), the touch screen displays a phone label UI (e.g., UI 2600F, FIG. 10F). In some embodiments, in response to the user activating a label in UI 2600F, the chosen label is displayed in place of work icon 2622 in UI 2600E. In some embodiments, the chosen label is also highlighted in UI 2600E to indicate to the user that the phone number being entered will be given the chosen label.

In some embodiments, the user can add custom phone labels to UI 2600F by activating an add labels icon 2628 and entering the label via a soft keyboard (e.g., 616, not shown).

In some embodiments, the user can delete one or more of the labels in UI 2600F. In some embodiments, only the user's custom labels may be deleted. For example, in response to the user activating the edit icon 2630 (e.g., by a finger tap on the icon), the touch screen displays a delete icon 2632 next to the labels that may be deleted (e.g., UI 2600G, FIG. 10G). If a user activates a delete icon (e.g., by tapping it with a finger), the icon may rotate 90 degrees (e.g., 2634, FIG. 10H) or otherwise change its appearance and/or a second icon may appear (e.g., remove icon 2636, FIG. 10H). If the user activates the second icon, the contact module deletes the corresponding label. This deletion process is analogous to the process described above with respect to FIG. 7. As noted above, a deletion process that requires multiple gestures by the user on different parts of the touch screen (e.g., delete icon 2632 and remove icon 2636 are on opposite sides of the touch screen in UI 2600H) greatly reduces the chance that a user will accidentally delete a label or other similar item. The user activates the done icon 2638 (e.g., by tapping on it with a finger) when the user has finished deleting labels and the device returns to UI 2600F.

Figure 10F:
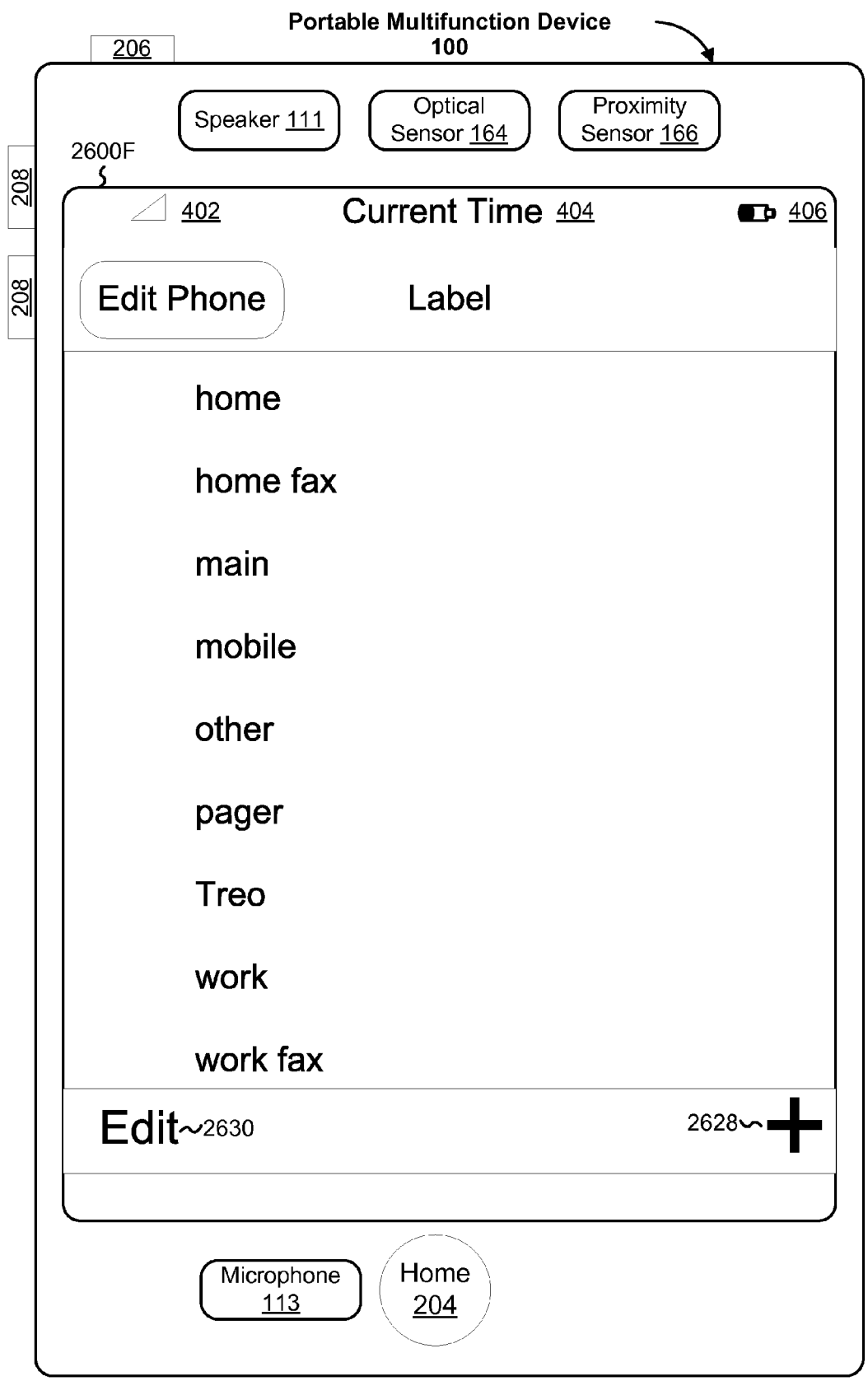
Figure 10G:
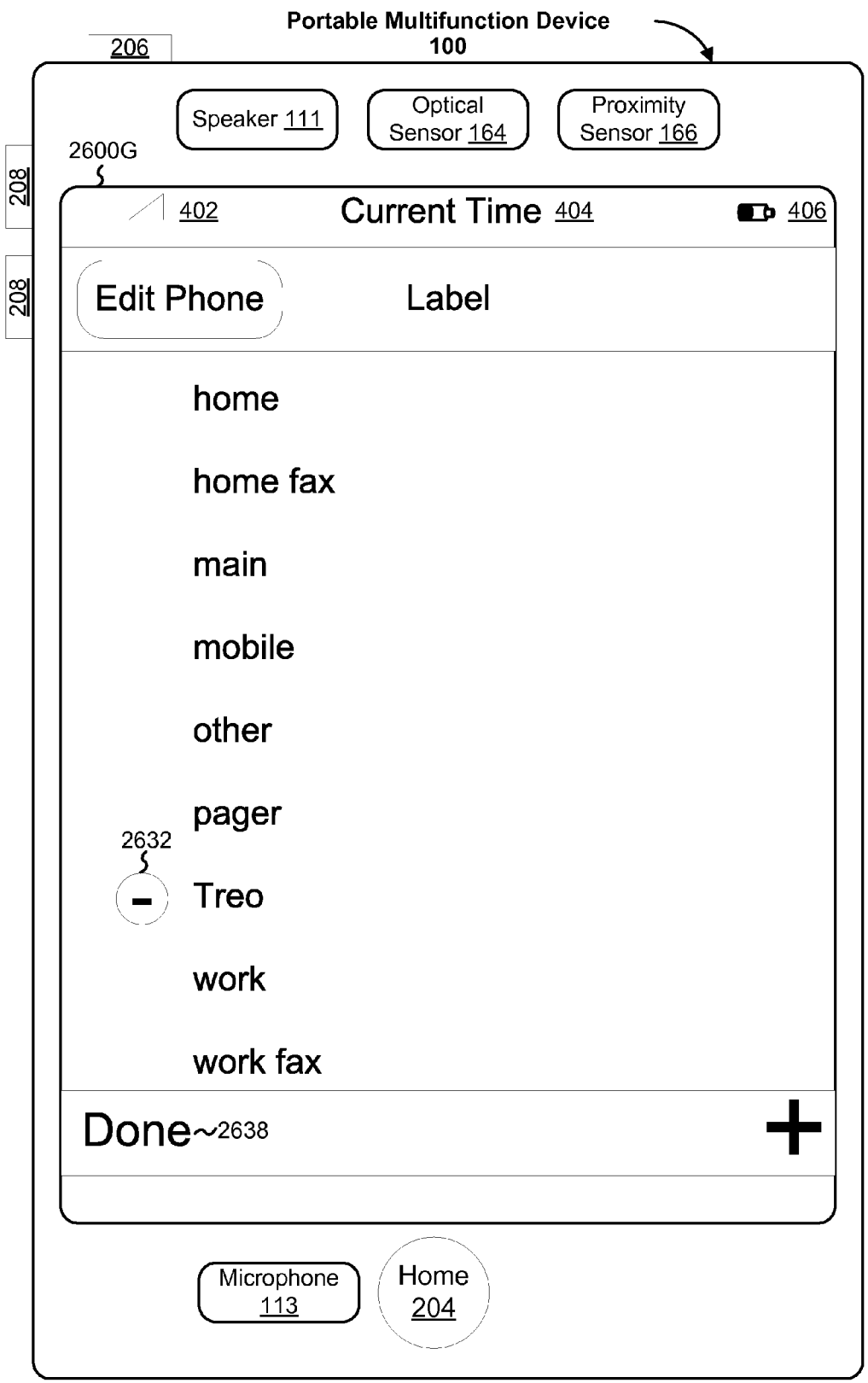
Figure 10H:
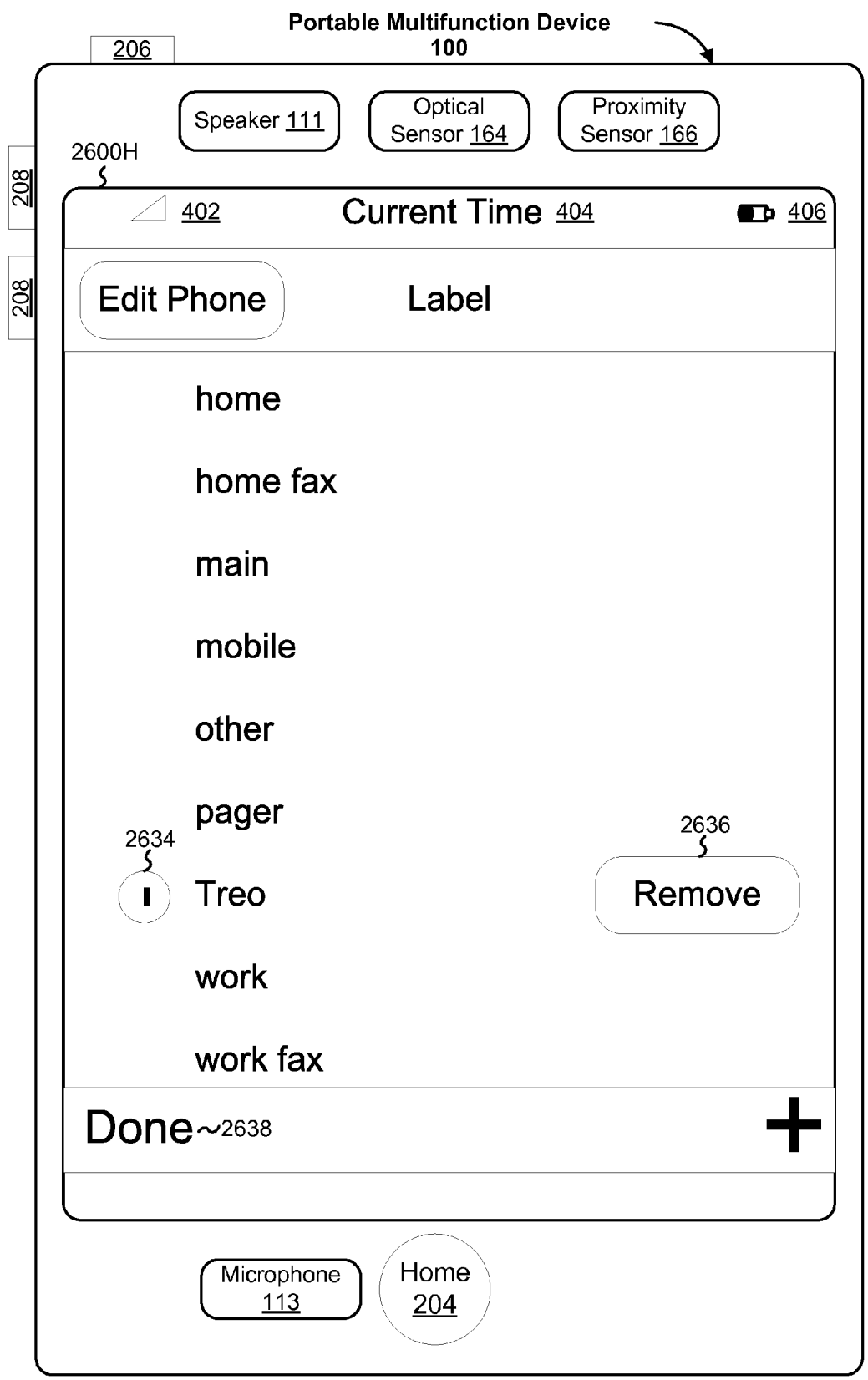
Figure 10I:
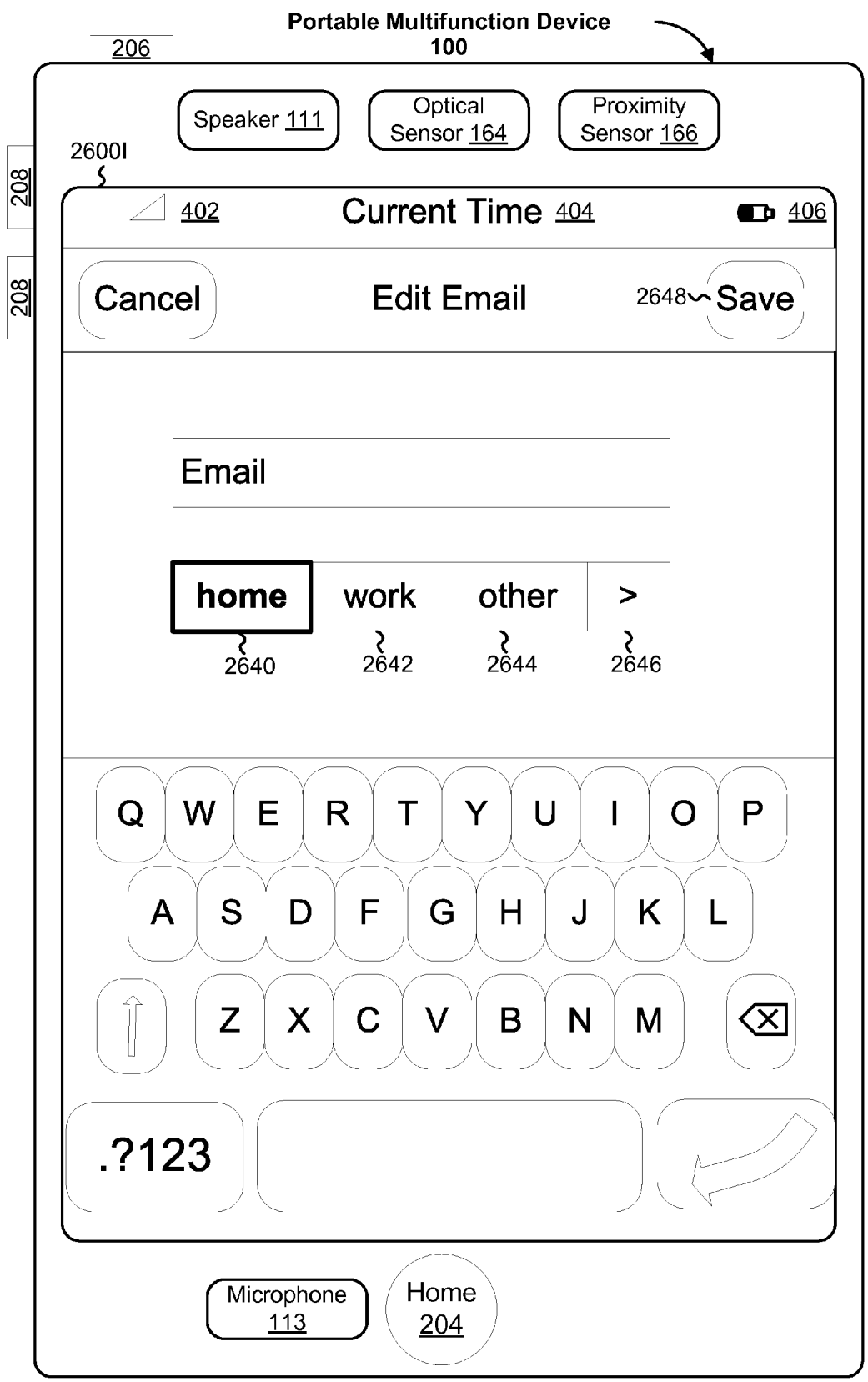

In some embodiments, in response to the user activating add new email icon 2610 (FIG. 10D) (e.g., by a finger tap on the icon or on the row containing the icon), the touch screen displays a user interface for editing the email address(es) of the contact (e.g., UI 2600I, FIG. 10I).

In some embodiments, in response to the user entering the email address (e.g., via keyboard 616 in UI 2600I, FIG. 10I); specifying the type of email address (e.g., by a tap or other predefined gesture on home icon 2640, work icon 2642, or other icon 2644); and activating the save icon 2648 (e.g., by a finger tap on the icon), the contacts module creates an email address for the corresponding contact.

In some embodiments, the user can select additional email address types by activating selection icon 2646; add custom email address types, and/or delete email address types using processes and UIs analogous to those described for phone number types (FIGS. 10F-10H).

Figure 10J:
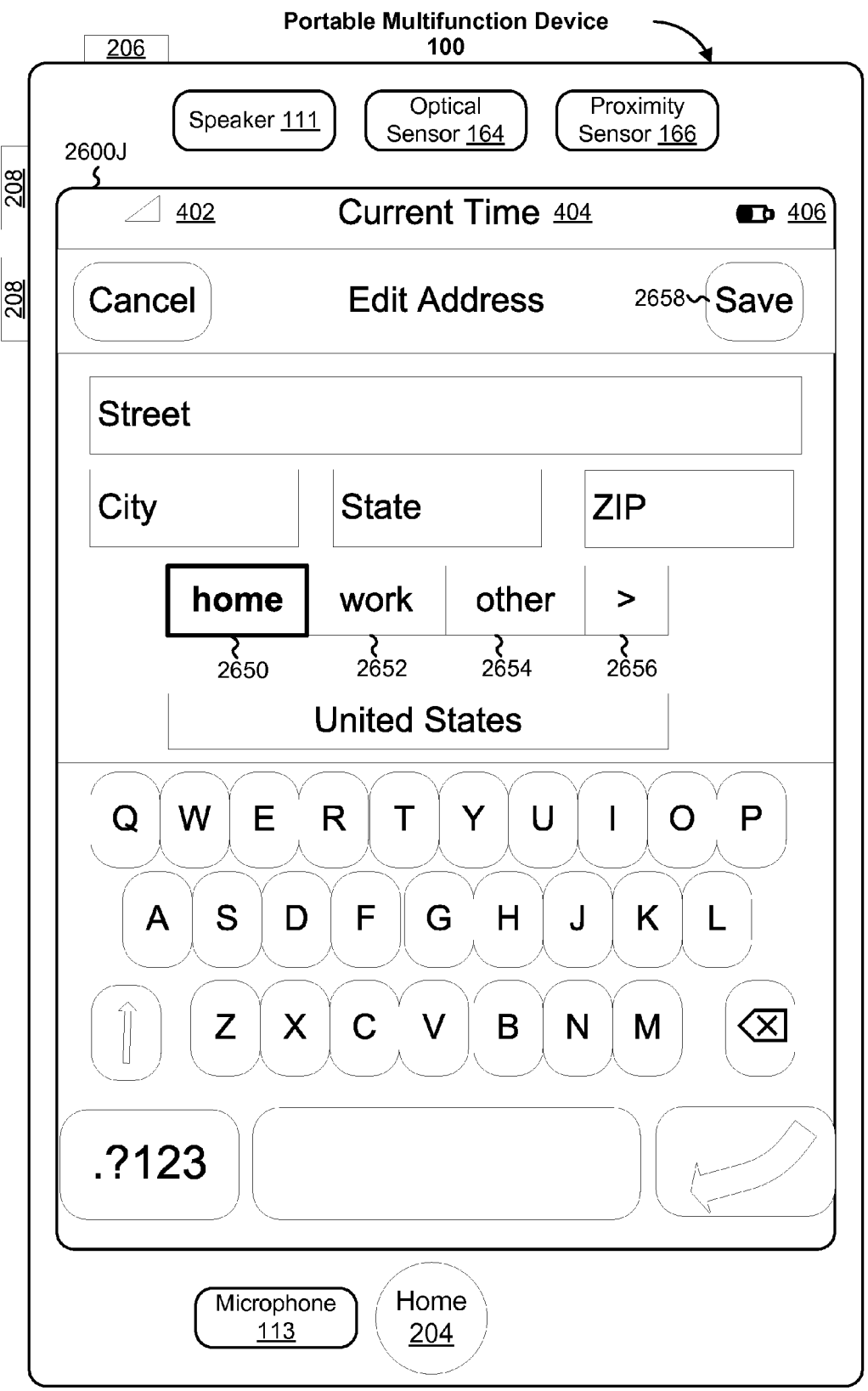

In some embodiments, in response to the user activating add new address icon 2612 (FIG. 10D) (e.g., by a finger tap on the icon or on the row containing the icon), the touch screen displays a user interface for editing the physical address(es) of the contact (e.g., UI 2600J, FIG. 10J).

In some embodiments, in response to the user entering the address (e.g., via keyboard 616 in UI 2600J, FIG. 10J); specifying the type of address (e.g., by a tap or other predefined gesture on home icon 2650, work icon 2652, or other icon 2654); and activating the save icon 2658 (e.g., by a finger tap on the icon), the contacts module creates an address for the corresponding contact.

In some embodiments, the user can select additional address types by activating selection icon 2656; add custom address types, and/or delete address types using processes and UIs analogous to those described for phone number types (FIGS. 10F-10H).

Figure 10K:
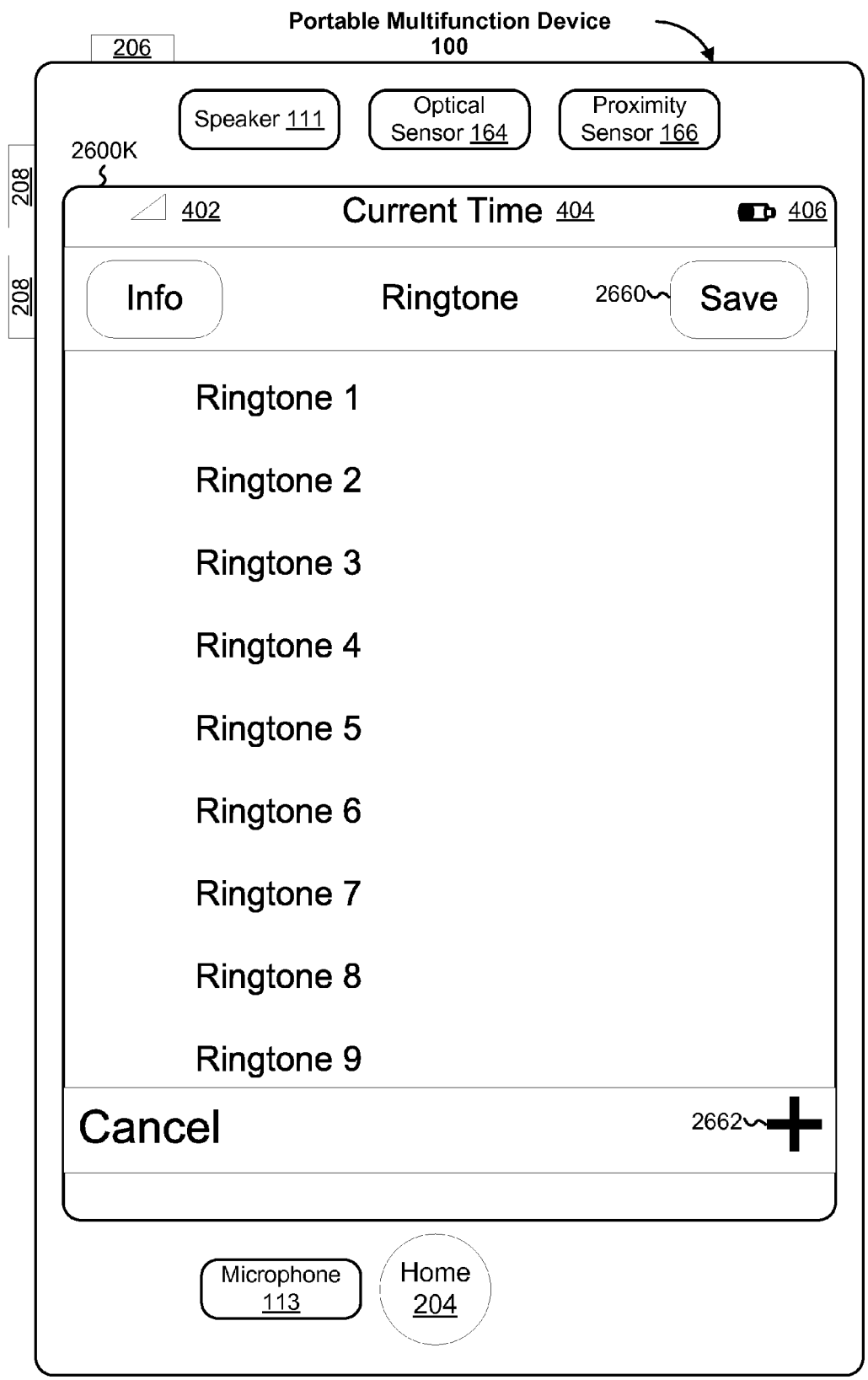

In some embodiments, in response to the user activating add new ringtone icon 2614 (FIG. 10D) (e.g., by a finger tap on the icon or on the row containing the icon), the touch screen displays a user interface for selecting ringtones (e.g., UI 2600K, FIG. 10K).

In some embodiments, in response to the user selecting a ringtone (e.g., by tap or other predefined gesture on the ringtone or the row containing the ringtone) and activating the save icon 2660 (e.g., by a finger tap on the icon), the contacts module assigns a ringtone to the corresponding contact.

In some embodiments, the user can add new ringtones by activating add icon 2662.

In some embodiments, a thumbnail image or other graphic 2616 (FIG. 10D) can be added for the contact.

Figure 10L:
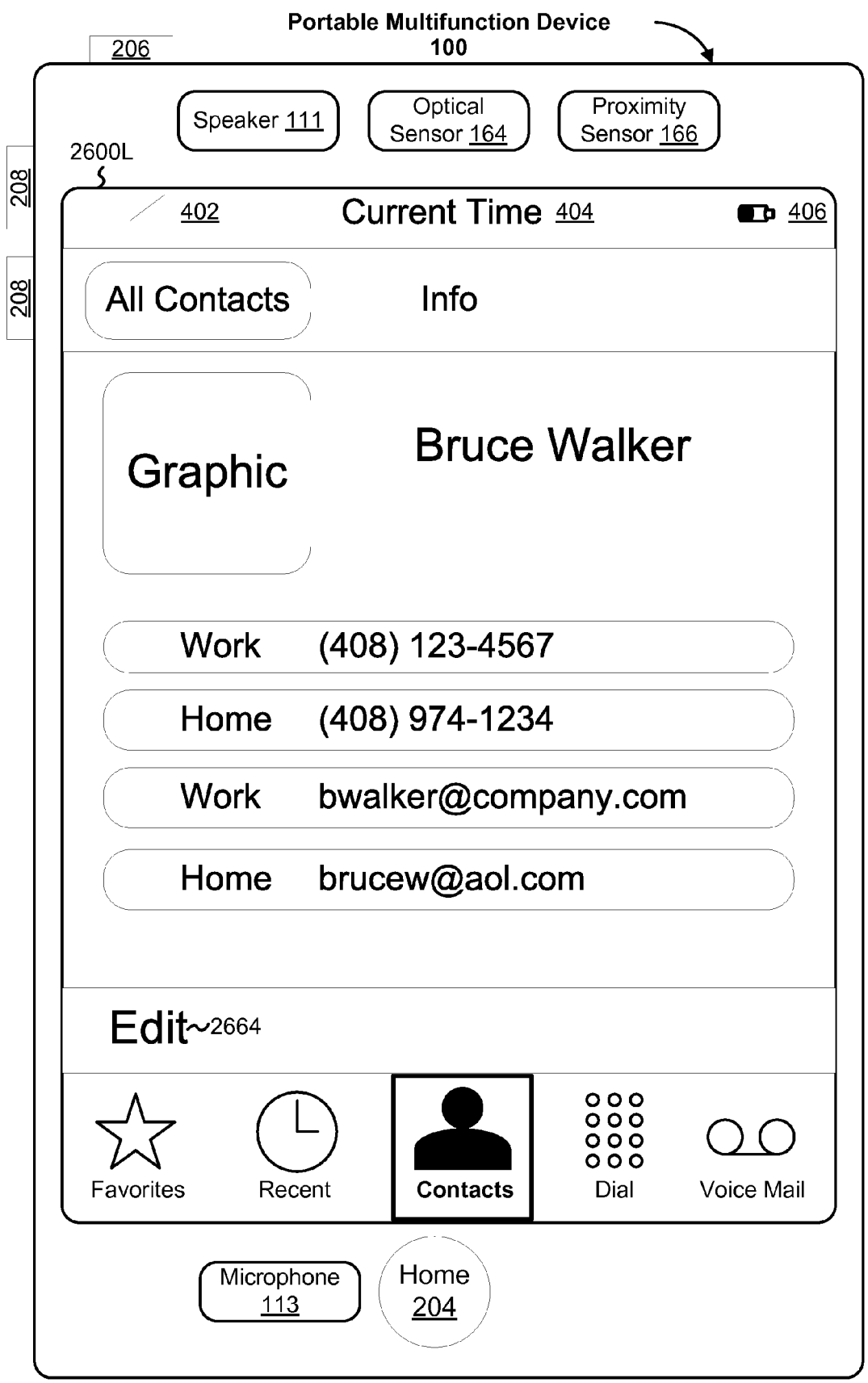
Figure 10M:
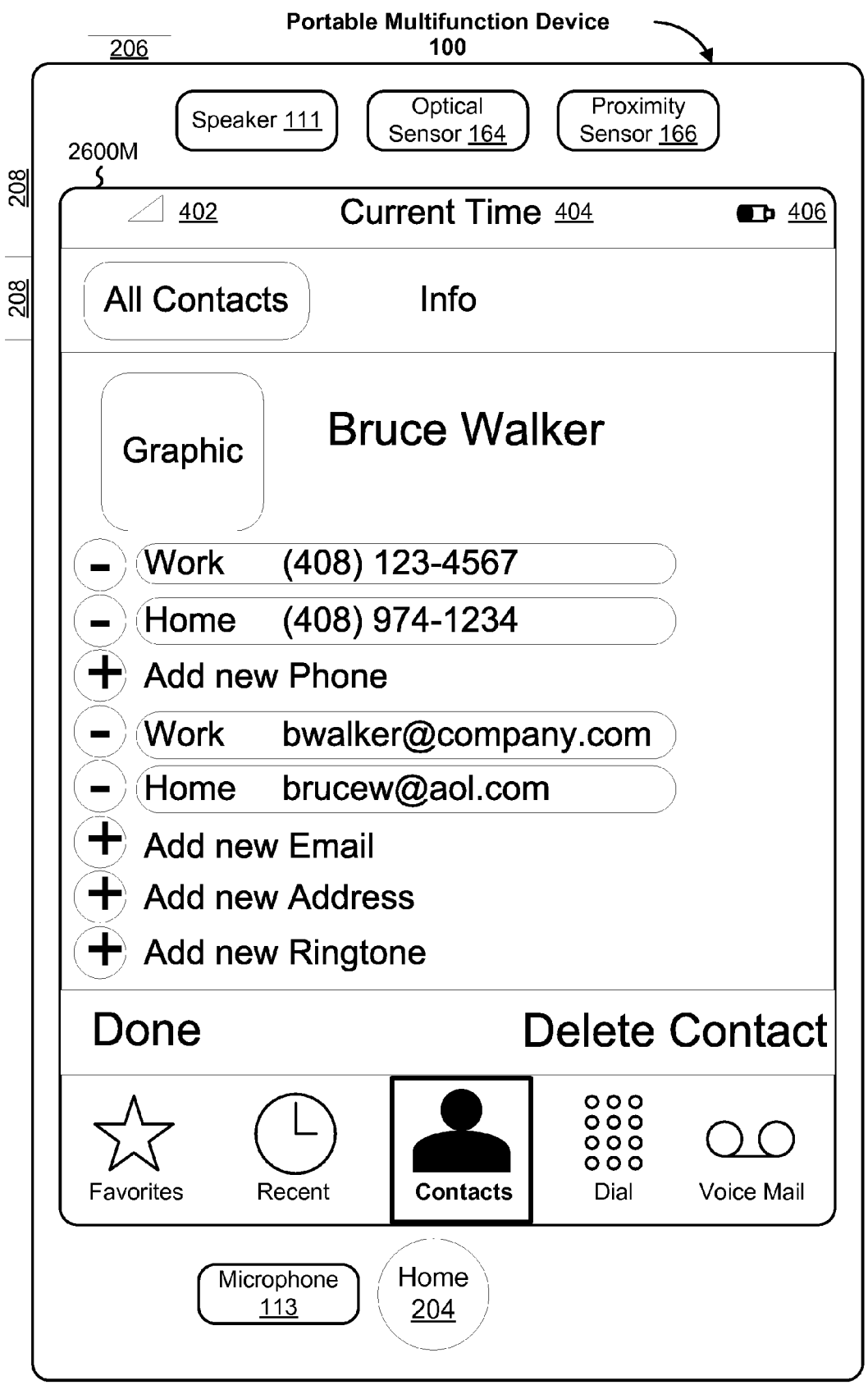

FIG. 10L illustrates an exemplary user interface for an existing contact list entry in accordance with some embodiments. In response to the user selecting edit icon 2664 (e.g., by a finger tap on the icon), the touch screen displays a user interface for editing the contact (e.g., UI 2600M, FIG. 10M). In response to user selections, the contact list module may delete one or more items of existing contact information, add new phone numbers, add new email addresses, add new physical addresses, and/or add new ringtones using the processes and UIs described above (e.g., FIGS. 10E-10K).

Figure 11A:
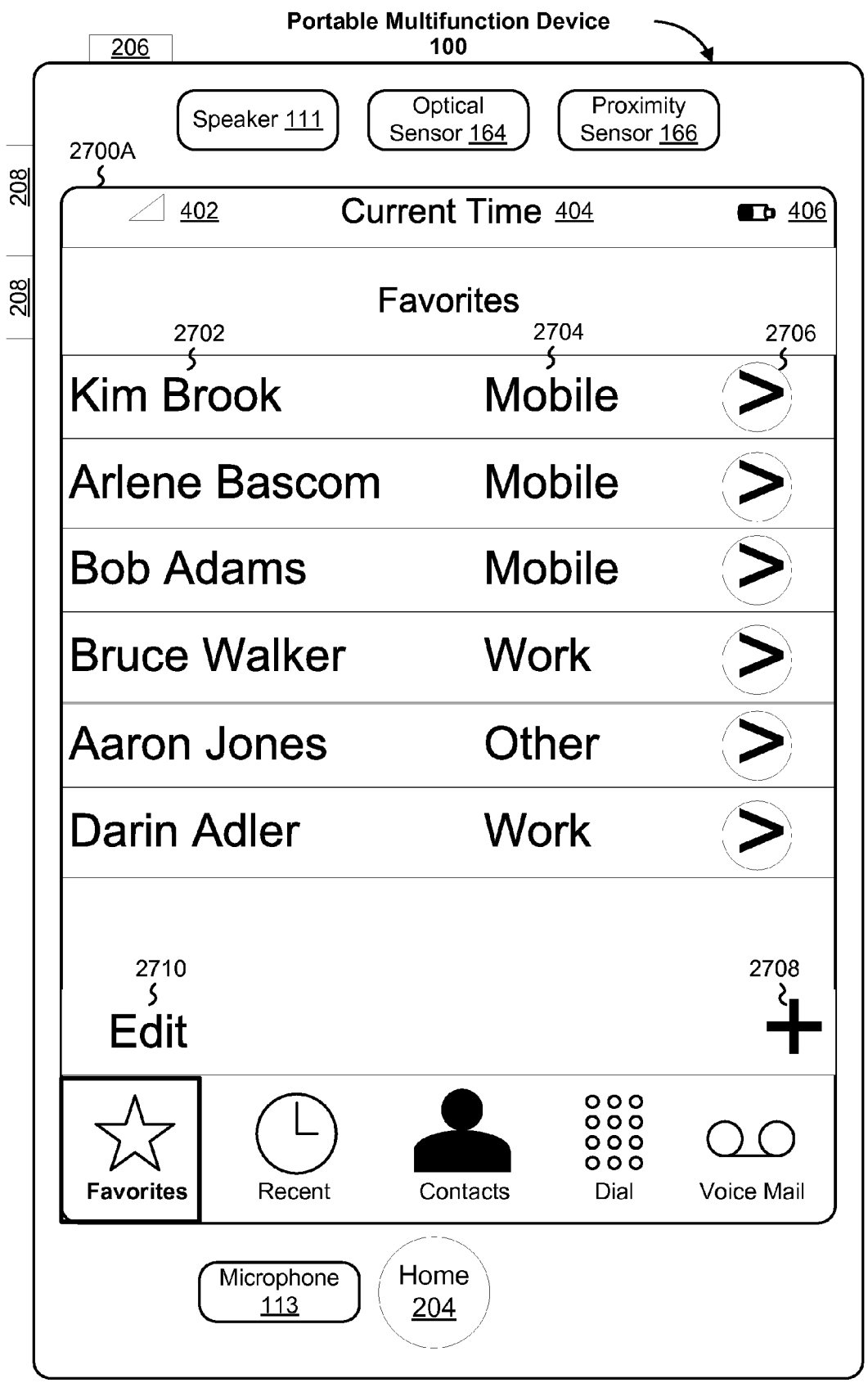
FIGS. 11A-11C illustrate an exemplary user interface for displaying and managing favorite contacts in accordance with some embodiments.
Figure 11B:
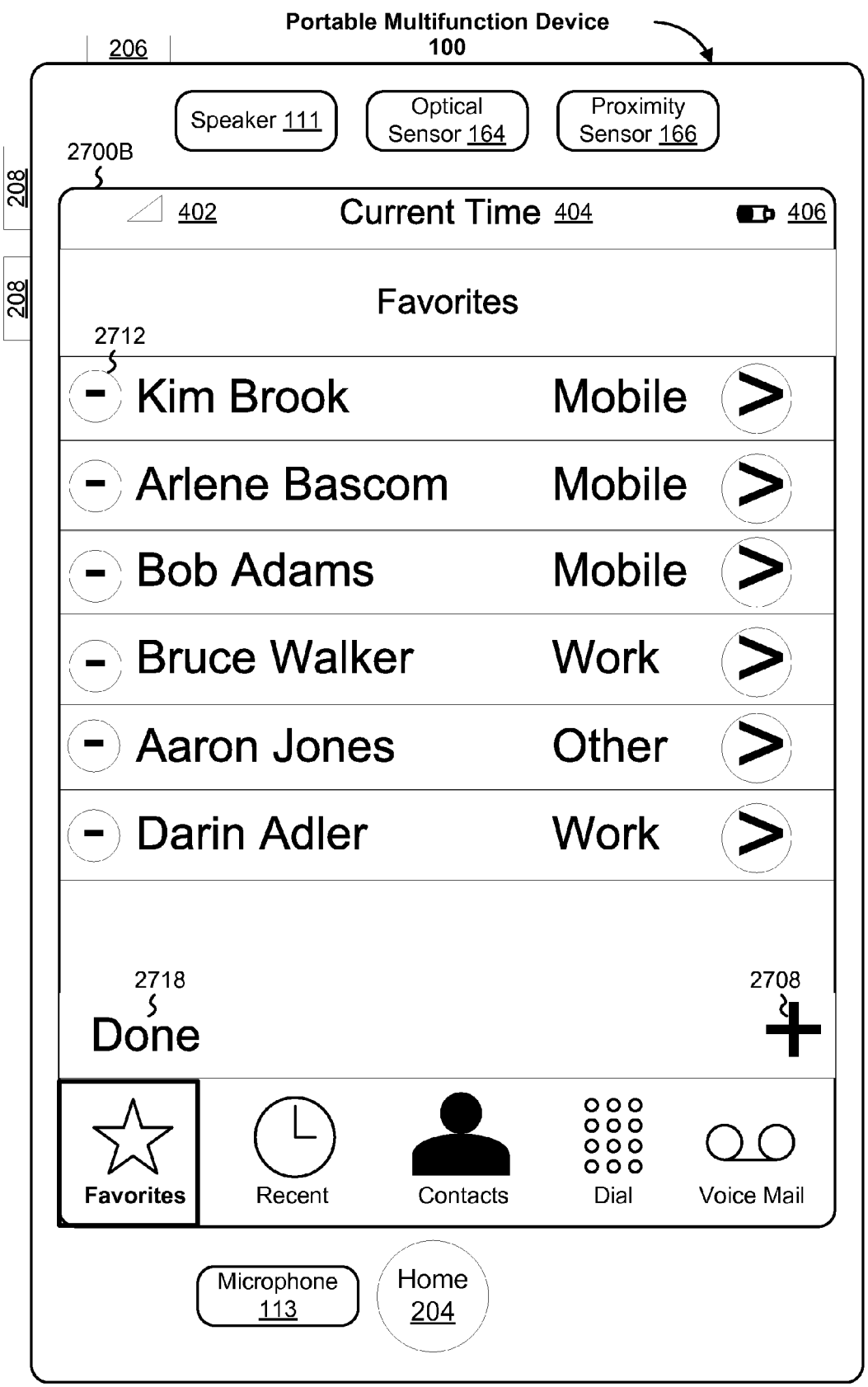
Figure 11C:
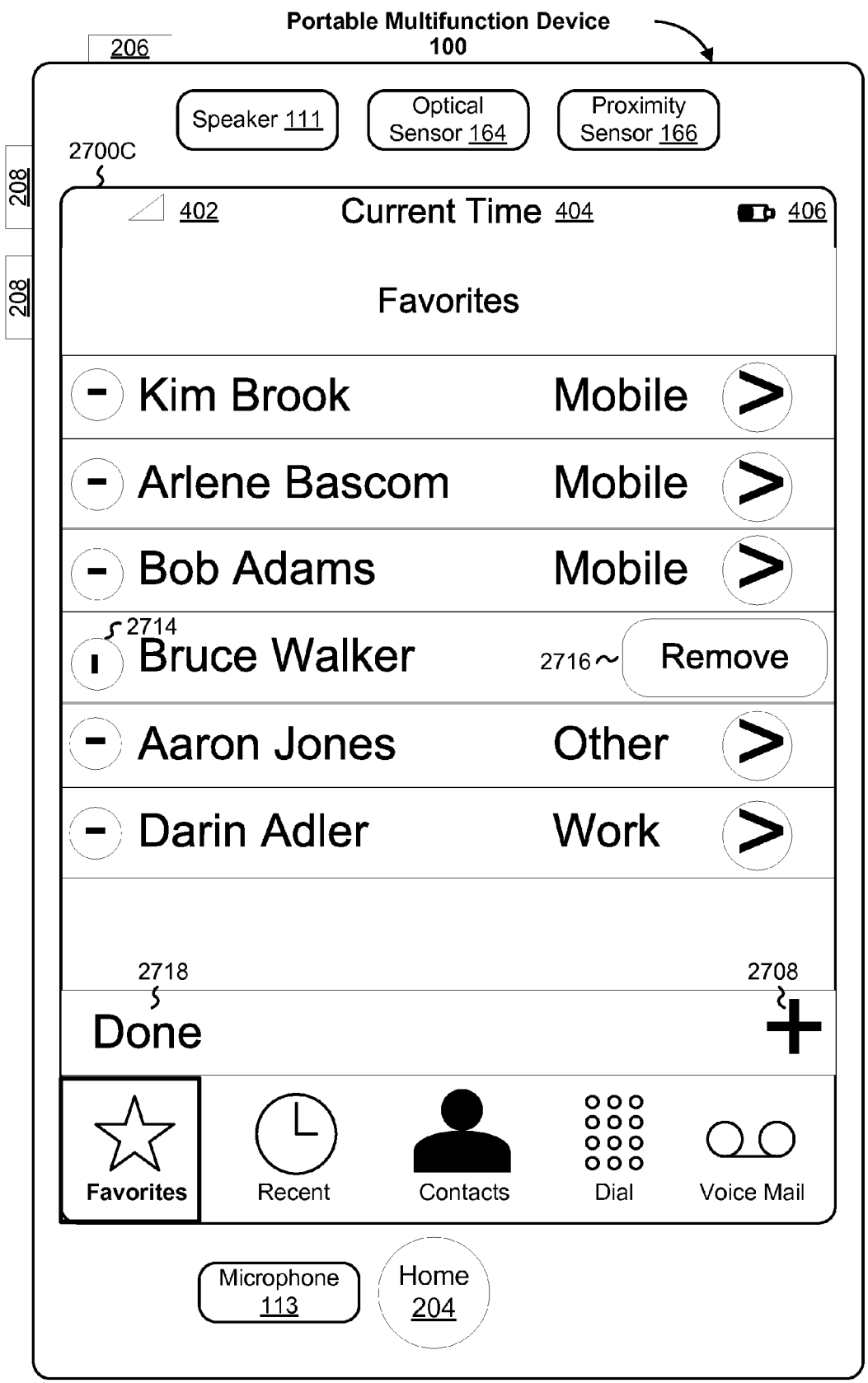

FIGS. 11A-11C illustrate an exemplary user interface for displaying and managing favorite contacts in accordance with some embodiments. UI 2700A (FIG. 11A) displays an exemplary list of favorites. In some embodiments, each row in the list that corresponds to a favorite includes: the name 2702 of the favorite, the type of phone number 2704 for the favorite that will be called, and an additional information icon 2706. In some embodiments, in response to the user activating icon 2706 for a particular favorite (e.g., by a finger tap on the icon), the touch screen displays the corresponding contact list entry for that favorite (e.g., UI 2600L, FIG. 10L). In some embodiments, in response to a user tap or other predefined gesture elsewhere (i.e., a tap or gesture other than on icon 2702) in the row corresponding to a particular favorite, the phone module dials the corresponding phone number 2704 for that particular favorite.

In some embodiments, in response to the user activating add favorite icon 2708 (e.g., by a finger tap on the icon), the device displays the user's contact list, from which the user selects the contact list entry for a new favorite and a phone number in the entry for the new favorite.

In response to the user activating the edit icon 2710 (e.g., by a finger tap on the icon), the touch screen displays a delete icon 2712 next to the favorites (e.g., UI 2700B, FIG. 11B). If a user activates a delete icon (e.g., by tapping it with a finger), the icon may rotate 90 degrees (e.g., 2714, FIG. 11C) or otherwise change its appearance and/or a second icon may appear (e.g., remove icon 2716, FIG. 11C). If the user activates the second icon, the corresponding favorite is deleted. This deletion process is analogous to the process described above with respect to FIGS. 7, 10G and 10H. As noted above, a deletion process that requires multiple gestures by the user on different parts of the touch screen (e.g., delete icon 2714 and remove icon 2716 are on opposite sides of the touch screen in UI 2700C) greatly reduces the chance that a user will accidentally delete a favorite or other similar item. The user activates the done icon 2718 (e.g., by tapping on it with a finger) when the user has finished deleting favorites and the device returns to UI 2700A.

FIGS. 12A-12D illustrate an exemplary user interface for displaying and managing recent calls in accordance with some embodiments.

Figure 12A:
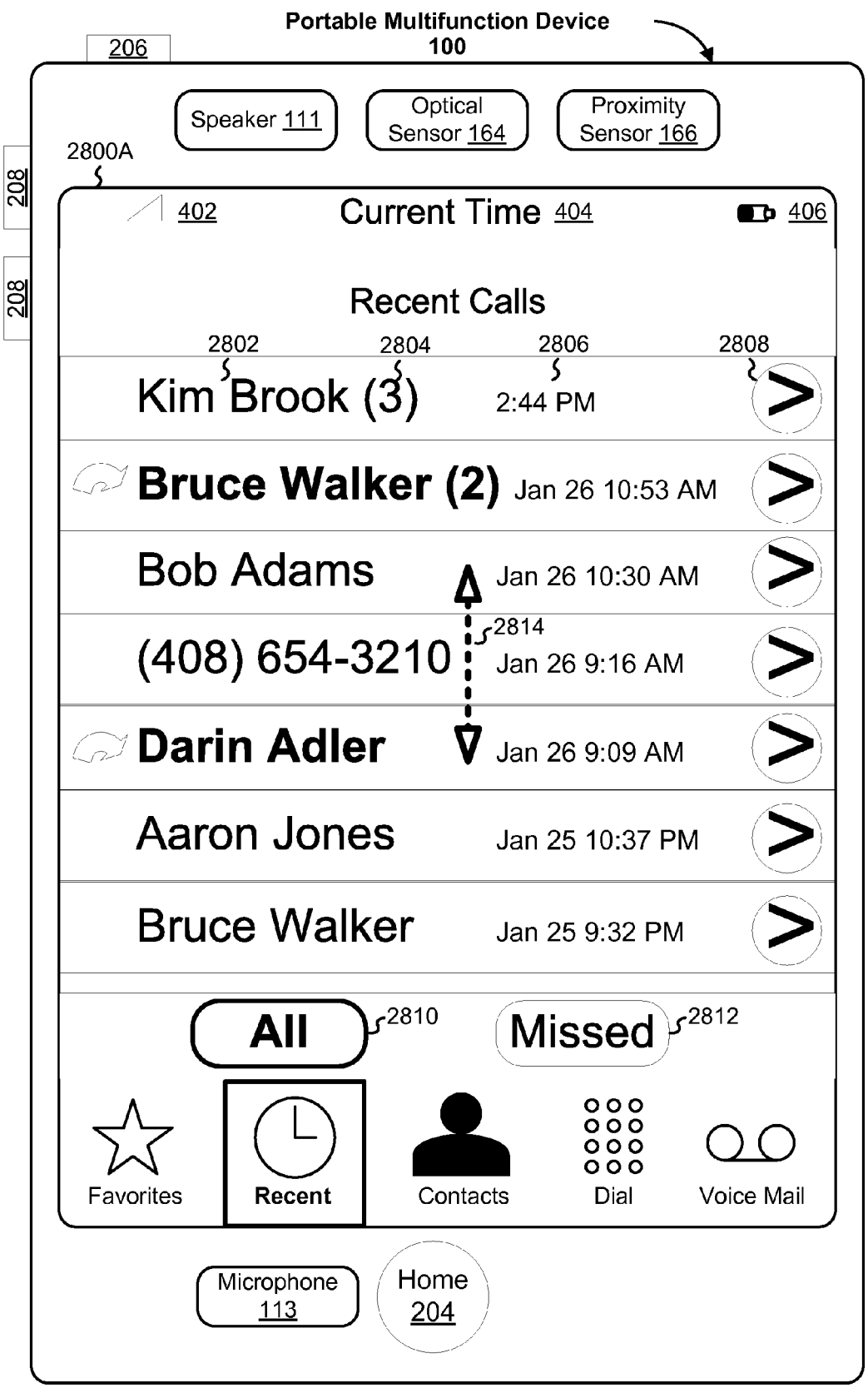
FIGS. 12A-12D illustrate an exemplary user interface for displaying and managing recent calls in accordance with some embodiments.

In some embodiments, in response to the user activating All icon 2810, the touch screen displays a list of all recent calls (e.g., UI 2800A, FIG. 12A). In some embodiments, in response to the user activating Missed icon 2812, the touch screen displays a list of recent missed calls (e.g., UI 2800B, FIG. 12B). The handling of missed calls is described further below with reference to FIGS. 23-25. The handling of telephone call information including recent calls is described further below with reference to FIGS. 26-27.

In some embodiments, each row in a list corresponds to a call or a consecutive sequence of calls involving the same person or the same number (without an intervening call involving another person or another phone number). In some embodiments, each row includes: the name 2802 of the other party (if available via the contact module) or the phone number (if the name of the other party is not available); the number 2804 of consecutive calls (in an exemplary embodiment, number 2804 is not displayed if the number of consecutive calls is equal to one); the date and/or time 2806 of the last call; and an additional information icon 2808. In some embodiments, in response to the user activating icon 2808 for a particular row (e.g., by a finger tap on the icon), the touch screen displays the corresponding contact list entry for the other party (e.g., UI 2800C, FIG. 12C) or UI 2800D (FIG. 12D) if the phone number cannot be associated with an entry in the user's contact list. In some embodiments, in response to a user tap or other predefined gesture elsewhere (i.e., a tap or gesture other than on icon 2808) in a given row, the phone module dials the corresponding phone number for that row.

In some embodiments, some rows may include icons indicating whether the last call associated with the row was missed or answered.

If the list of recent calls fills more than the screen area, the user may scroll through the list using vertically upward and/or vertically downward gestures 2814 on the touch screen.

In some embodiments, UI 2800C highlights (e.g., with color, shading, and/or bolding) the phone number associated with the recent call (e.g., the two recent incoming calls from Bruce Walker in UI 2800A came from Bruce Walker's work number 2816). In some embodiments, in response to a user tap or other predefined gesture on the highlighted number 2816, the phone module dials the highlighted number (e.g., 2816). In some embodiments, in response to a user tap or other predefined gesture on another number in the contact list entry (e.g., home number 2818), the phone module dials the corresponding number. In some embodiments, in response to a user tap or other predefined gesture on an email address in the contact list entry (e.g., either work email 2820 or home email 2822), the mail module prepares an email message with the selected email address, ready for text input by the user. In some embodiments, in response to a user tap or other predefined gesture on an instant message object corresponding to a telephone number (not shown), the instant message module prepares an instant message to the corresponding telephone number, ready for text input by the user. Thus, by selecting icon 2808 (FIG. 12A) in the Recent Calls UI 2800C, the user may easily respond to a caller using the same number involved in the previous call (e.g., 2816), another number associated with the same caller (e.g., 2818), or another mode of communication besides the phone (e.g., an email to the caller's work 2820 or home 2822 email address).

In some embodiments, UI 2800D provides one or more options for a user to make use of a phone number in a recent call that is not associated with an entry in the user's contact list. In some embodiments, in response to a tap or other predefined user gesture, the device may: call the phone number (e.g., if the gesture is applied to icon 2824); create a new contact with the phone number (e.g., if the gesture is applied to icon 2826); add the phone number to an existing contact (e.g., if the gesture is applied to icon 2828); or check the call history associated with the number (e.g., if the gesture is applied to icon 2830).

Figure 13:
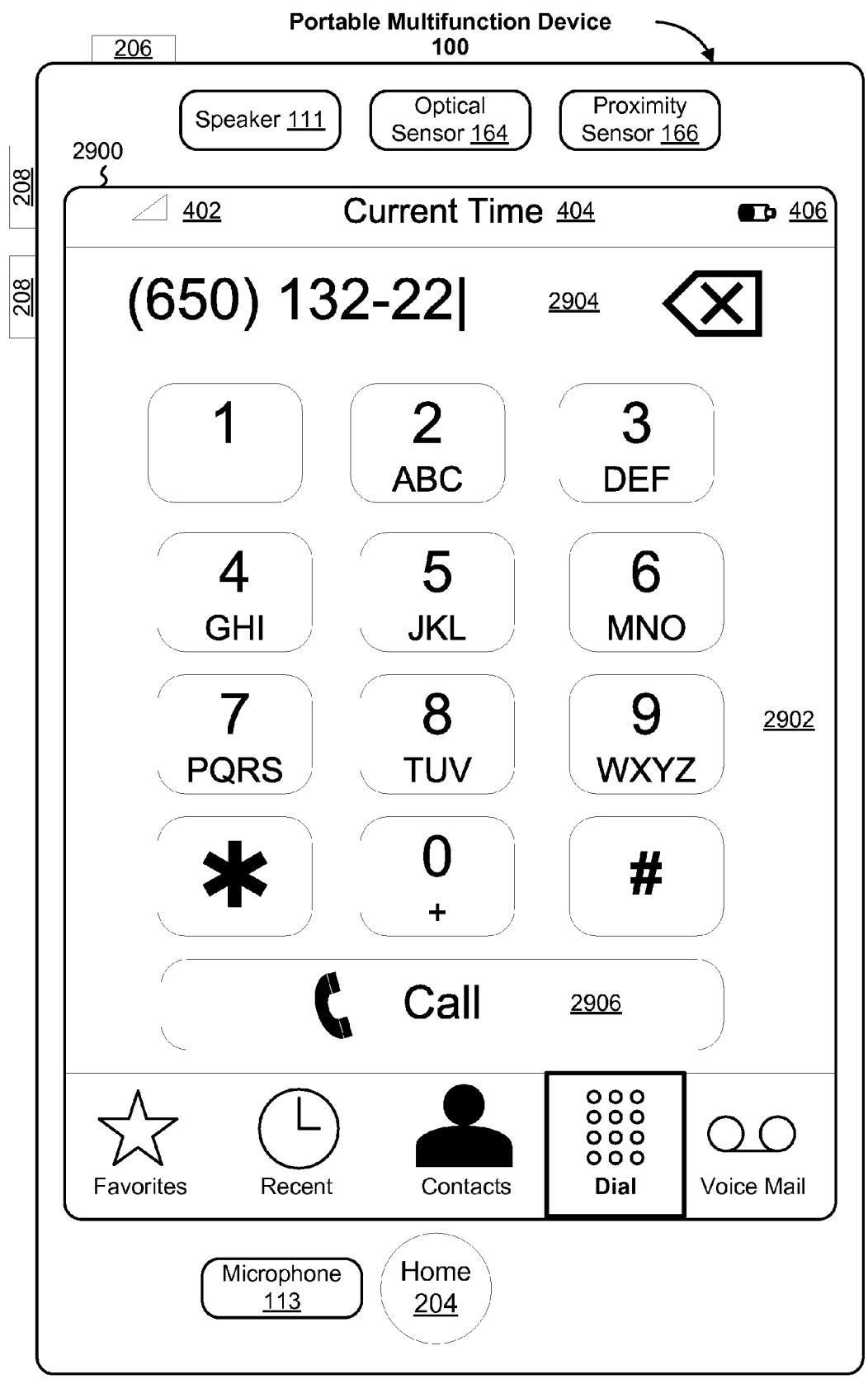
FIG. 13 illustrates an exemplary dial pad interface for calling in accordance with some embodiments.
Figure 14A:
FIGS. 14A-14D illustrate exemplary user interfaces displayed during a call in accordance with some embodiments.
Figure 14B:
Figure 14C:
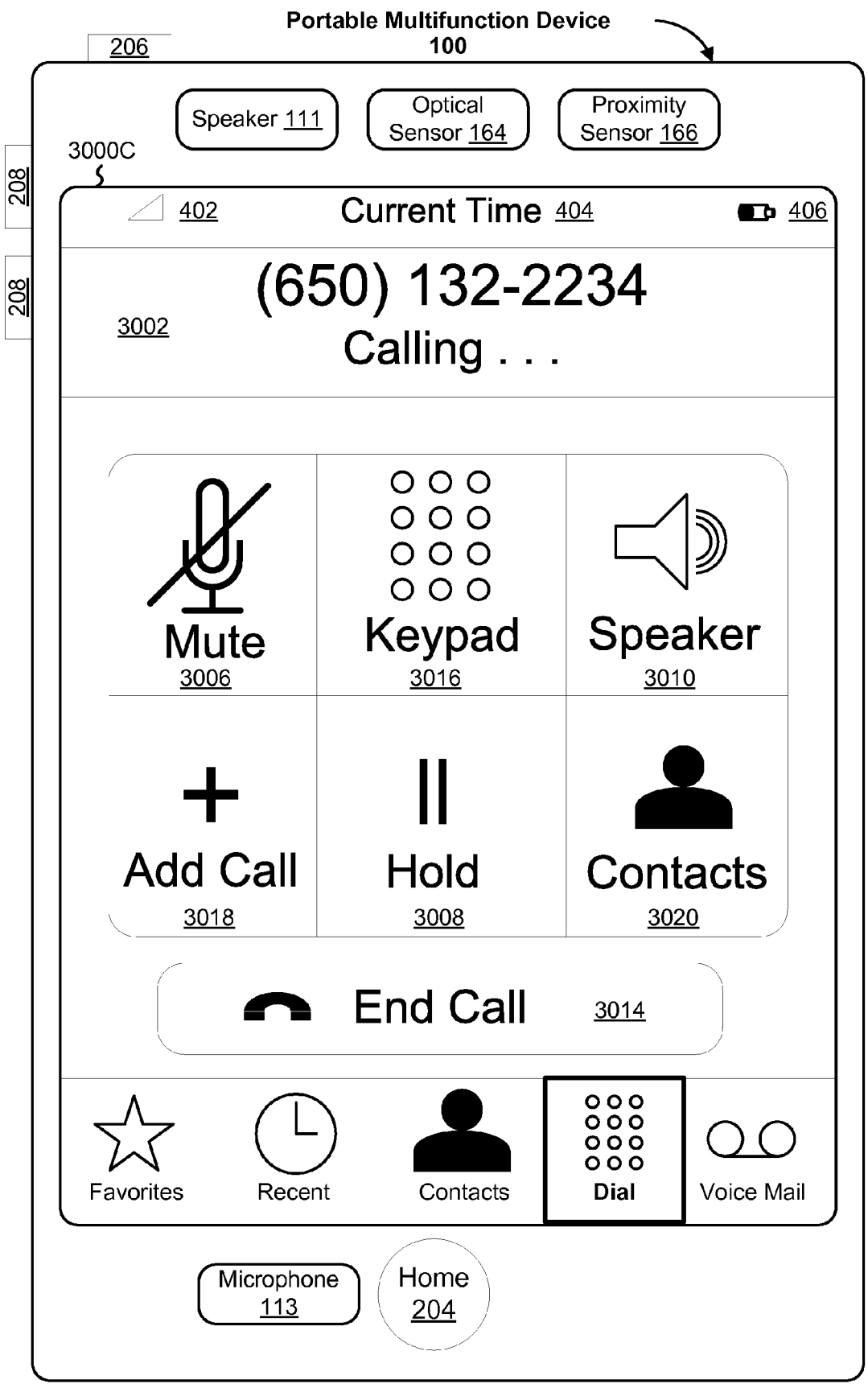
Figure 14D:
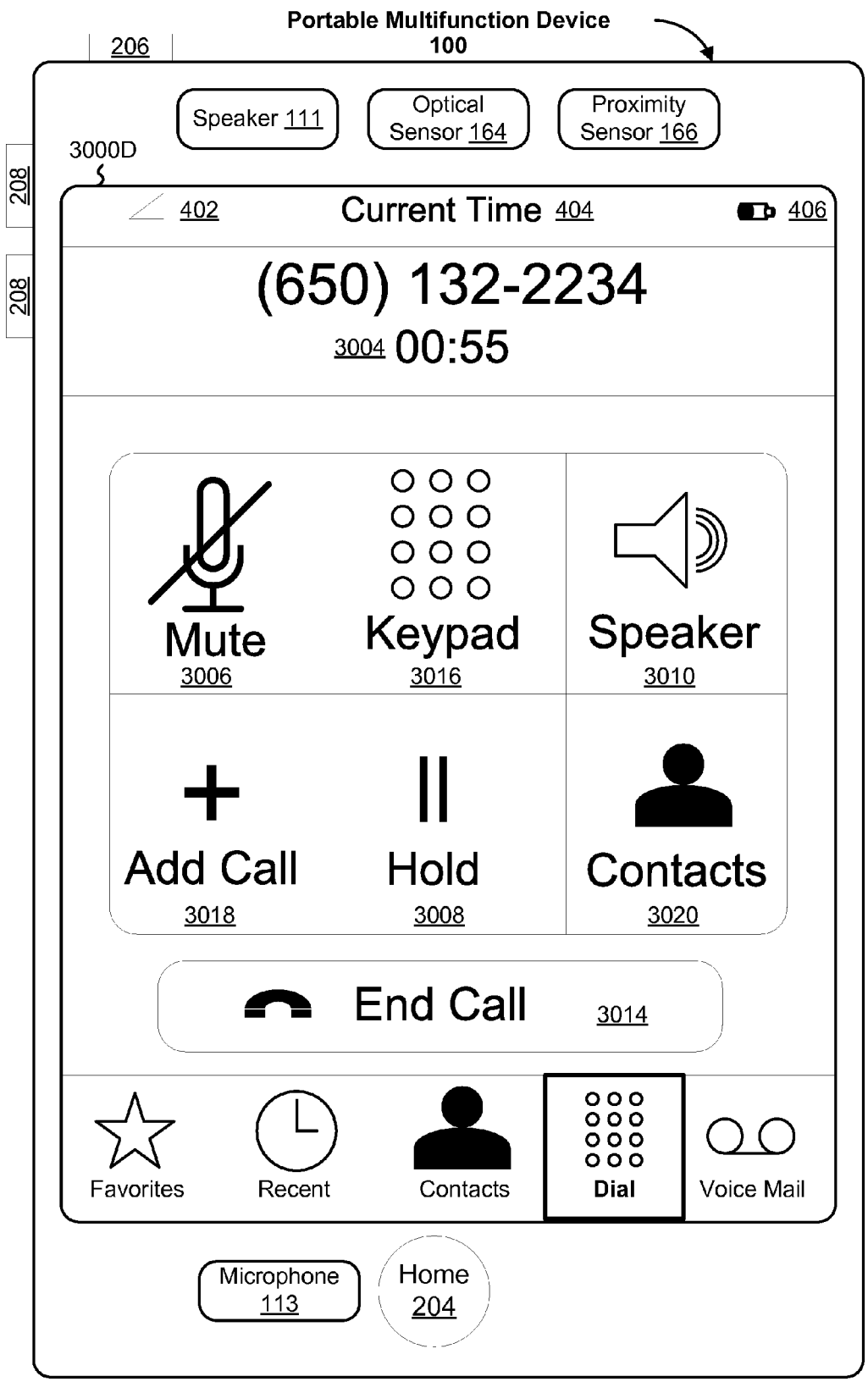

FIG. 13 illustrates an exemplary dial pad interface for calling in accordance with some embodiments. In response to the user activating the number keys in dial pad 2902 (e.g., by finger taps on the number icons), the touch pad displays the selected digits 2904. In some embodiments, the phone module automatically adds the parentheses and dashes to the selected digits to make the number easier to read. In response to the user activating the call icon 2906, the phone module dials or transmits the selected digits.

FIGS. 14A-14D illustrate exemplary user interfaces displayed during a call in accordance with some embodiments. In some embodiments, the UI indicates that a call is being attempted 3002 (UI 3000A, FIG. 14A and UI 3000C, FIG. 14C) and then indicates the connection time 3004 after the connection is made (UI 3000B, FIG. 14B and UI 3000D, FIG. 14D).

Figure 29:
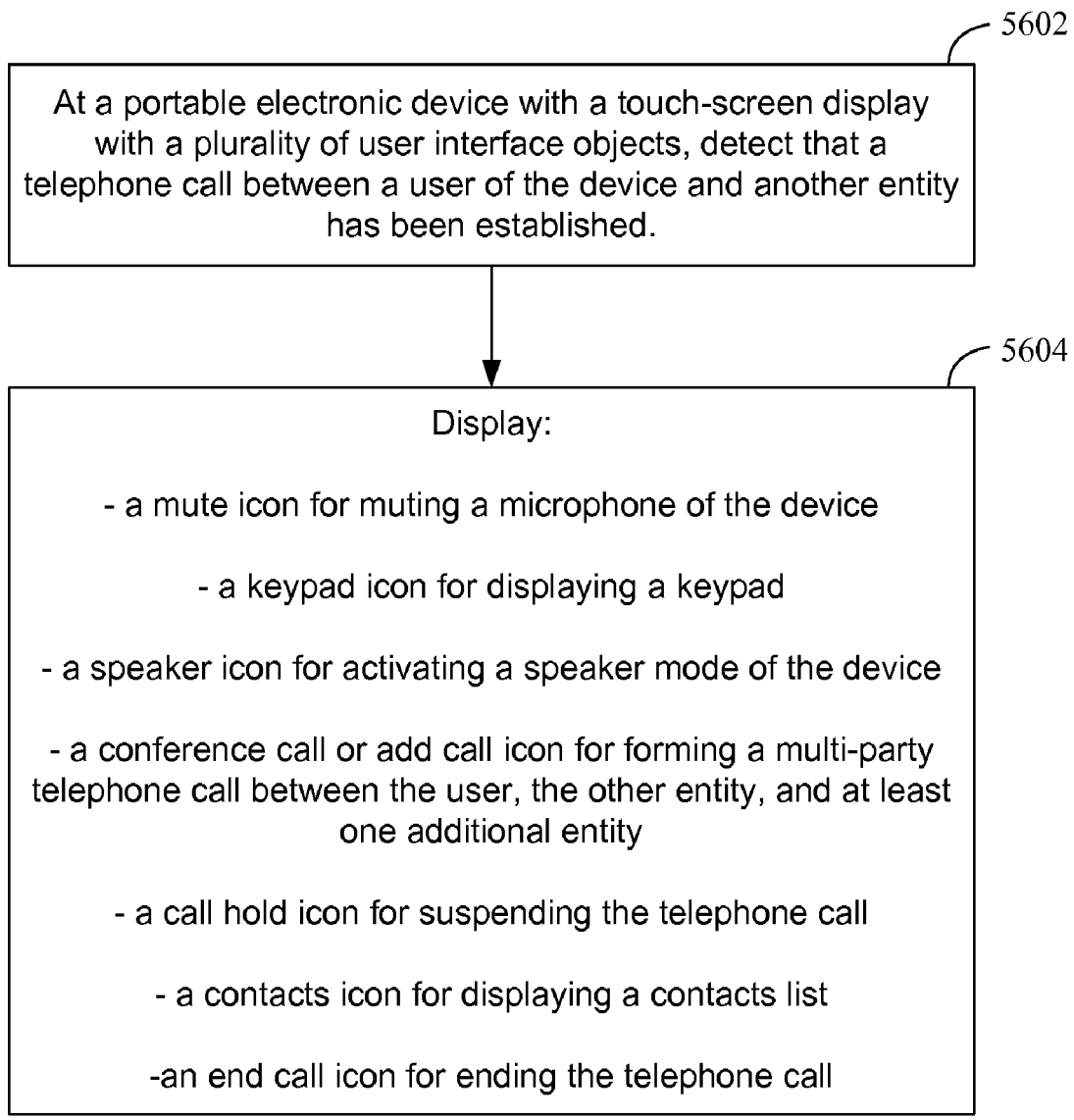
FIG. 29 is a flow diagram illustrating a process for handling established telephone calls at a portable electronic device with a touch screen display with a plurality of user interface objects in accordance with some embodiments.

In some embodiments, in response to a tap or other predefined user gesture, the device may: mute the call (e.g., if the gesture is applied to icon 3006); place the call on hold (e.g., if the gesture is applied to icon 3008); place the call on a speaker (e.g., if the gesture is applied to icon 3010); setup a conference call (e.g., if the gesture is applied to conference icon 3012, FIGS. 14A-14B or to add call icon 3018, FIGS. 14C-14D); display a keypad (e.g., if the gesture is applied to icon 3016); display a contacts list (e.g., if the gesture is applied to icon 3020); or end the call (e.g., if the gesture is applied to icon 3014). Display of corresponding items in the user interface is further described below with regard to process 5600 (FIG. 29).

Figure 15A:
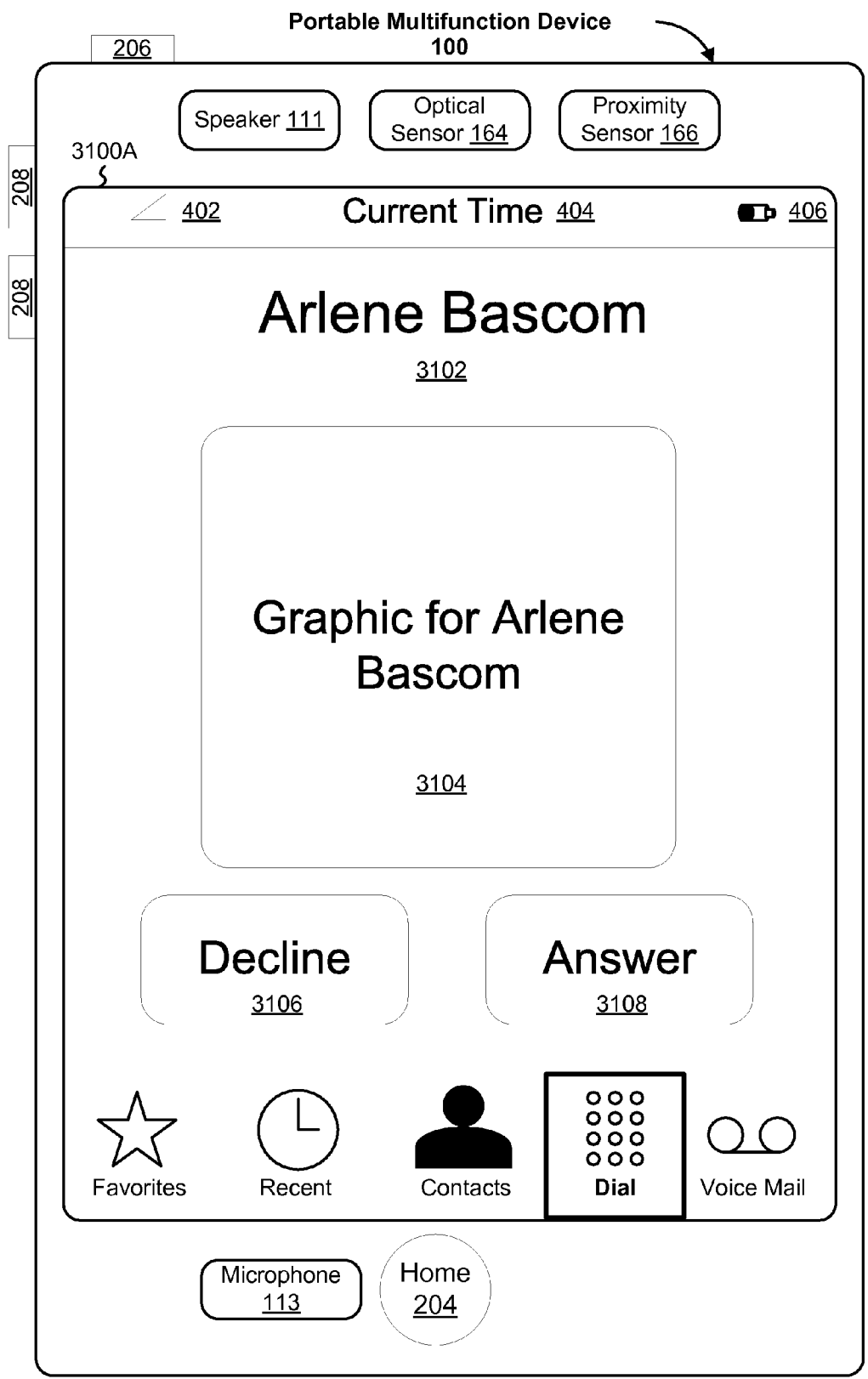
FIGS. 15A and 15B illustrate an exemplary user interface displayed during an incoming call in accordance with some embodiments.
Figure 15B:
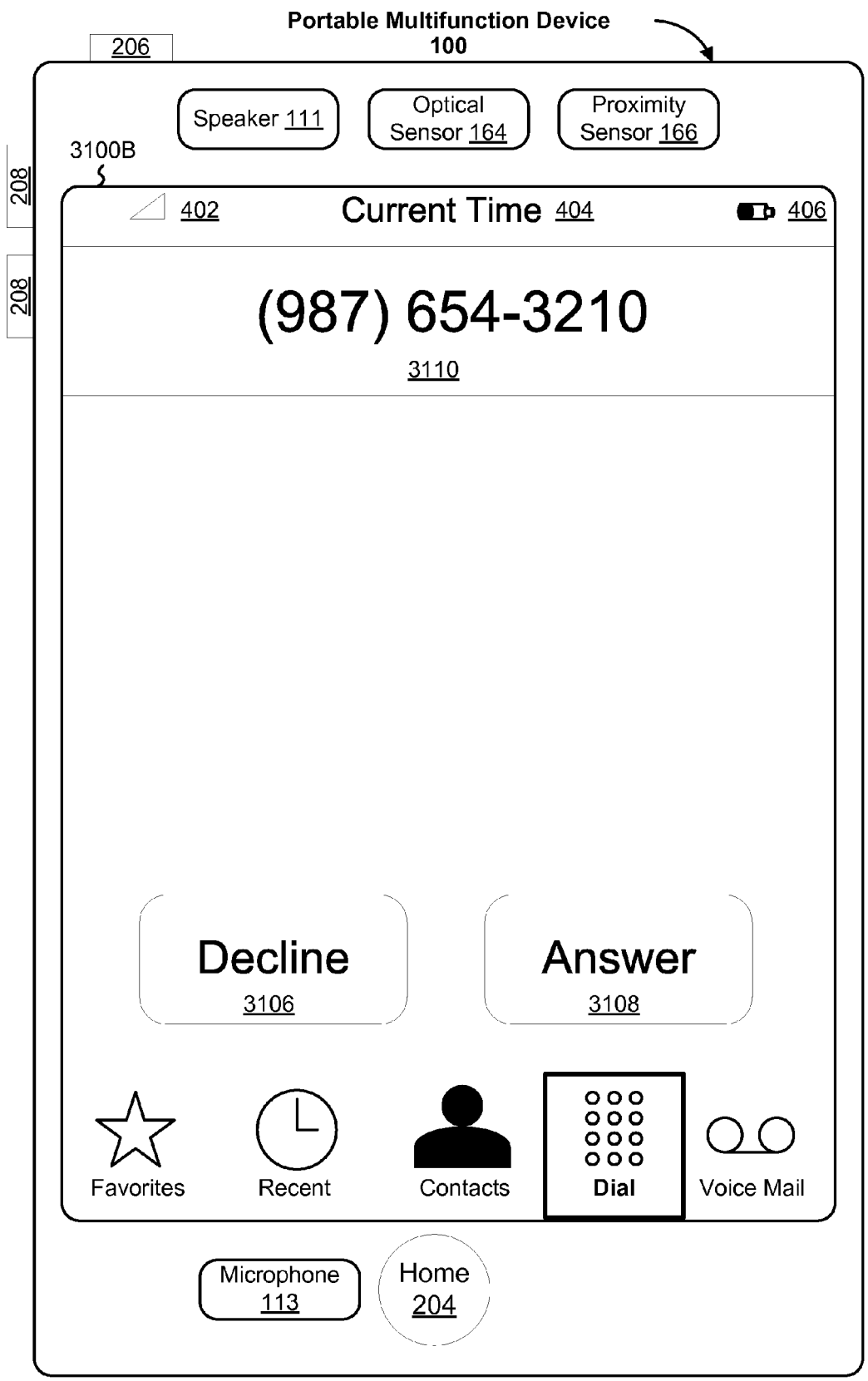

FIGS. 15A and 15B illustrate an exemplary user interface displayed during an incoming call in accordance with some embodiments.

Figure 28:
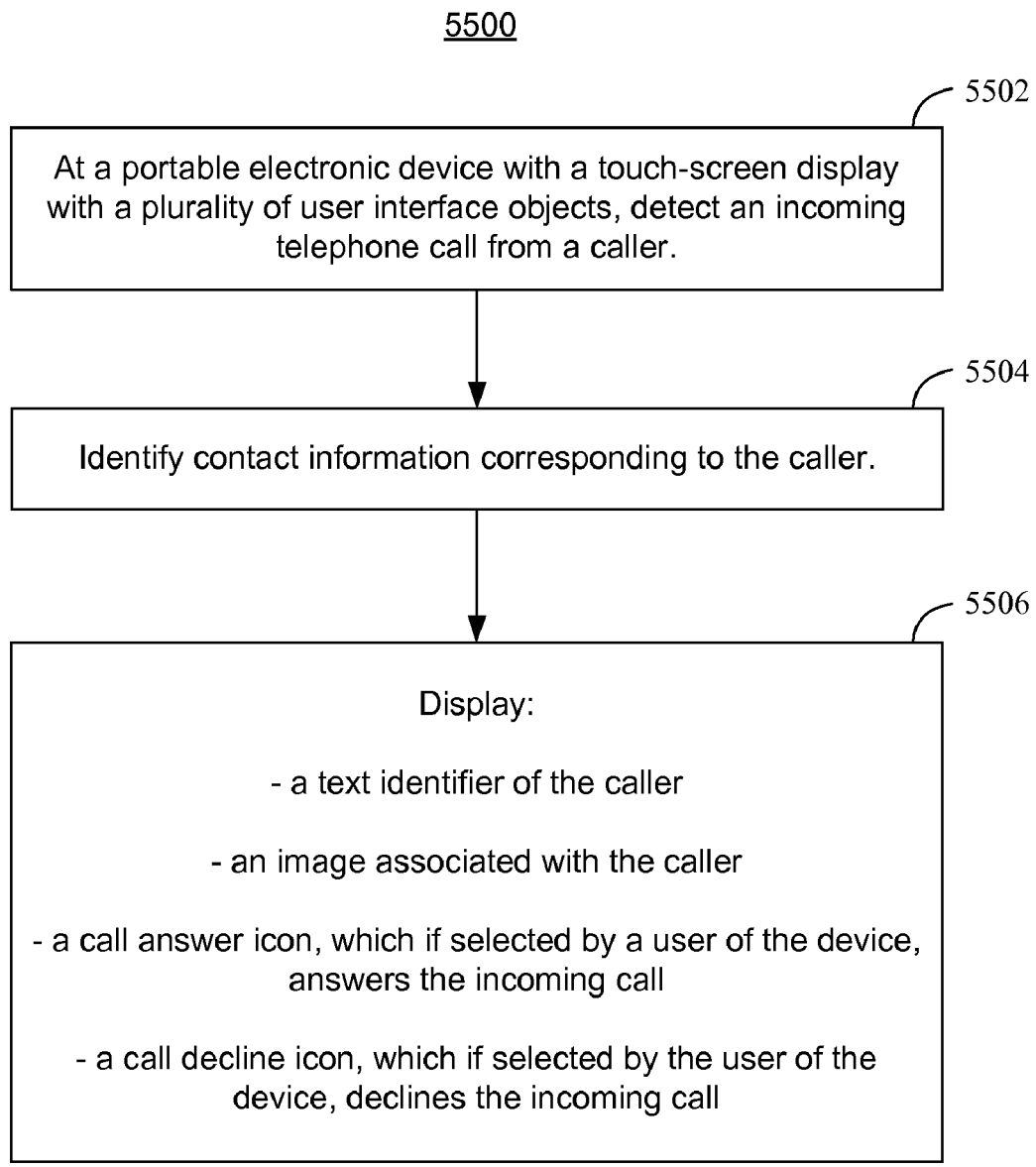
FIG. 28 is a flow diagram illustrating a process for handling incoming telephone calls at a portable electronic device with a touch screen display with a plurality of user interface objects in accordance with some embodiments.

In some embodiments, if the incoming call is from a phone number that is associated with a person or other entry in the user's contact list, then the touch screen may display: the name 3102 of the person or entry; a graphic 3104 associated with the person or entry; a Decline icon 3106 that when activated (e.g., by a finger tap on the icon) causes the phone module to decline the call and/or initiate voicemail for the call; and an answer icon 3108 that when activated (e.g., by a finger tap on the icon) causes the phone module to answer the call (e.g., UI 3100A, FIG. 15A). Display of these items is further described below with regard to process 5500 (FIG. 28).

In some embodiments, if the incoming call is from a phone number that is not associated with a person or other entry in the user's contact list, then the touch screen may display: the phone number of the other party 3110; a Decline icon 3106 that when activated (e.g., by a finger tap on the icon) causes the phone module to decline the call and/or initiate voicemail for the call; and an answer icon 3108 that when activated (e.g., by a finger tap on the icon) causes the phone module to answer the call (e.g., UI 3100B, FIG. 15B).

In some embodiments, the device pauses some other applications (e.g., the music player 146, video player, and/or slide show) when there is an incoming call; displays UI 3100A or UI 3100B prior to the call being answered; displays UI 3000B during the call; and terminates the pause on the other applications if the incoming call is declined or the call ends. In some embodiments, there is a smooth transition into and out of a pause (e.g., a smooth lowering and raising of the sound volume for the music player).

Figure 12B:
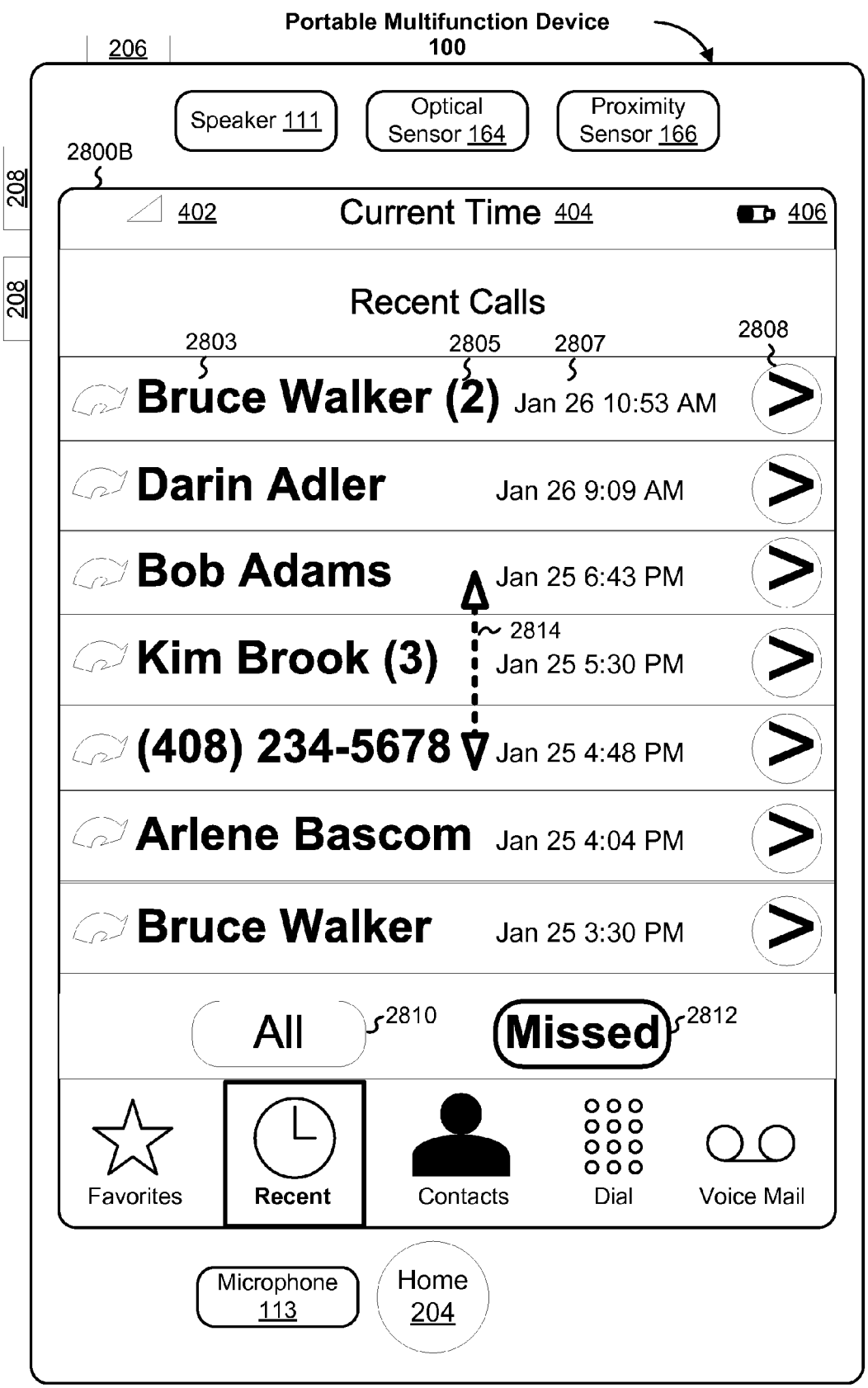
Figure 12C:
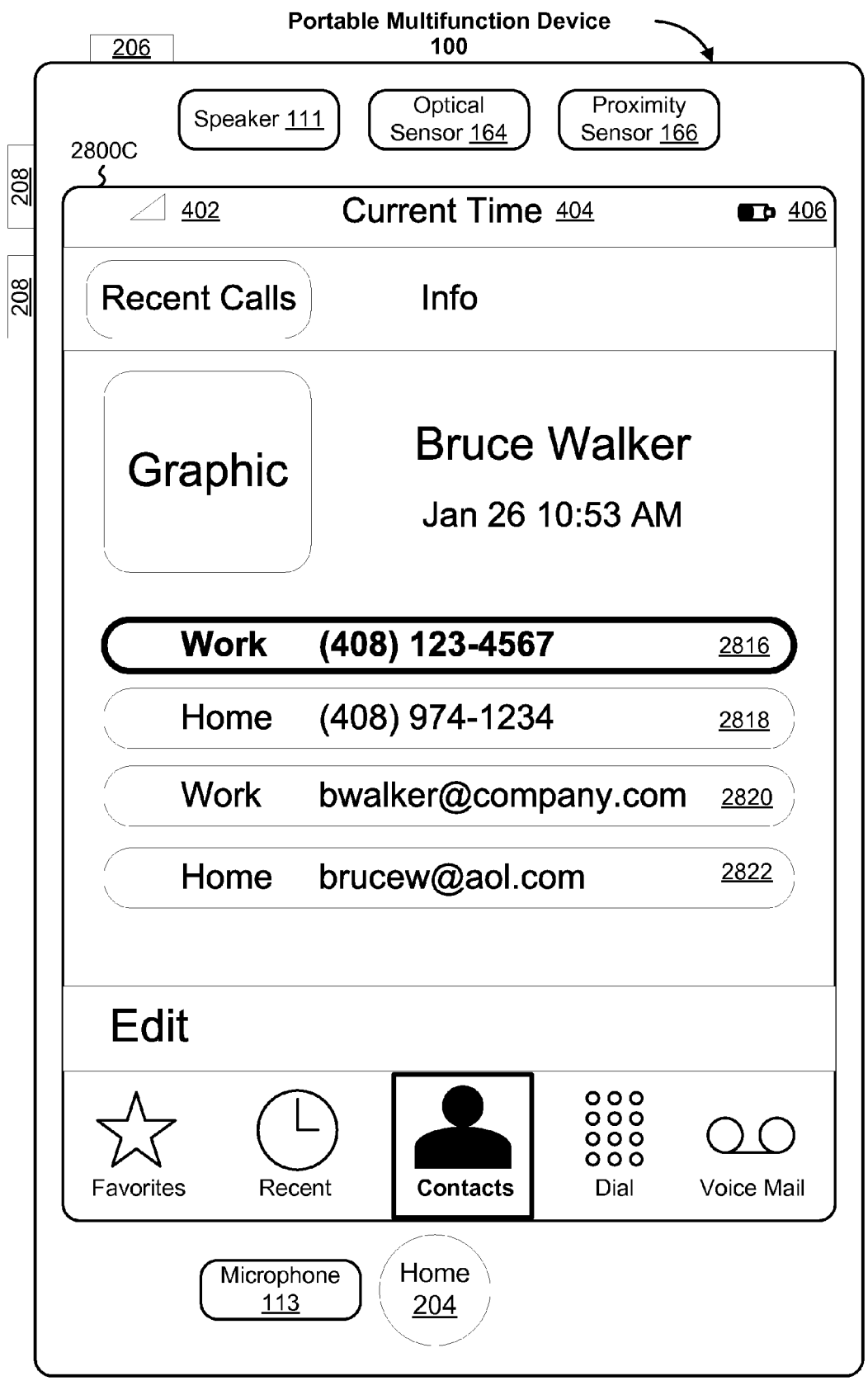
Figure 12D:
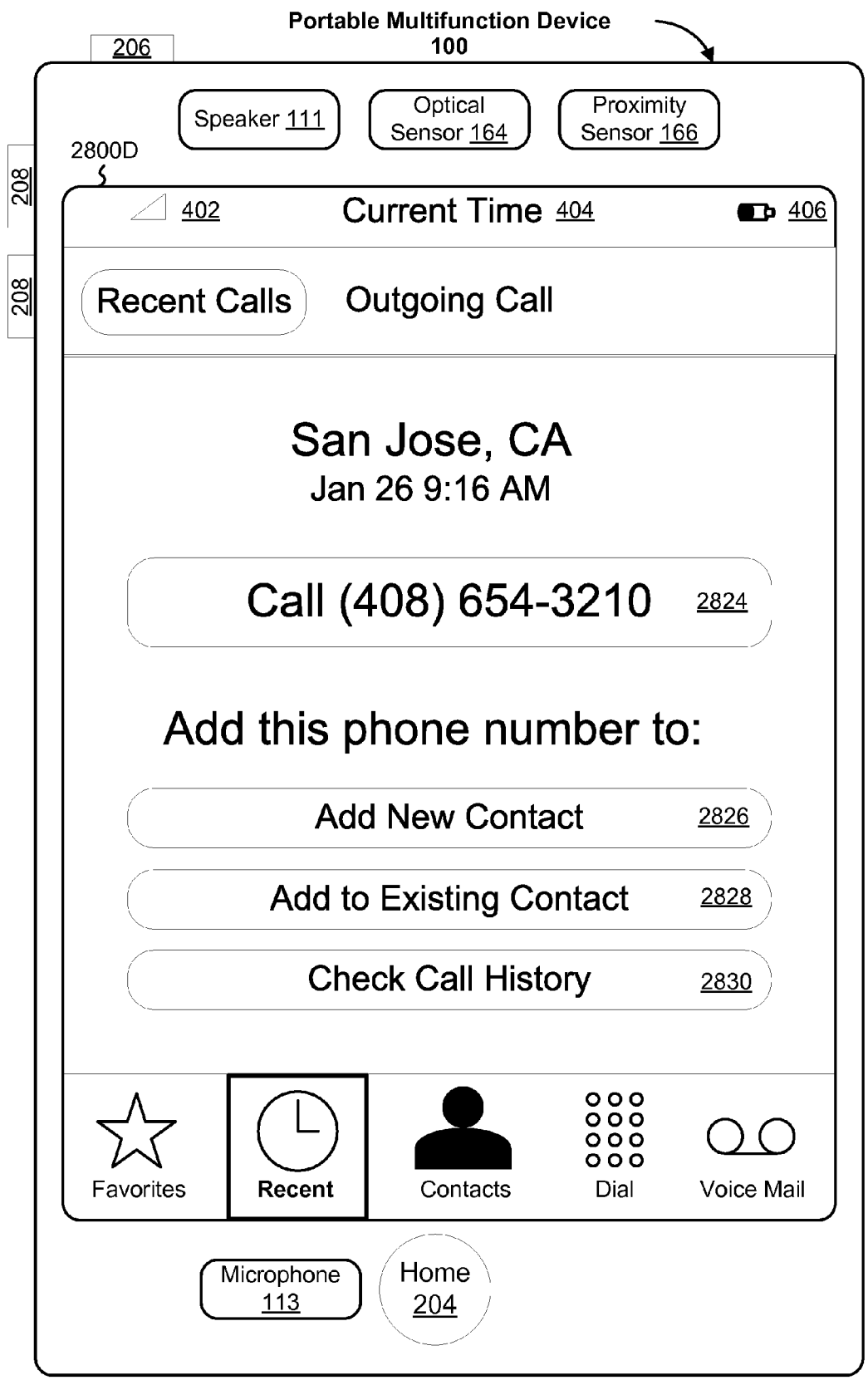
Figure 16A:
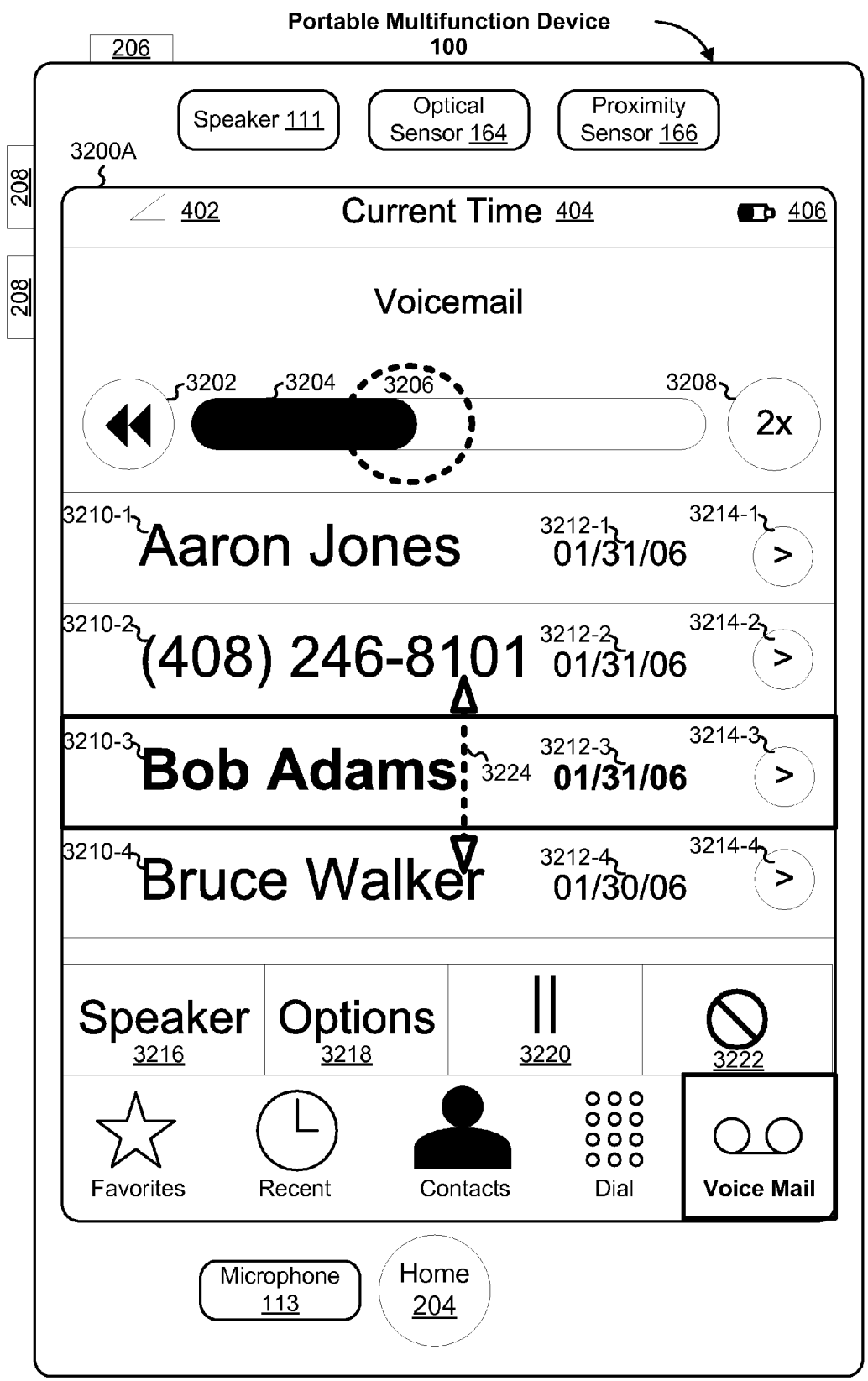
FIGS. 16A and 16B illustrate an exemplary user interface for voicemail in accordance with some embodiments.
Figure 16B:
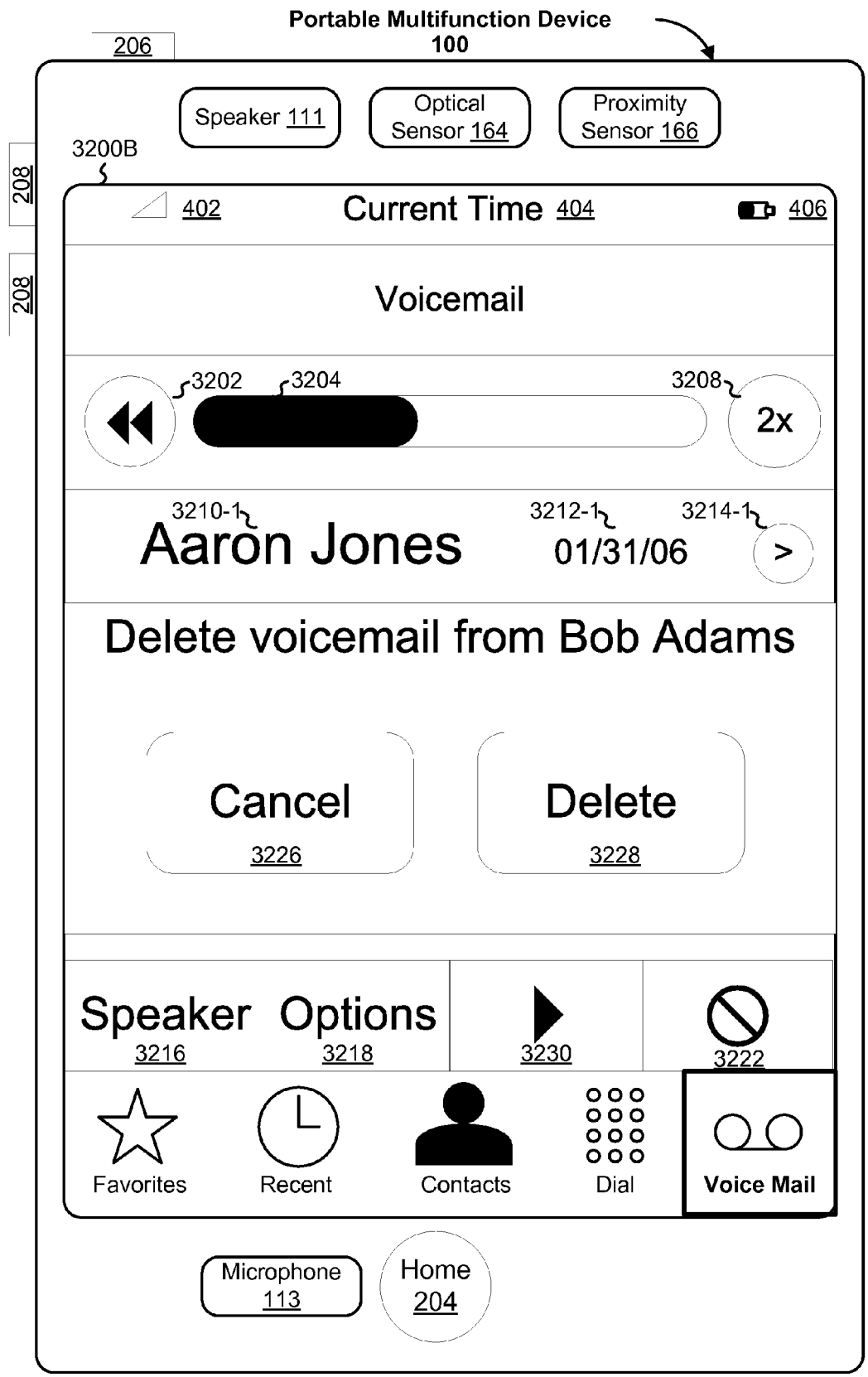

FIGS. 16A and 16B illustrate an exemplary user interface for voicemail in accordance with some embodiments. In some embodiments, user interfaces 3200A and 3200B include the following elements, or a subset or superset thereof:

402, 404, and 406, as described above;

backup icon 3202 that when activated (e.g., by a finger tap on the icon) initiates a process that backs up and replays the preceding few seconds of the voicemail message;

Progress bar 3204 that indicates what fraction of a voicemail message has been played and that may be used to help scroll through the message in response to a user gesture 3206;

Speed up icon 3208 that when activated (e.g., by a finger tap on the icon) initiates a process that speeds up playback of the voicemail message, which may also adjust the sound frequency or pitch of the fast playback so that the words, although spoken quickly, are still easy to understand:

Names 3210 of the people (associated with incoming phone numbers via the user's contact list) who have left voicemail messages (e.g., Aaron Jones 3210-1) or the phone number if the person's name is not available (e.g., 408-246-8101 3210-3);

Date 3212 and/or time of the voicemail;

Additional information icon 3214 that when activated (e.g., by a finger tap on the icon) initiates transition to the corresponding contact list entry (e.g., UI 2800C, FIG. 12C) or to a UI for unknown phone numbers (e.g., UI 2800D, FIG. 12D);

Speaker icon 3216 that when activated (e.g., by a finger tap on the icon) initiates playback of the voicemail through a speaker;

Options icon 3218 that when activated (e.g., by a finger tap on the icon) initiates display of a menu of additional voicemail options;

Pause icon 3220 that when activated (e.g., by a finger tap on the icon) initiates pausing of the voicemail;

Delete symbol icon 3222 that when activated (e.g., by a finger tap on the icon) initiates display of a UI to confirm that the user wants to delete the corresponding voicemail (e.g., UI 3200B, FIG. 16B).

Cancel icon 3226 that when activated (e.g., by a finger tap on the icon) changes the display from UI 3200B to UI 3200A without canceling the corresponding voicemail;

Delete icon 3228 that when activated (e.g., by a finger tap on the icon) deletes the corresponding voicemail and changes the display from UI 3200B to UI 3200A; and Play icon 3230 that when activated (e.g., by a finger tap on the icon) initiates or continues playback of the voicemail.

If the list of voicemail messages fills more than the screen area, the user may scroll through the list using vertically upward and/or vertically downward gestures 3224 on the touch screen.

In some embodiments, in response to a user tap or other predefined gesture in the row corresponding to a particular voicemail (but other than a tap or gesture on icon 3214), the phone module initiates playback of the corresponding voicemail. Thus, there is random access to the voicemails and the voicemails may be heard in any order.

In some embodiments, in response to a user gesture, the playback position in the voicemail can be modified. For example, in response to the user's finger touching 3206 at or near the current playback position within the progress bar and then sliding along the progress bar, the playback position may be altered to correspond to the position of the user's finger along the progress bar. This user gesture on the progress bar makes it easy for a user to skip to and/or replay portions of interest in the voicemail message.

Figure 17:
FIG. 17 illustrates an exemplary user interface for organizing and managing email in accordance with some embodiments.

FIG. 17 illustrates an exemplary user interface for organizing and managing email in accordance with some embodiments. In some embodiments, user interface 3300 includes the following elements, or a subset or superset thereof:

402, 404, and 406, as described above;

a set of mailboxes, such as inbox 3302, which may be organized in rows with a selection icon 3306 for each row;

a settings icon 3308 that when activated (e.g., by a finger tap on the icon) initiates display of a UI to input mailbox settings (e.g., UI 3600, FIG. 20); and a create email icon 3310 that when activated (e.g., by a finger tap on the icon) initiates display of a UI for creating a new email message (e.g., UI 3400, FIG. 18).

If the set of mailboxes fills more than the screen area, the user may scroll through the mailboxes using vertically upward and/or vertically downward gestures 3312 on the touch screen.

Figure 18A:
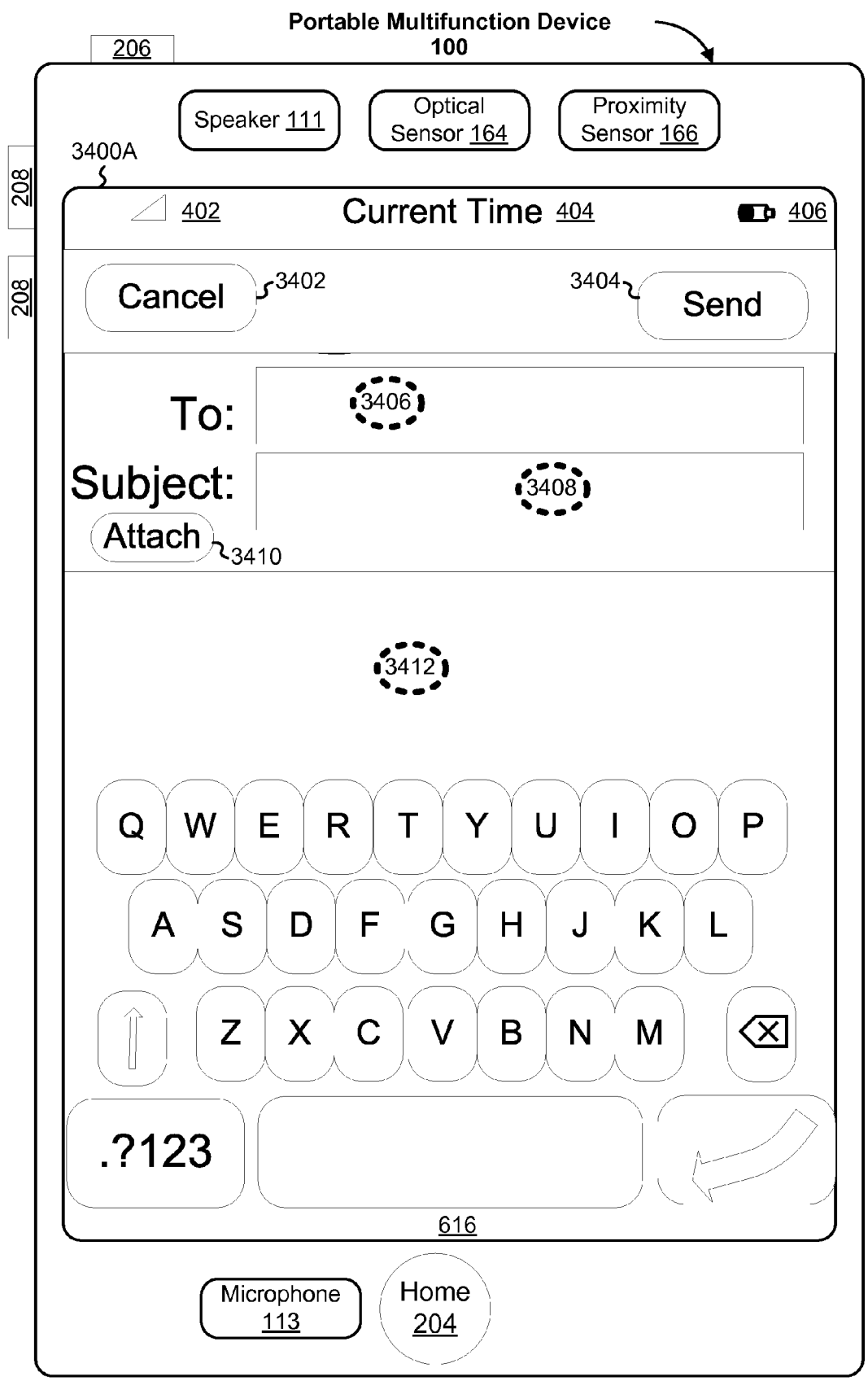
FIGS. 18A and 18B illustrate an exemplary user interface for creating emails in accordance with some embodiments.
Figure 18B:
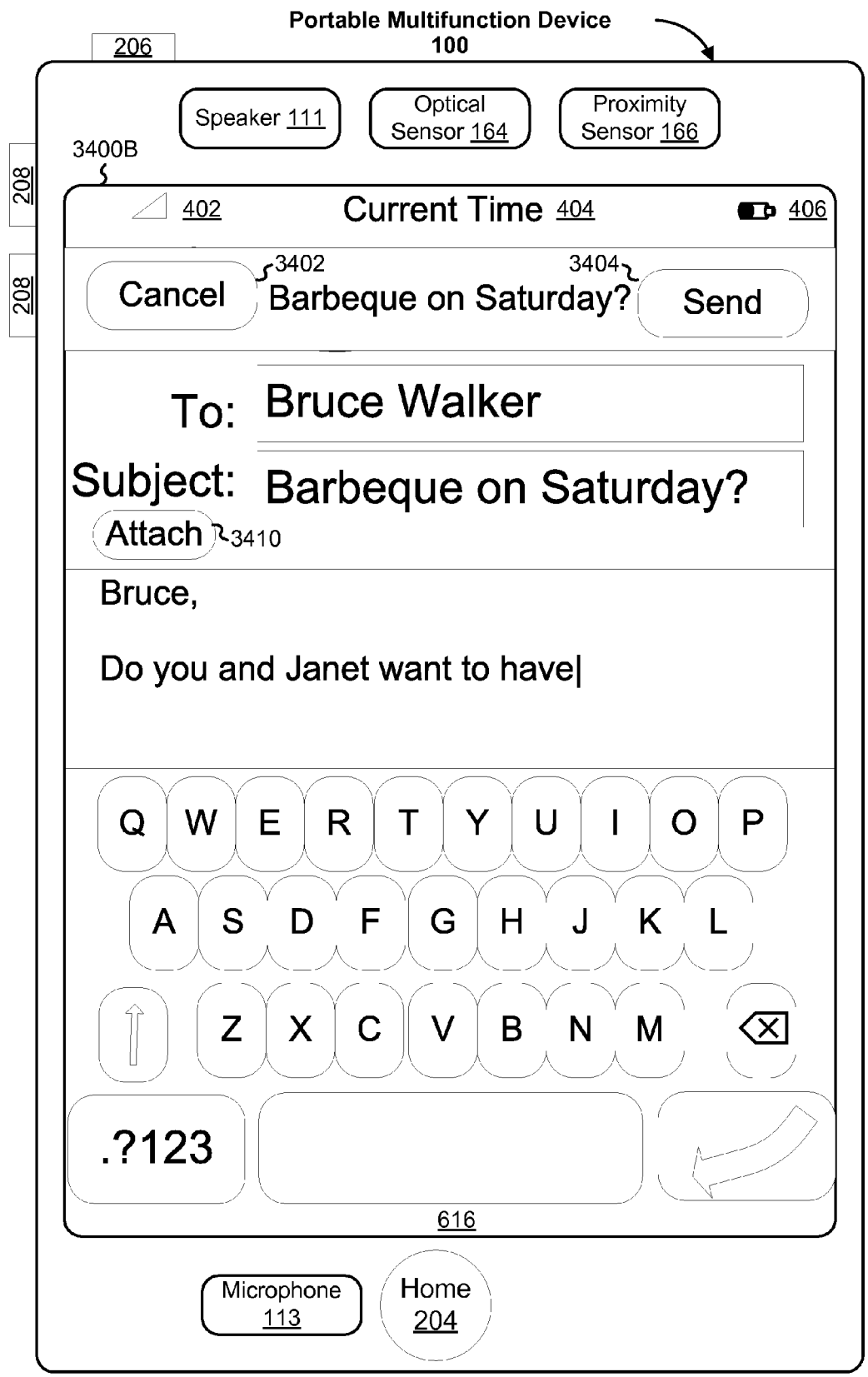

FIGS. 18A and 18B illustrate an exemplary user interface for creating emails in accordance with some embodiments.

In response to the user activating create email icon 3310 (UI 3300, FIG. 17), the device displays UI 3400A.

In some embodiments, if the user makes a tap or other predefined gesture on the subject line 3408 or in the body of the email 3412 (FIG. 18A), a letter keyboard 616 appears and the user may input the subject and/or body text (FIG. 18B). In some embodiments, to enter the email address, the user makes a tap or other predefined gesture on the To: line 3406 of the email; the user's contact list appears (e.g., FIG. 8A); the user makes a tap or other predefined gesture on the desired recipient/contact; and the device places the corresponding email address in the email message (FIG. 18B). In some embodiments, the user may also enter the email address using one or more keyboards (e.g., 616 and 624, not shown). The device sends the email message in response to the user activating the send icon 3404 (FIG. 18B) (e.g., by a finger tap on the icon). Alternatively, if the user activates the cancel icon 3402, the device may display a save draft icon and a don't save icon (not shown). The device saves the draft if the user activates the save draft icon, e.g., in a drafts folder in mail client 140 (FIG. 17). The device deletes the draft if the user activates the don't save icon.

In some embodiments, in response to the user activating the attach icon 3410 (e.g., by a finger tap on the icon), the touch screen displays a UI for adding attachments (not shown).

Figure 19A:
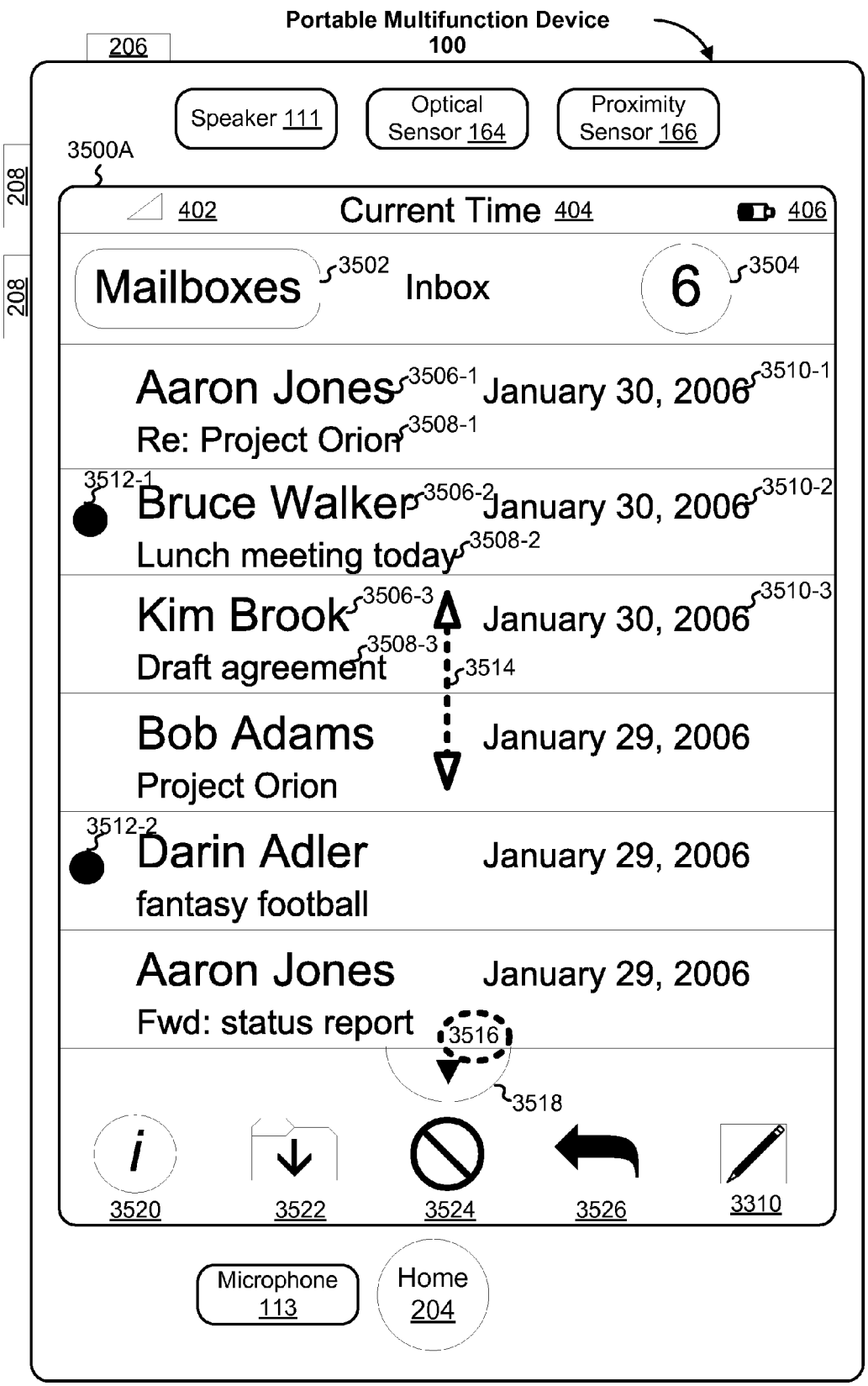
FIGS. 19A-19F illustrate an exemplary user interface for displaying and managing an inbox in accordance with some embodiments.
Figure 19B:
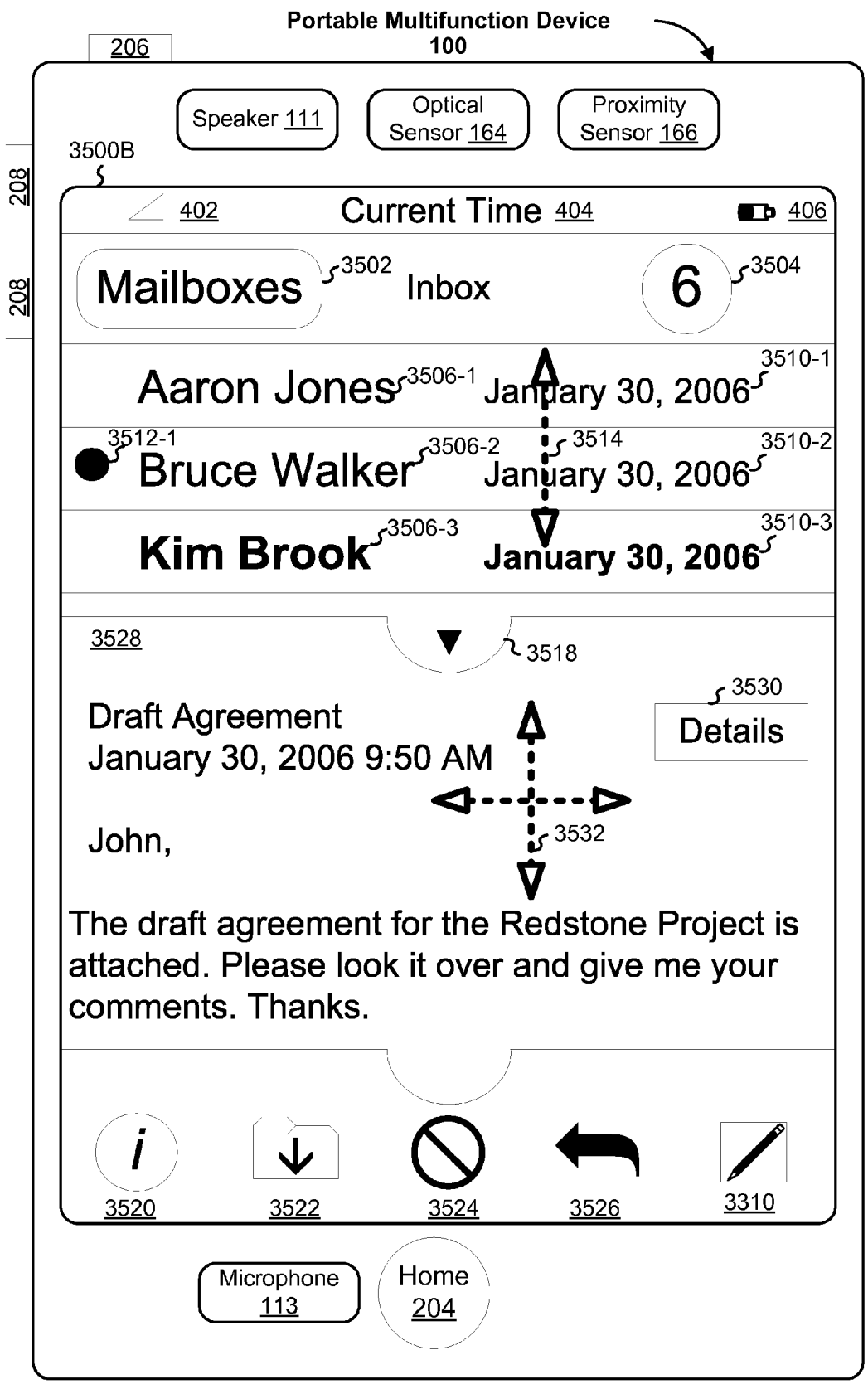
Figure 19C:
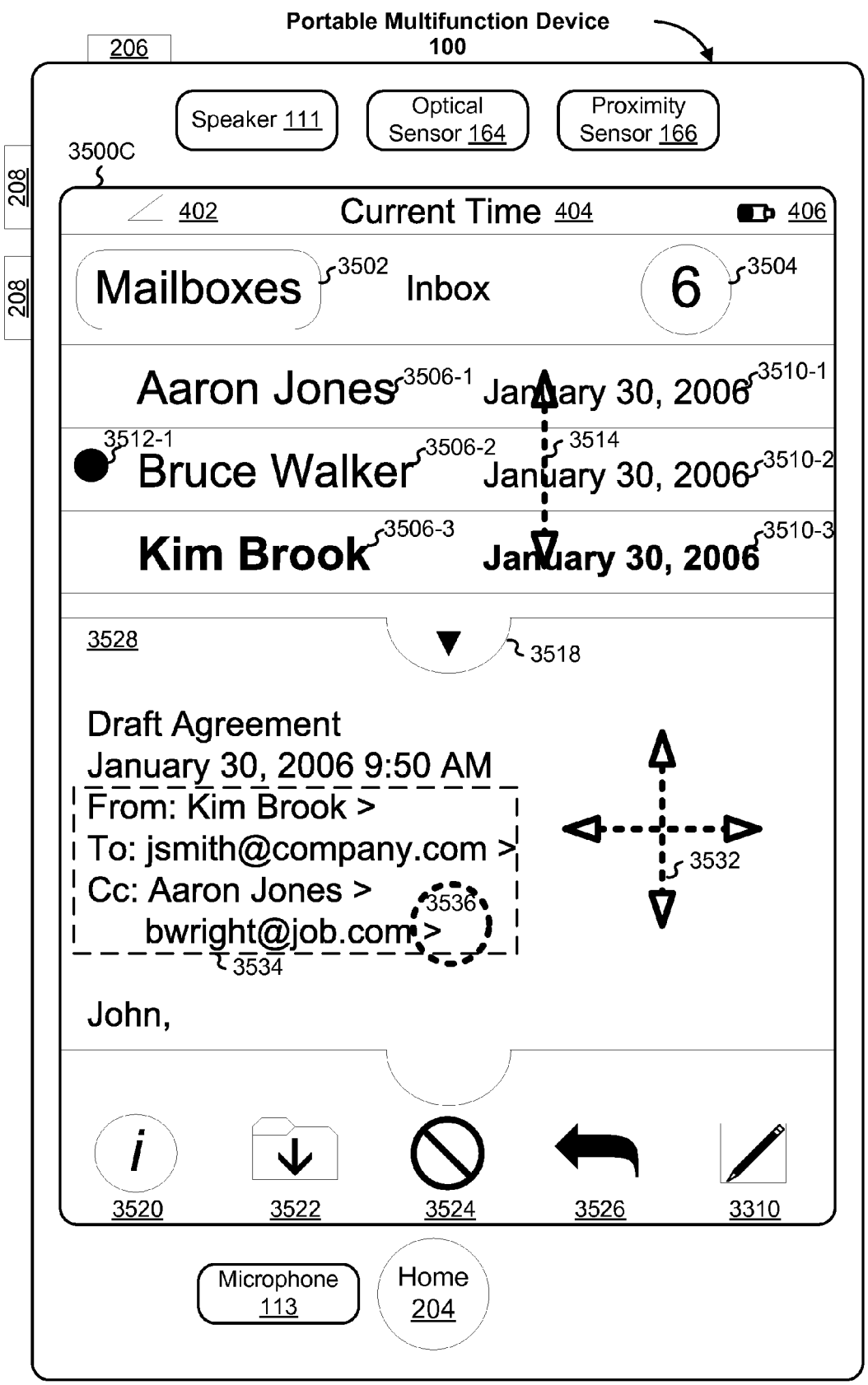
Figure 19D:
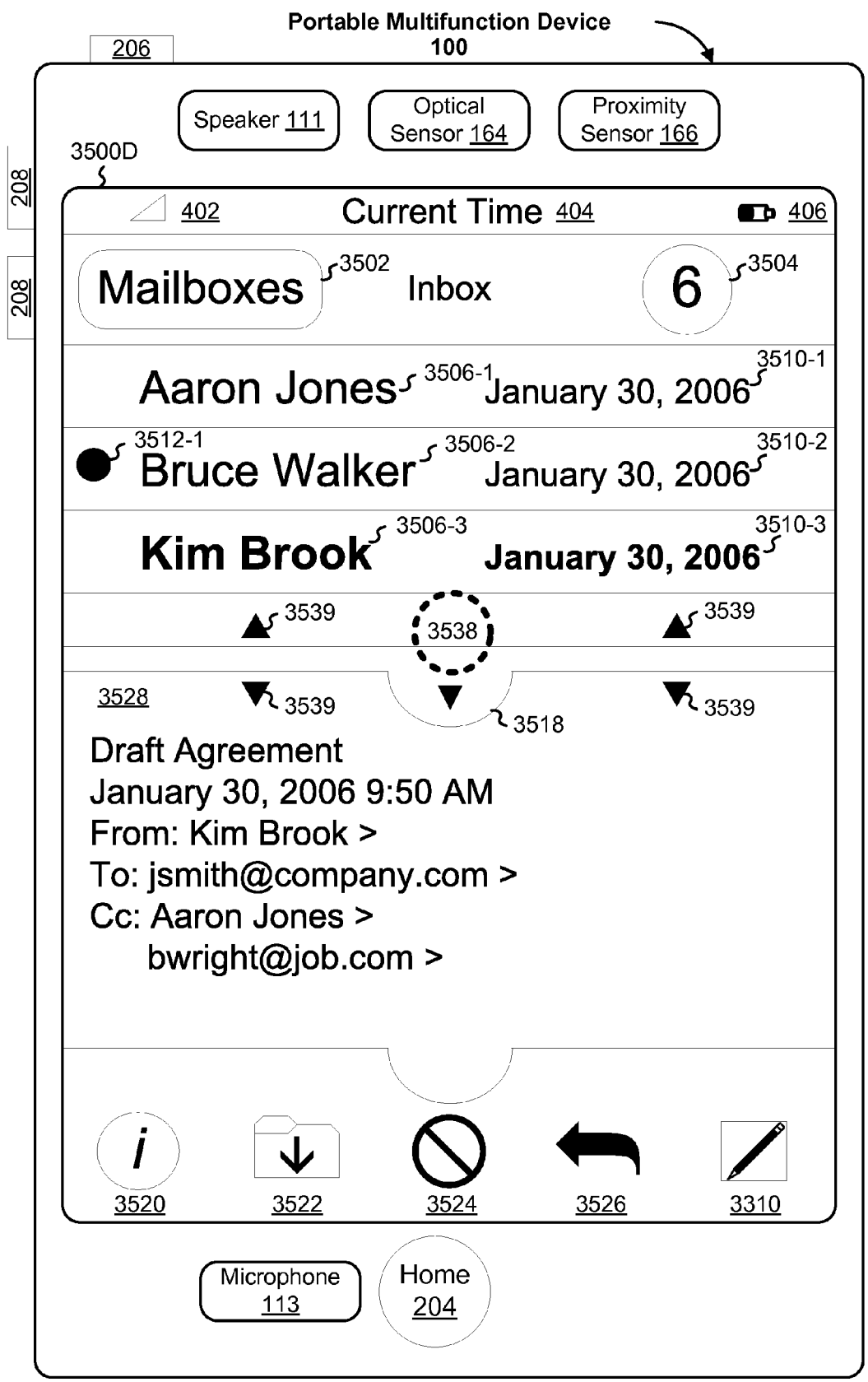
Figure 19E:
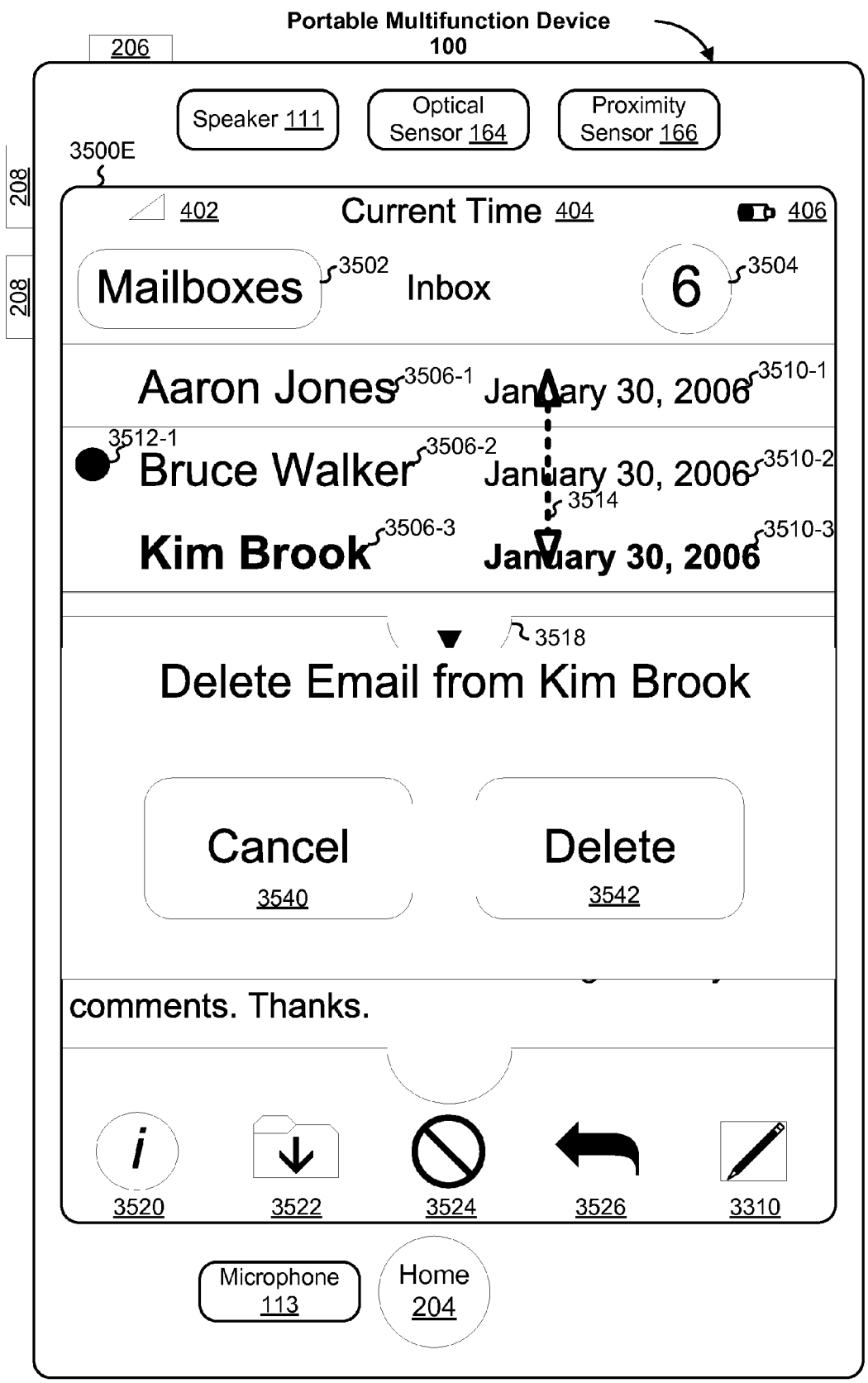
Figure 19F:
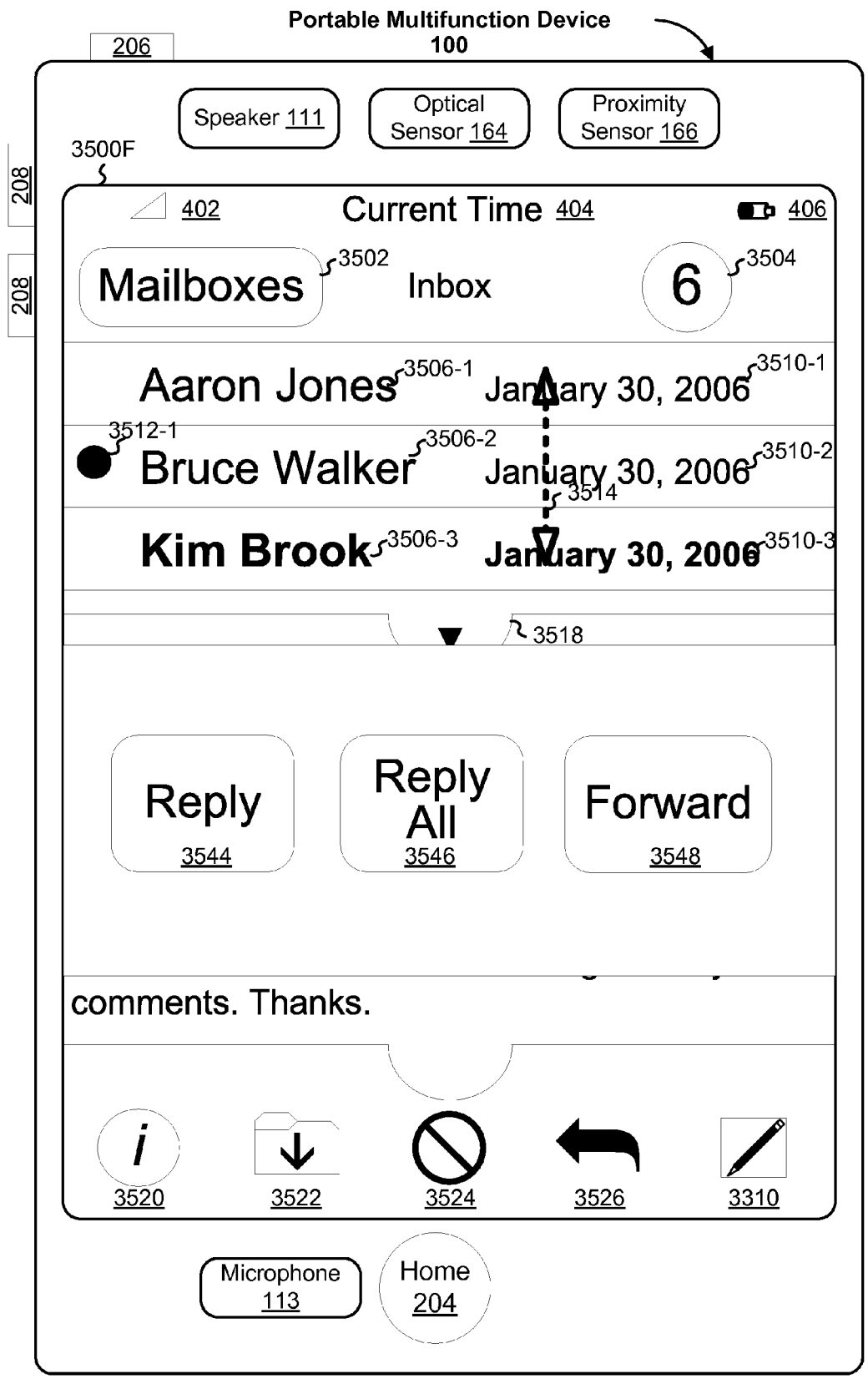
Figure 20:
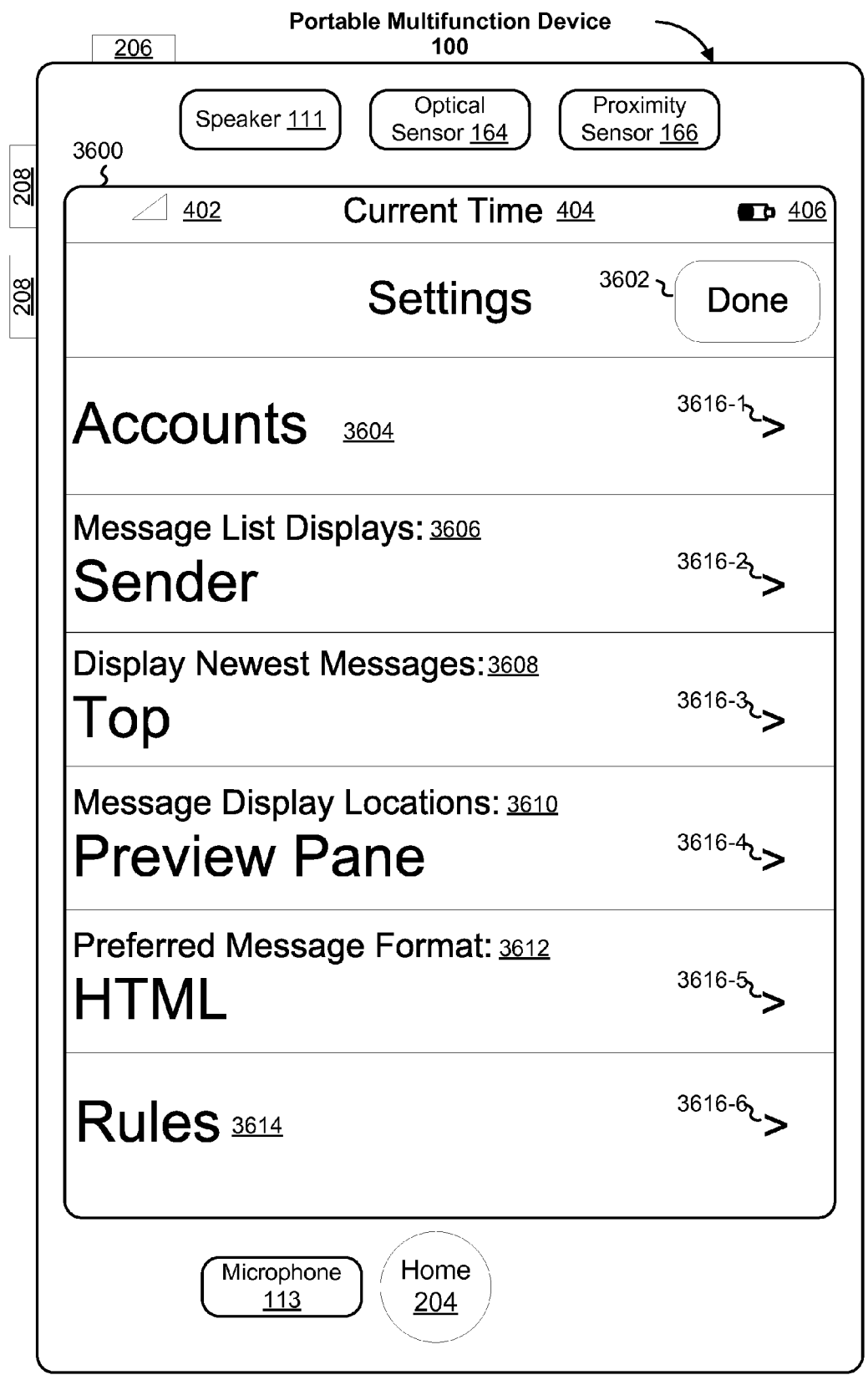
FIG. 20 illustrates an exemplary user interface for setting email user preferences in accordance with some embodiments.

FIGS. 19A-19F illustrate an exemplary user interface for displaying and managing an inbox in accordance with some embodiments. An analogous user interface may be used to display and manage the other mailboxes (e.g., drafts, sent, trash, personal, and/or work in UI 3300). In some embodiments, user interfaces 3500A-3500F include the following elements, or a subset or superset thereof:

402, 404, 406, and 3310, as described above;

mailboxes icon 3502 that when activated (e.g., by a finger tap on the icon) initiates the display of mailbox UI 3300 (FIG. 17);

unread messages icon 3504 that displays the number of unread messages in the inbox;

names 3506 of the senders of the email messages;

subject lines 3508 for the email messages;

dates 3510 of the email messages;

unread message icons 3512 that indicate messages that have not been opened;

preview pane separator 3518 that separates the list of messages from a preview of a selected message in the list;

settings icon 3520 that when activated (e.g., by a finger tap on the icon) initiates the display of settings UI 3600 (FIG. 20);

move message icon 3522 that when activated (e.g., by a finger tap on the icon) initiates the display of move message UI 3800A (FIG. 22);

Delete symbol icon 3524 that when activated (e.g., by a finger tap on the icon) initiates display of a UI to confirm that the user wants to delete the selected email (e.g., UI 3500E, FIG. 19E);

Reply/Forward icon 3526 that when activated (e.g., by a finger tap on the icon) initiates display of a UI to select how to reply or forward the selected email (e.g., UI 3500F, FIG. 19F);

Preview pane 3528 that displays a portion of the selected email message;

Details icon 3530 that when activated (e.g., by a finger tap on the icon) initiates display of email addressing details 3534 (FIG. 19C);

Cancel icon 3540 that when activated (e.g., by a finger tap on the icon) returns the device to the previous user interface (e.g., UI 3500D);

Delete icon 3542 that when activated (e.g., by a finger tap on the icon) deletes the selected email;

Reply icon 3544 that when activated (e.g., by a finger tap on the icon) initiates creation of an email replying to the sender;

Reply All icon 3546 that when activated (e.g., by a finger tap on the icon) initiates creation of an email replying to the sender and the other parties included in the selected email (e.g., by cc:);

Forward icon 3548 that when activated (e.g., by a finger tap on the icon) initiates creation of an email to be forwarded;

If the set of emails fill more than the screen area (or more than the screen area above the preview pane), the user may scroll through the emails using vertically upward and/or vertically downward gestures 3514 on the touch screen.

In some embodiments, the email subjects 3508 are not displayed if the preview pane 3528 is used (as shown in FIGS. 19B-19F). In some embodiments, the position of the preview pane separator can be adjusted (see FIG. 19A) by the user making contact 3516 at or near the preview pane separator and moving the separator to the desired location by dragging the finger contact 3538. In some embodiments, arrows 3539 or other graphics appear during the positioning of the preview pane separator (e.g., UI 3500D, FIG. 19D) to help guide the user.

In some embodiments, in response to a tap or other predefined gesture by the user in a row containing information (e.g., 3506, 3510, and/or 3508) about a particular email message, some or all of the text in the row is highlighted (e.g., by coloring, shading, or bolding) and the corresponding message is displayed in the preview pane area. In some embodiments, in response to a tap or other predefined gesture by the user in a row containing information (e.g., 3506, 3510, and/or 3508) about a particular email message, the email message is displayed on the full screen if the preview pane is not being used.

In some embodiments, if the selected email fills more than the preview pane area, the user may scroll through the email using two-dimensional gestures 3532 in the preview pane with vertical and/or horizontal movement of the email on the touch screen.

In some embodiments, in response to user activation of an additional information icon (e.g., ">") on the detail information 3534 (e.g., by a finger tap 3536 on the icon), the touch screen may display contact list information for the corresponding party, if available (e.g., UI 2800C, FIG. 12C) or a UI analogous to UI 2800D, FIG. 12D.

Figure 21A:
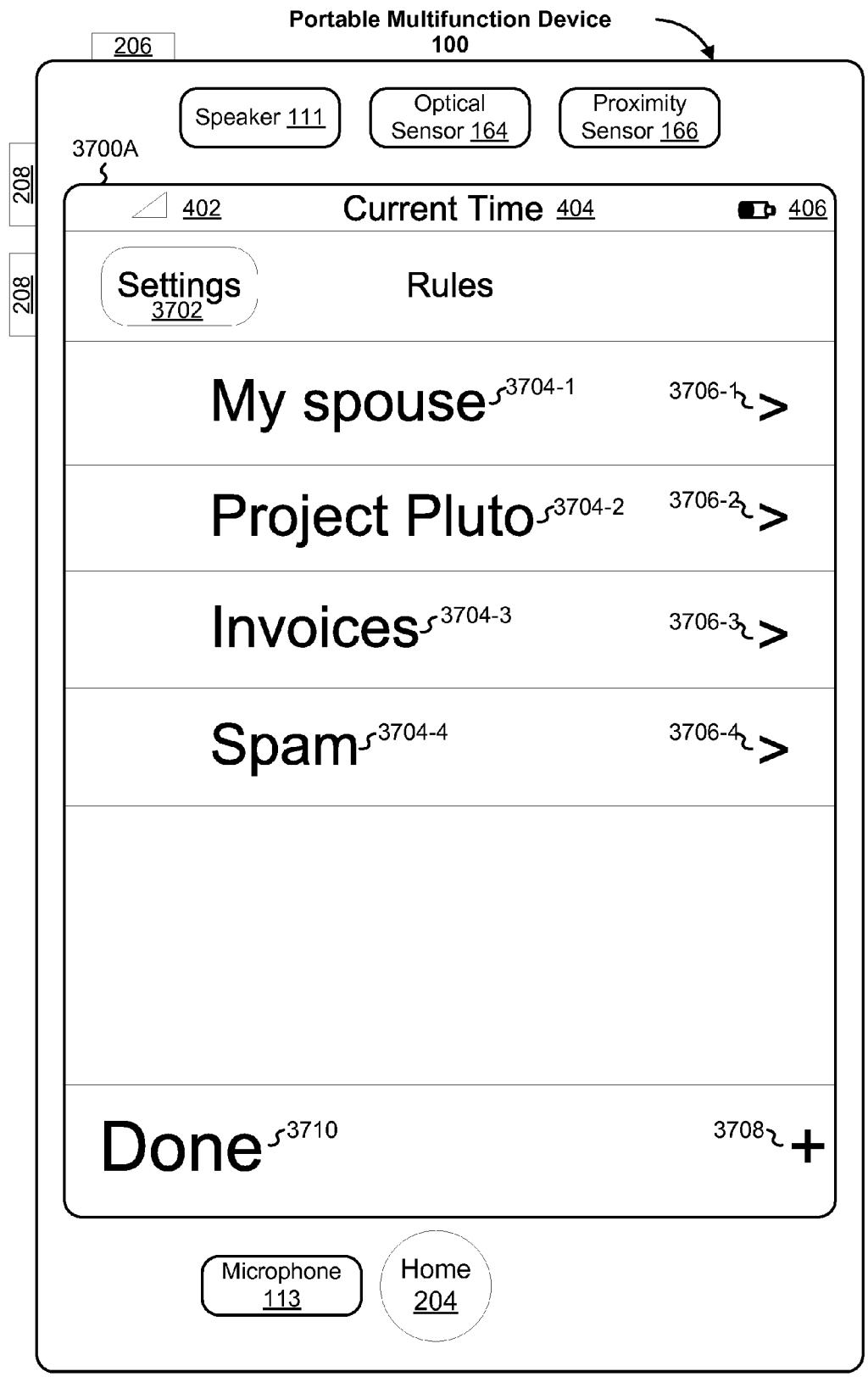
FIGS. 21A and 21B illustrate an exemplary user interface for creating and managing email rules in accordance with some embodiments.
Figure 21B:
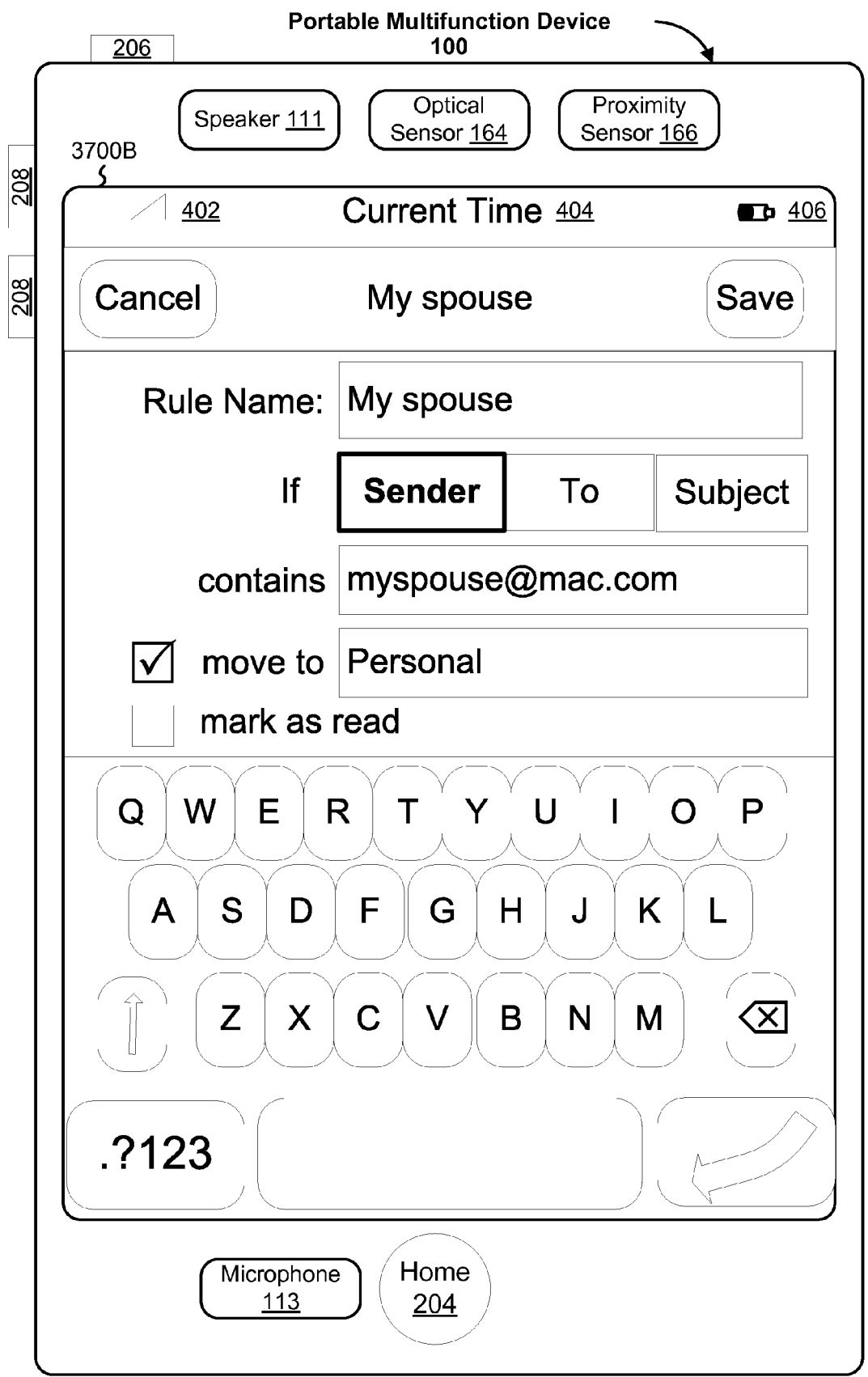

FIG. 20 illustrates an exemplary user interface for setting email user preferences in accordance with some embodiments. In some embodiments, user interface 3600 includes the following elements, or a subset or superset thereof:

402, 404, and 406, as described above;

Done icon 3602 that when activated (e.g., by a finger tap on the icon) returns the device to the previous UI;

Accounts 3604 for entering email account information;

Message list displays 3606 for selecting whether sender 3506 and/or subject 3508 information is displayed in the emails lists;

Display newest messages 3608 for selecting whether the newest messages are displayed at the top or bottom of the screen;

Message display locations 3610 for selecting whether the messages are displayed in the preview pane or full screen;

Preferred message format 3612 for selecting how the messages are formatted (e.g., HTML or plain text);

Rules 3614 for creating rules for managing email messages (e.g., using UI 3700A, FIG. 21A, and UI 3700B, FIG. 21B);

Selection icons 3616 that when activated (e.g., by a finger tap on the icon) show choices for the corresponding settings.

In some embodiments, a user may tap anywhere in the row for a particular setting to initiate display of the corresponding setting choices.

FIGS. 21A and 21B illustrate an exemplary user interface for creating and managing email rules in accordance with some embodiments. In some embodiments, user interface 3700A includes the following elements, or a subset or superset thereof:

402, 404, and 406, as described above;

Settings icon 3702 that when activated (e.g., by a finger tap on the icon) returns the device to the settings UI 3600 (FIG. 20);

Rules 3704;

Selection icons 3706 that when activated (e.g., by a finger tap on the icon) show choices for the corresponding rules.

Add icon 3708 that when activated (e.g., by a finger tap on the icon) displays a UI for creating a new rule (e.g., UI 3700B, FIG. 21B);

Done icon 3710 that when activated (e.g., by a finger tap on the icon) returns the device to the settings UI 3600 (FIG. 20);

In some embodiments, a user may tap anywhere in the row for a particular rule to initiate display of the corresponding rule (e.g., UI 3700B, FIG. 21B).

Figure 22A:
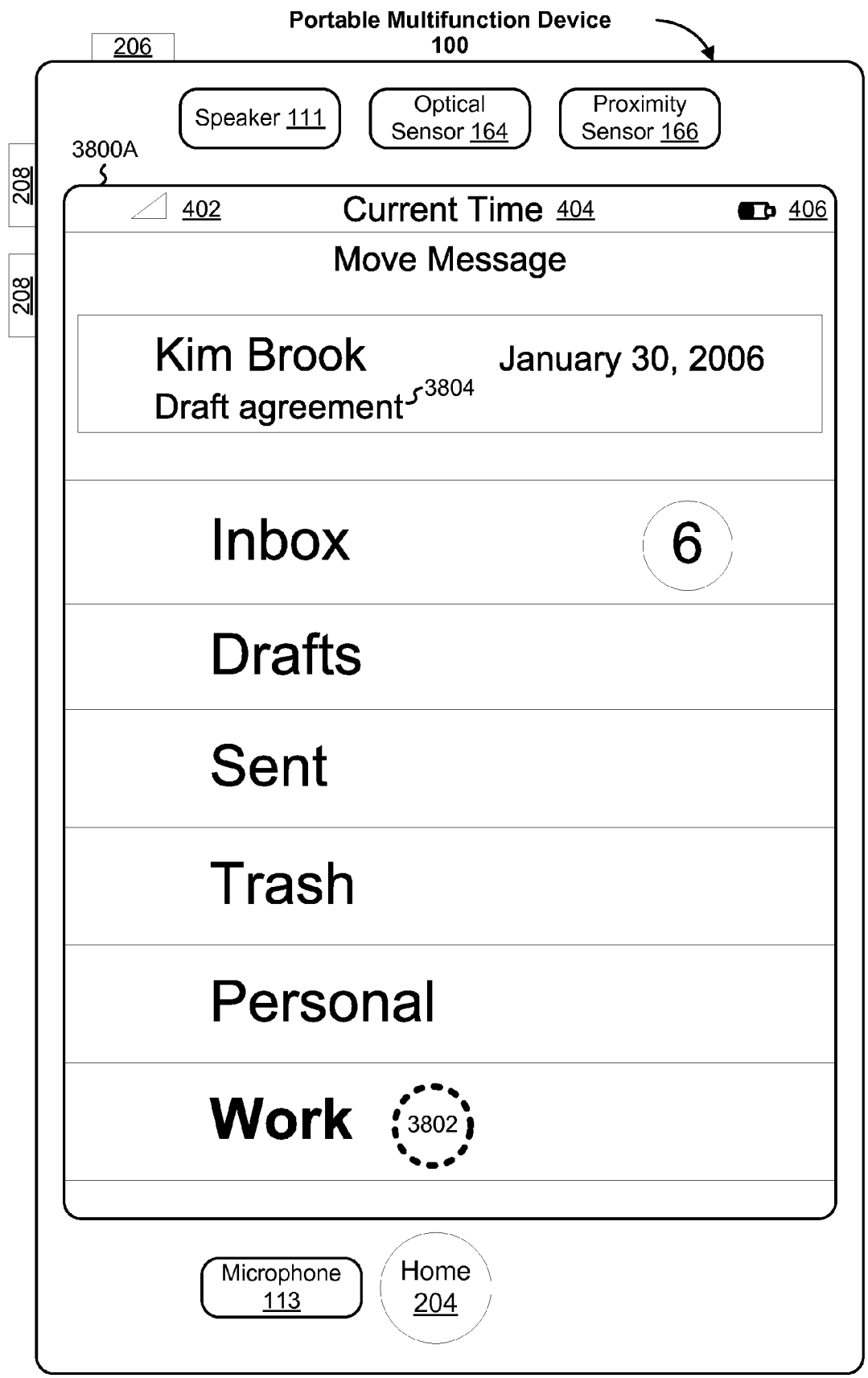
FIGS. 22A and 22B illustrate an exemplary user interface for moving email messages in accordance with some embodiments.
Figure 22B:
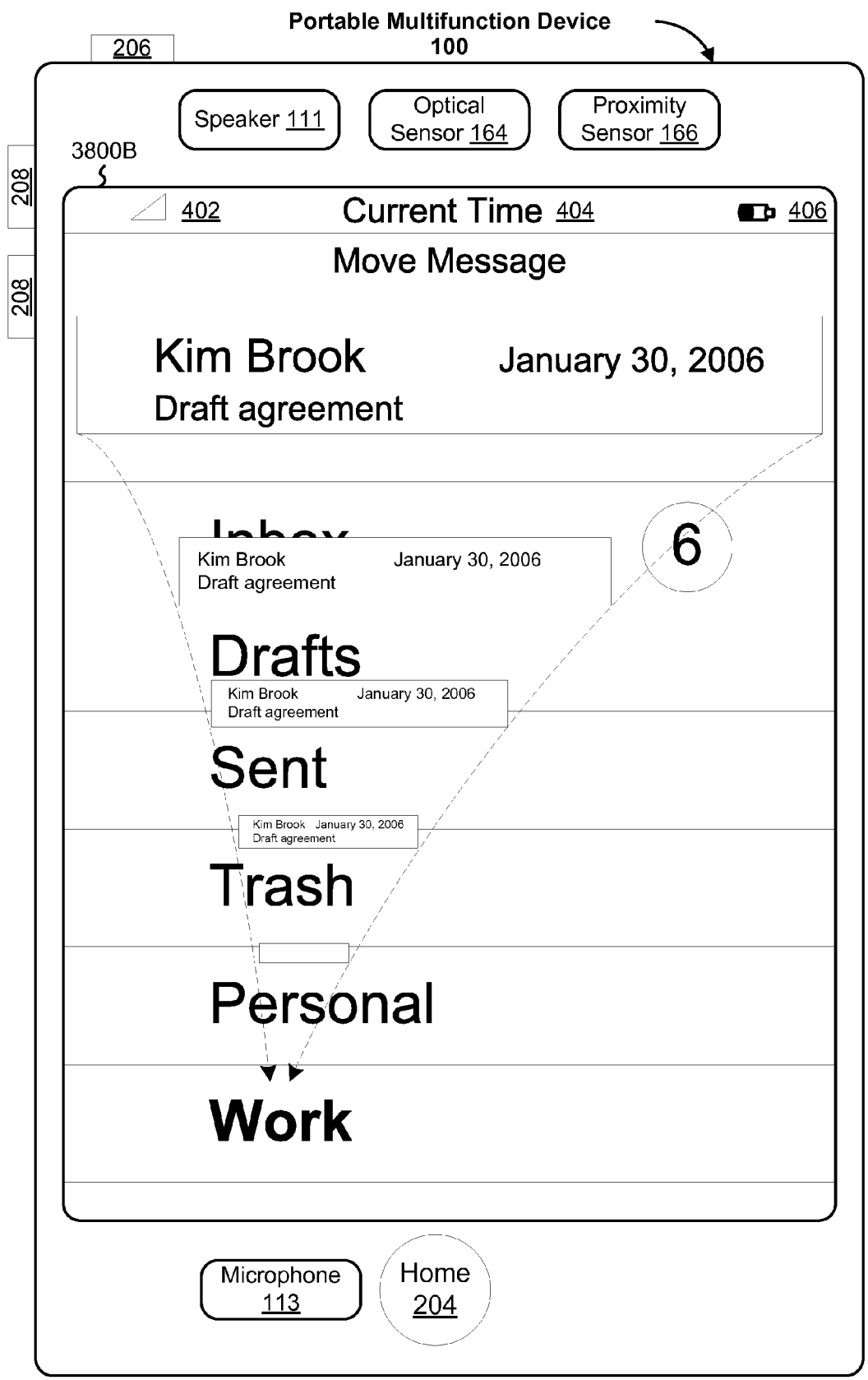

FIGS. 22A and 22B illustrate an exemplary user interface for moving email messages in accordance with some embodiments.

In response to the user activating move message icon 3522 (see UI 3500A, FIG. 19A), the device displays UI 3800A, with some information 3804 for the selected message displayed.

In some embodiments, if the user makes a tap 3802 or other predefined gesture on a row corresponding to a particular mailbox or other folder, the message is moved to the corresponding mailbox or folder (e.g., Work in FIG. 22A). In some embodiments, the selected row is highlighted and an animation appears to move the message information 3804 into the selected row (as illustrated schematically in FIG. 22B).

Figure 23:
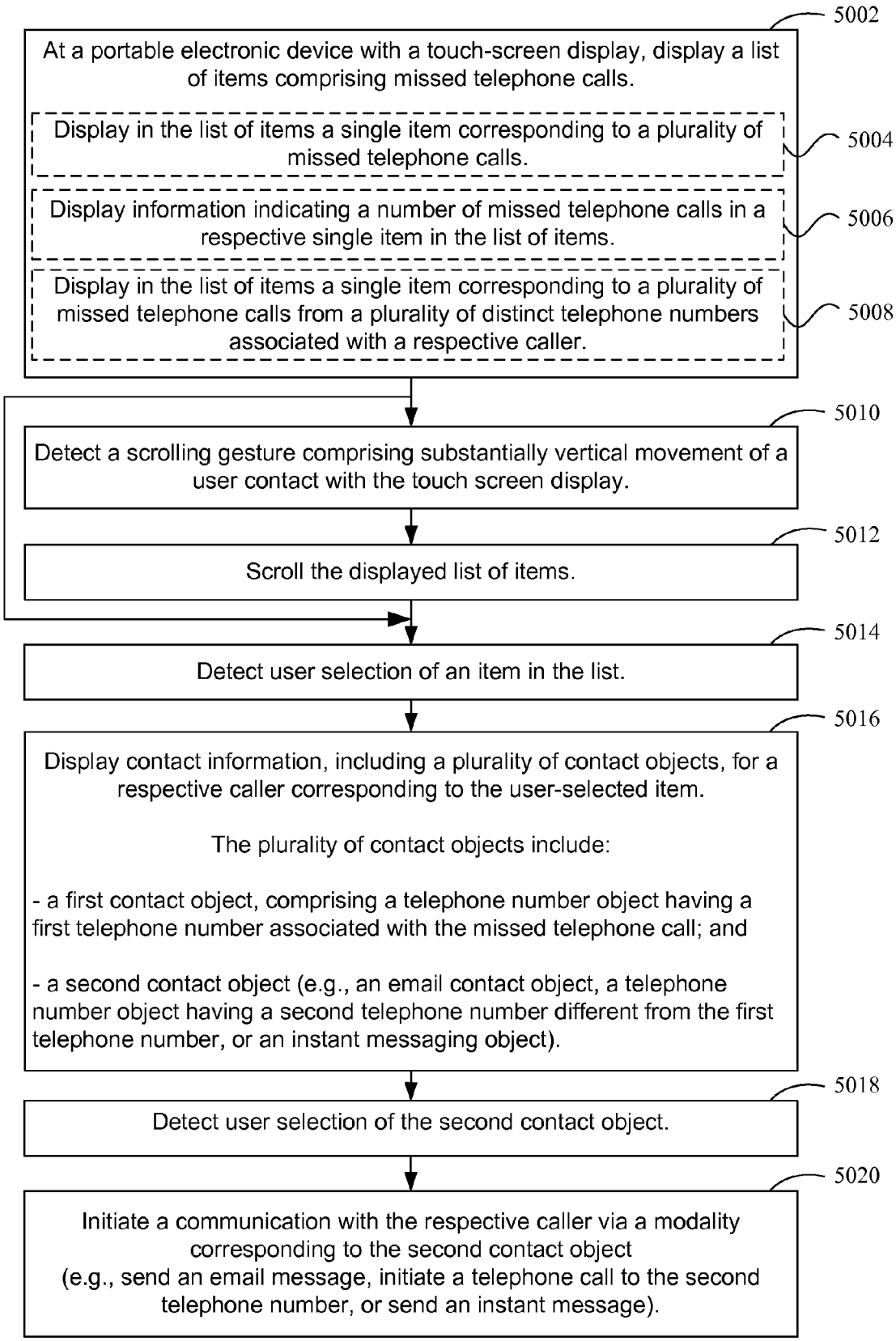
FIG. 23 is a flow diagram illustrating a process for handling missed telephone calls at a portable electronic device with a touch screen display in accordance with some embodiments.

FIG. 23 is a flow diagram illustrating a process 5000 for handling missed telephone calls at a portable electronic device with a touch screen display in accordance with some embodiments. A list of items comprising missed telephone calls is displayed (5002). For example, UI 2800B (FIG. 12B) displays a list of missed calls. In some embodiments, a single item in the list of items corresponds to a plurality of missed telephone calls (5004). In some embodiments, information indicating a number of missed calls is displayed in a respective single item in the list (5006). For example, the top item in UI 2800B for Bruce Walker 2803 corresponds to two missed telephone calls, as indicated by the number 2805. In some embodiments, the plurality of calls corresponding to the single item are consecutive in time. In some embodiments, a single item in the list of items corresponds to a plurality of missed telephone calls from a plurality of distinct telephone numbers associated with a respective caller (5008). Displaying a single item in the list of items that corresponds to a plurality of missed telephone calls condenses the missed call list and makes it easy for a user to determine which people are trying to contact the user and how many times they have tried to contact the user.

In some embodiments, a scrolling gesture comprising substantially vertical movement of a user contact with the touch screen display is detected (5010). In response, the displayed list of items is scrolled (5012). For example, the list of items displayed in UI 2800B is scrolled in response to vertical gesture 2814 (FIG. 12B). The scrolling gesture provides a simple way for the user to rapidly scan the list of items.

Upon detecting user selection of an item in the list (5014), contact information is displayed for a respective caller corresponding to the user-selected item (5016). For example, if a user selects the item for Bruce Walker 2803 in UI 2800B (FIG. 12B), contact information for Bruce Walker is displayed in UI 2800C (FIG. 12C). The contact information includes a plurality of contact objects. The plurality of contact objects include a first contact object, comprising a telephone number object having a first telephone number associated with the missed telephone call, and a second contact object. In some embodiments, the second contact object is an email contact object. In some embodiments, the second contact object is a telephone number object having a second telephone number different from the first telephone number. In some embodiments, the second contact object is an instant messaging object. In the example of FIG. 12C, work telephone number 2816, from which the two missed calls were made, corresponds to the first contact object. Any of objects 2818, 2820, and 2822 could correspond to the second contact object.

Upon detecting user selection of the second contact object (5018), a communication is initiated with the respective caller via a modality corresponding to the second contact object (5020). In some embodiments, in which the second contact object is an email contact object, the modality corresponding to the second contact object includes sending an email message. For example, user selection of object 2820 in UI 2800C (FIG. 12C) would initiate an email to Bruce Walkerâs work email address. In some embodiments, in which the second contact object is a telephone number object having a second telephone number different from the first telephone number, the modality corresponding to the second contact object includes initiating a telephone call to the second telephone number. For example, user selection of object 2818 in UI 2800C would initiate a telephone call to Bruce Walkerâs home number. In some embodiments, in which the second contact object is an instant messaging object, the modality corresponding to the second contact object includes sending an instant message. Providing a plurality of contact objects makes it easy for a user to choose and initiate communications with the missed caller by any available communication modality, rather than being limited to calling back the missed caller at the phone number associated with the missed call. For example, rather than calling Bruce Walker back at his work number, a user can just as easily call Bruce at home or send Bruce an email message.

While the missed telephone call handling process 5000 described above includes a number of operations that appear to occur in a specific order, it should be apparent that the process 5000 can include more or fewer operations, which can be executed serially or in parallel (e.g., using parallel processors or a multi-threading environment), an order of two or more operations may be changed and/or two or more operations may be combined into a single operation. For example, operations 5010 and 5012 may be omitted if the item to be selected in operation 5014 is displayed initially in operation 5002.

Figure 24:
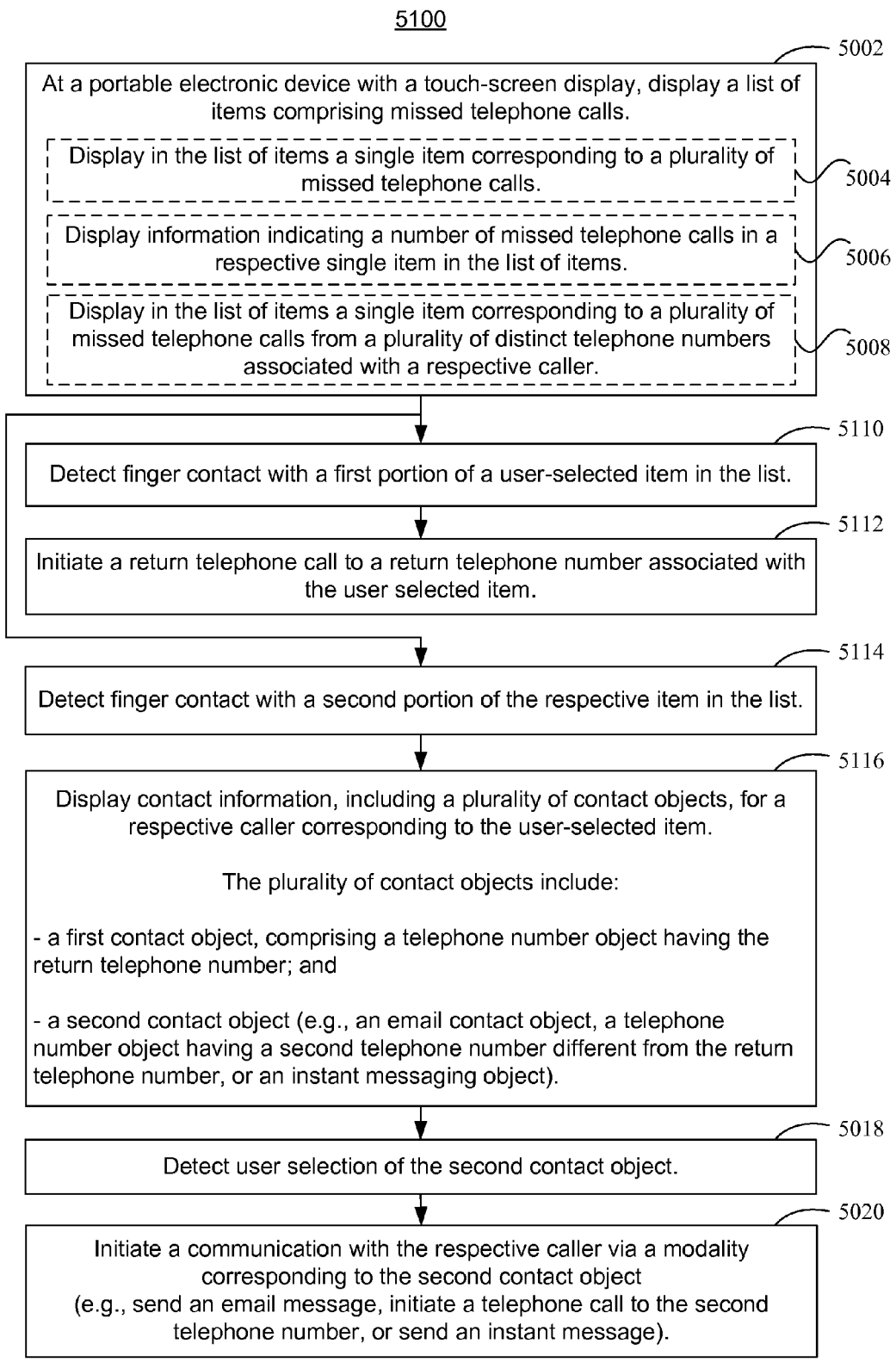
FIG. 24 is a flow diagram illustrating a process for handling missed telephone calls at a portable electronic device with a touch screen display in accordance with some embodiments.

FIG. 24 is a flow diagram illustrating a process 5100 for handling missed telephone calls at a portable electronic device with a touch screen display in accordance with some embodiments. A list of items comprising missed telephone calls is displayed (5002), as described above with regard to process 5000 (FIG. 23). In some embodiments, a single item in the list of items corresponds to a plurality of missed telephone calls (5004). In some embodiments, information indicating a number of missed calls is displayed in a respective single item in the list of items (5006). In some embodiments, a single item in the list of items corresponds to a plurality of missed telephone calls from a plurality of distinct telephone numbers associated with a respective caller (5008). Displaying a single item in the list of items that corresponds to a plurality of missed telephone calls condenses the missed call list and makes it easy for a user to determine which people are trying to contact the user and how many times they have tried to contact the user.

In some embodiments, a scrolling gesture comprising substantially vertical movement of a user contact with the touch screen display is detected. In response, the displayed list of items is scrolled (not shown). The scrolling gesture provides a simple way for the user to rapidly scan the list of items.

Upon detecting finger contact with a first portion of a user-selected item in the list (5110), a return telephone call is initiated to a return telephone number associated with the user-selected item (5112). In some embodiments, for example, in response to a tap or other predefined gesture on a row in UI 2800B (FIG. 12B) other than on icon 2808, a return telephone call is initiated to the corresponding number for that row.

Upon detecting finger contact with a second portion of the respective item in the list (5114), contact information is displayed for a respective caller corresponding to the user-selected item (5116). The contact information includes a plurality of contact objects. The plurality of contact objects include a first contact object, comprising a telephone number object having the return telephone number, and a second contact object. In some embodiments, the second contact object is an email contact object. In some embodiments, the second contact object is a telephone number object having a second telephone number different from the return telephone number. In some embodiments, the second contact object is an instant messaging object. For example, in some embodiments, in response to a tap or other predefined gesture on icon 2808 in the top row in UI 2800B (FIG. 12B), corresponding contact information is displayed in UI 2800C (FIG. 12C). In the example of FIG. 12C, work telephone number 2816, from which the two missed calls were made, corresponds to the first contact object. Any of objects 2818, 2820, and 2822 could correspond to the second contact object.

Upon detecting user selection of the second contact object (5018), a communication is initiated with the respective caller via a modality corresponding to the second contact object (5020). In some embodiments, in which the second contact object is an email contact object, the modality corresponding to the second contact object includes sending an email message. In some embodiments, in which the second contact object is a telephone number object having a second telephone number different from the return telephone number, the modality corresponding to the second contact object includes initiating a telephone call to the second telephone number. In some embodiments, in which the second contact object is an instant messaging object, the modality corresponding to the second contact object includes sending an instant message. In some embodiments, detecting contacts with either the first portion or second portion of an item makes it easy for a user to either: (a) immediately call back the phone number associated with the missed call—without having to view the contact information associated with the missed call (e.g., FIG. 12C), or (b) view the contact information to choose from a plurality of communication modalities associated with the missed caller.

While the missed telephone call handling process 5100 described above includes a number of operations that appear to occur in a specific order, it should be apparent that the process 5100 can include more or fewer operations, which can be executed serially or in parallel (e.g., using parallel processors or a multi-threading environment), an order of two or more operations may be changed and/or two or more operations may be combined into a single operation.

Figure 25:
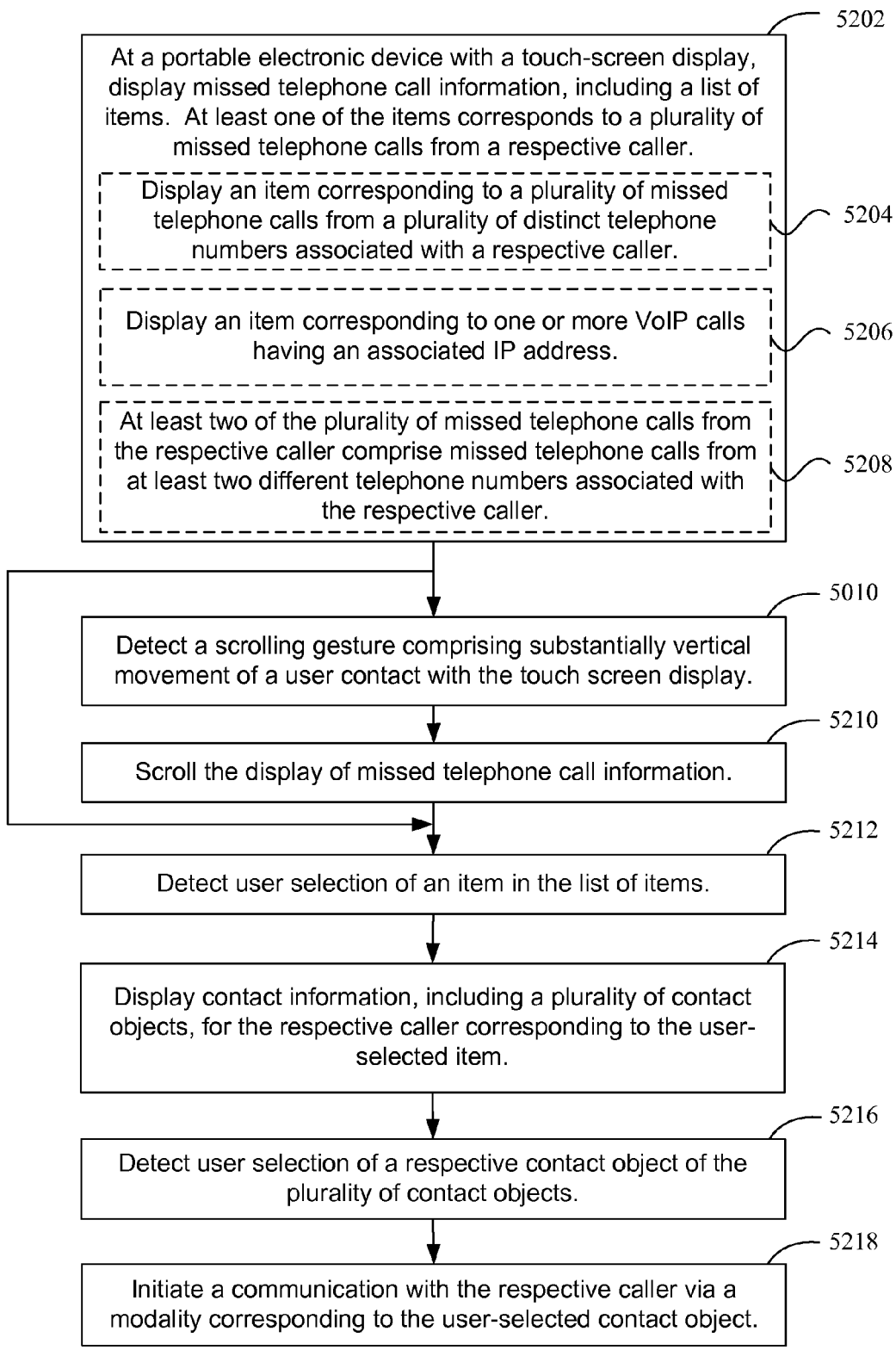
FIG. 25 is a flow diagram illustrating a process for handling missed telephone calls at a portable electronic device with a touch screen display in accordance with some embodiments.

FIG. 25 is a flow diagram illustrating a process 5200 for handling missed telephone calls at a portable electronic device with a touch screen display in accordance with some embodiments. Missed telephone call information is displayed, including a list of items. At least one of the items corresponds to a plurality of missed telephone calls from a respective caller (5202). In some embodiments, a respective item in the list of items corresponds to a plurality of missed telephone calls from a plurality of distinct telephone numbers associated with the respective caller (5204). In some embodiments, at least two of the plurality of missed telephone calls from the respective caller comprise missed telephone calls from at least two different telephone numbers associated with the respective caller (5208). In some embodiments, a respective item in the list of items corresponds to one or more VoIP calls having an associated IP address (5206). Displaying a single item in the list of items that corresponds to a plurality of missed telephone calls condenses the missed call list and makes it easy for a user to determine which people are trying to contact the user and how many times they have tried to contact the user.

In some embodiments, a scrolling gesture comprising substantially vertical movement of a user contact with the touch screen display is detected (5010). In response, the displayed list of items is scrolled (5210). The scrolling gesture provides a simple way for the user to rapidly scan the list of items.

Upon detecting user selection of an item in the list of items (5212), contact information is displayed for a respective caller corresponding to the user-selected item. The contact information includes a plurality of contact objects (5214). In some embodiments, examples of contact objects include the examples described above with regard to operation 5016 in FIG. 23. Upon detecting user selection of a respective contact object of the plurality of contact objects (5216), a communication is initiated with the respective caller via a modality corresponding to the user-selected contact object (5218). In some embodiments, examples of modalities include the examples described above with regard to operation 5020 in FIG. 23. Providing a plurality of contact objects makes it easy for a user to choose and initiate communications with the missed caller by any available communication modality, rather than being limited to calling back the missed caller at the phone number associated with the missed call. For example, rather than calling Bruce Walker back at his work number, a user can just as easily call Bruce at home or send Bruce an email message, While the missed telephone call handling process 5200 described above includes a number of operations that appear to occur in a specific order, it should be apparent that the process 5200 can include more or fewer operations, which can be executed serially or in parallel (e.g., using parallel processors or a multi-threading environment), an order of two or more operations may be changed and/or two or more operations may be combined into a single operation. For example, operations 5010 and 5012 may be omitted if the item to be selected in operation 5014 is displayed initially in operation 5002. In another example, all operations except operation 5202 may be omitted.

Figure 26:
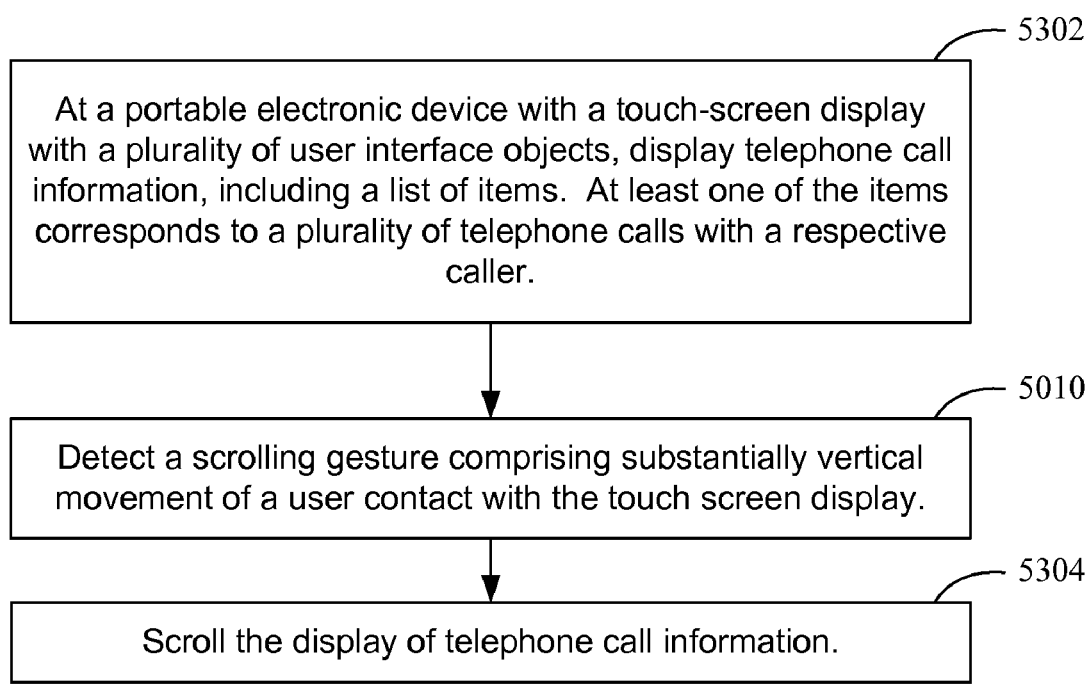
FIG. 26 is a flow diagram illustrating a process for handling prior telephone call information at a portable electronic device with a touch screen display with a plurality of user interface objects in accordance with some embodiments.

FIG. 26 is a flow diagram illustrating a process 5300 for handling telephone call information at a portable electronic device with a touch screen display with a plurality of user interface objects in accordance with some embodiments. Telephone call information is displayed, including a list of items. At least one of the items corresponds to a plurality of telephone calls with a respective caller (5302). For example, UI 2800A (FIG. 12A) displays telephone call information for all recent calls. The entry for Kim Brook 2802 corresponds to three telephone calls, as indicated by number 2804. Displaying a single item in the list of items that corresponds to a plurality of missed telephone calls condenses the missed call list and makes it easy for a user to determine which people are trying to contact the user and how many times they have tried to contact the user. A scrolling gesture comprising substantially vertical movement of a user contact with the touch screen display is detected (5010). For example, vertical gesture 2814 is detected. In response, the display of telephone call information is scrolled (5304). The scrolling gesture provides a simple way for the user to rapidly scan the list of items.

Figure 27:
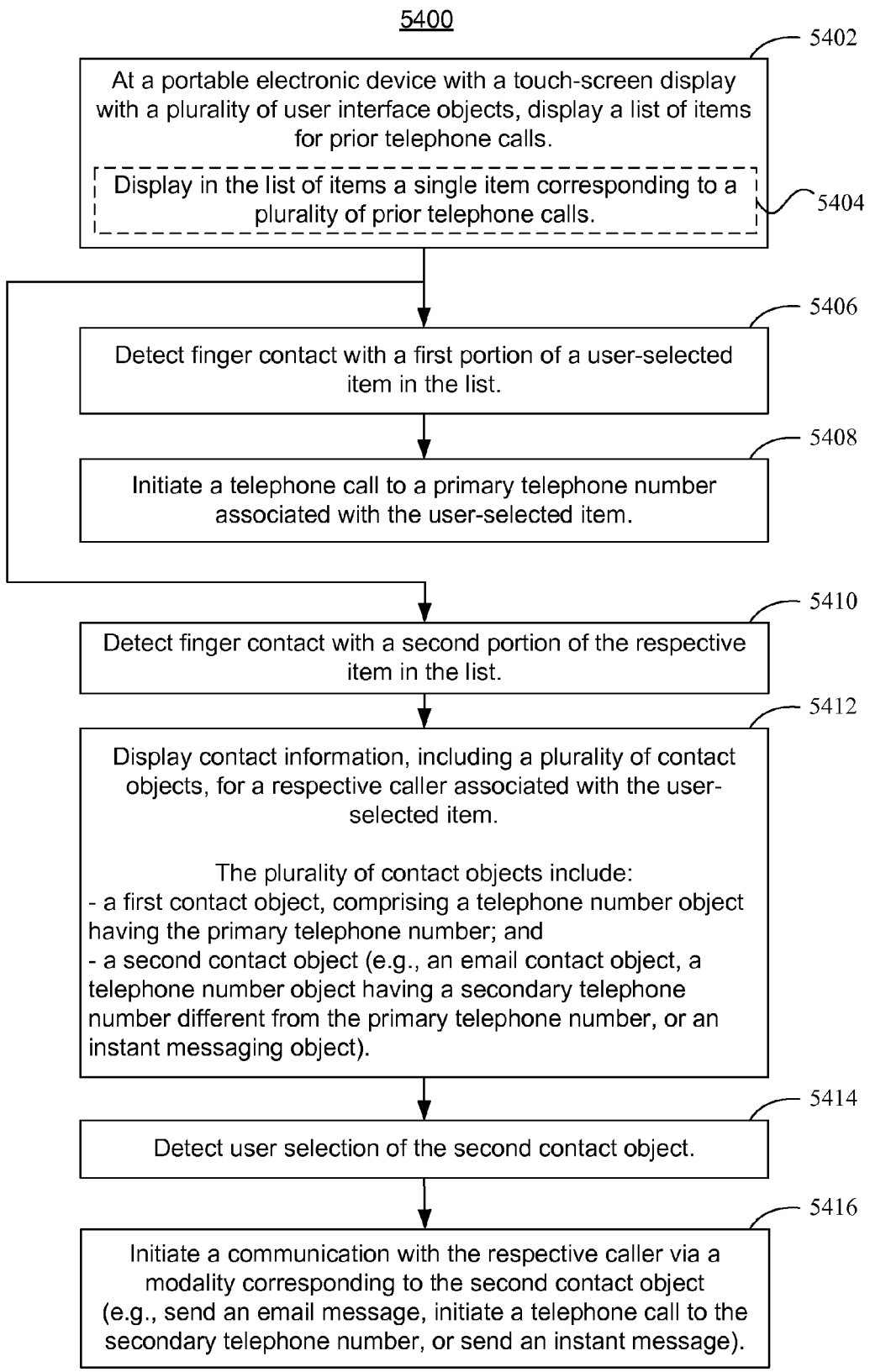
FIG. 27 is a flow diagram illustrating a process for handling prior telephone calls at a portable electronic device with a touch screen display with a plurality of user interface objects in accordance with some embodiments.

While the prior telephone call handling process 5300 described above includes a number of operations that appear to occur in a specific order, it should be apparent that the process 5300 can include more or fewer operations, which can be executed serially or in parallel (e.g., using parallel processors or a multi-threading environment), an order of two or more operations may be changed and/or two or more operations may be combined into a single operation FIG. 27 is a flow diagram illustrating a process 5400 for handling prior telephone calls at a portable electronic device with a touch screen display with a plurality of user interface objects in accordance with some embodiments. A list of items for prior telephone calls is displayed (5402). In some embodiments, a single item in the list of items corresponds to a plurality of prior telephone calls (5404). For example, UI 2800A (FIG. 12A) displays telephone call information for all recent calls. The entry for Kim Brook 2802 corresponds to three telephone calls, as indicated by number 2804. Displaying a single item in the list of items that corresponds to a plurality of missed telephone calls condenses the missed call list and makes it easy for a user to determine which people are trying to contact the user and how many times they have tried to contact the user.

Upon detecting finger contact with a first portion of a user-selected item in the list (5406), a telephone call is initiated to a primary telephone number associated with the user-selected item (5408). In some embodiments, for example, in response to a tap or other predefined gesture on a row in UI 2800A (FIG. 12A) other than on icon 2808, a return telephone call is initiated to the corresponding number for that row.

Upon detecting finger contact with a second portion of the respective item in the list (5410) (e.g., icon 2808), contact information is displayed for a respective caller associated with the user-selected item (5412). The displayed contact information includes a plurality of contact objects that include a first contact object and a second contact object. The first contact object comprises a telephone number object having the primary telephone number. In some embodiments, the second contact object is an email contact object, an instant messaging object, or a telephone number object having a secondary telephone number different from the primary telephone number.

Upon detecting user selection of the second contact object (5414), a communication is initiated with the respective caller via a modality corresponding to the second contact object (5416). In some embodiments, in which the second contact object is an email contact object, the modality corresponding to the second contact object includes sending an email message. In some embodiments, in which the second contact object is a telephone number object having a secondary telephone number different from the primary telephone number, the modality corresponding to the second contact object includes initiating a telephone call to the secondary telephone number. In some embodiments, in which the second contact object is an instant messaging object, the modality corresponding to the second contact object includes sending an instant message. In some embodiments, examples of contact objects and corresponding modalities correspond to the examples provided with regard to operations 5016 and 5020 in FIG. 23. In some embodiments, detecting contacts with either the first portion or second portion of an item makes it easy for a user to either: (a) immediately call back the phone number associated with the missed call—without having to view the contact information associated with the missed call (e.g., FIG. 12C), or (b) view the contact information to choose from a plurality of communication modalities associated with the missed caller.

While the prior telephone call handling process 5400 described above includes a number of operations that appear to occur in a specific order, it should be apparent that the process 5400 can include more or fewer operations, which can be executed serially or in parallel (e.g., using parallel processors or a multi-threading environment), an order of two or more operations may be changed and/or two or more operations may be combined into a single operation.

FIG. 28 is a flow diagram illustrating a process 5500 for handling incoming telephone calls at a portable electronic device with a touch screen display with a plurality of user interface objects in accordance with some embodiments. An incoming telephone call from a caller is detected (5502). In some embodiments, contact information corresponding to the caller is identified (5504). A text identifier of the caller (e.g., the caller's name 3102, FIG. 15A) and an image associated with the caller (e.g., graphic 3104) are displayed (5506). In some embodiments, the text identifier and the image are from the identified contact information. A call answer icon (e.g., icon 3108, FIG. 15A) is displayed, which if selected by a user of the device, answers the incoming telephone call. A call decline icon (e.g., icon 3106) is displayed, which if selected by the user of the device, declines the incoming call. This process 5500 provides call information and explains the call options available to a user in a simple, clear manner.

While the incoming telephone call handling process 5500 described above includes a number of operations that appear to occur in a specific order, it should be apparent that the process 5500 can include more or fewer operations, which can be executed serially or in parallel (e.g., using parallel processors or a multi-threading environment), an order of two or more operations may be changed and/or two or more operations may be combined into a single operation.

FIG. 29 is a flow diagram illustrating a process 5600 for handling established telephone calls at a portable electronic device with a touch screen display with a plurality of user interface objects in accordance with some embodiments. Upon detecting that a telephone call between a user of the device and another entity has been established (5602), the following items are displayed (5604): a mute icon for muting a microphone of the device; a keypad icon for displaying a keypad; a speaker icon for activating a speaker mode of the device; a conference call icon or add call icon for forming a multi-party telephone call between the user, the other entity and at least one additional entity; a call hold icon for suspending the telephone call; a contacts icon for displaying a contacts list; and an end call icon for ending the telephone call. Examples of these items are illustrated in UI 3000B, FIG. 14B, and UI 3000D, FIG. 14D. In some embodiments, not all of the listed items are displayed. For example, in UI 3000B (FIG. 14B), the contacts icon and the keypad icon are not displayed. This process 5600 provides call information and explains the call options available to a user in a simple, clear manner.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a portable electronic device with a touch screen display:
displaying a list of interactive items comprising missed telephone calls, wherein each item in the list of interactive items includes a first interactive displayed portion and a second interactive displayed portion distinct from the first interactive displayed portion;
immediately in response to detecting a finger gesture on the first interactive displayed portion of a respective user selected item in the list, initiating a return telephone call to a return telephone number associated with the respective user selected item;
immediately in response to detecting a finger gesture on the second interactive displayed portion of the respective user selected item in the list, completely substituting display of the list of interactive items with display of contact information for a respective caller corresponding to the respective user selected item, the displayed contact information including a plurality of contact objects; the plurality of contact objects including:
a first contact object comprising a telephone number object having the return telephone number, and
a second contact object associated with a non-telephonic communication modality for contacting the respective caller; and
immediately in response to detecting user selection of the second contact object, initiating a communication with the respective caller via the non-telephonic communication modality corresponding to the second contact object.

2. The method of claim 1, wherein the second contact object is an email contact object, and wherein initiating the communication via the non-telephonic communication modality corresponding to the second contact object includes preparing an email message with the selected email address associated with the second contact object, ready for text input by the user.

3. The method of claim 1, wherein the second contact object is an instant messaging object, and wherein initiating the communication via the non-telephonic communication modality corresponding to the second contact object includes preparing an instant message to the number associated with the second contact object, ready for text input by the user.

4. The method of claim 1, wherein a single item in the list of interactive items corresponds to a plurality of consecutive missed telephone calls.

5. The method of claim 1, including, while displaying the list of interactive items comprising missed telephone calls, displaying, within a respective single item in the list, a number indicating a plurality of consecutive missed telephone calls.

6. The method of claim 1, wherein a single item in the list of interactive items corresponds to a plurality of missed telephone calls from a plurality of distinct telephone numbers associated with a respective caller.

7. The method of claim 1, wherein the second interactive displayed portion of the respective user selected item is identified by an icon displayed within the respective user selected item.

8. A non-transitory computer readable storage medium storing one or more programs, the one or more programs comprising instructions, which when executed by a portable electronic device with a touch screen display, cause the device to:
- display a list of interactive items for missed telephone calls, wherein each item in the list of interactive items includes a first interactive displayed portion and a second interactive displayed portion distinct from the first interactive displayed portion;
- immediately in response to detecting a finger gesture on the first interactive displayed portion of a respective user selected item in the list, initiate a return telephone call to a return telephone number associated with the respective user selected item;
- immediately in response to detecting a finger gesture on the second interactive displayed portion of the respective user selected item in the list, completely substituting display of the list of interactive items with display of contact information for a respective caller associated with the respective user selected item, the displayed contact information including a plurality of contact objects; the plurality of contact objects including:
  - a first contact object comprising a telephone number object having the return telephone number, and
  - a second contact object associated with a non-telephonic communication modality for contacting the respective caller; and
- immediately in response to detecting user selection of the second contact object, initiate a communication with the respective caller via the non-telephonic communication modality corresponding to the second contact object.

9. The computer readable storage medium of claim 8, including instructions that cause the device to, while displaying the list of interactive items comprising missed telephone calls, display, within a respective single item in the list, a number indicating a plurality of consecutive missed telephone calls.

10. A portable electronic device with a touch screen display, comprising:
- memory;
- one or more processors; and
- one or more programs stored in the memory and configured for execution by the one or more processors, the one or more programs including instructions for:
  - displaying a list of interactive items for missed telephone calls, wherein each item in the list of interactive items includes a first interactive displayed portion and a second interactive displayed portion distinct from the first interactive displayed portion;
  - immediately in response to detecting a finger gesture on the first interactive displayed portion of a respective user selected item in the list, initiating a return telephone call to a return telephone number associated with the respective user selected item;
  - immediately in response to detecting a finger gesture on the second interactive displayed portion of the respective user selected item in the list, completely substituting display of the list of interactive items with display of contact information for a respective caller associated with the respective user selected item, the displayed contact information including a plurality of contact objects; the plurality of contact objects including:
    - a first contact object comprising a telephone number object having the return telephone number, and
    - a second contact object associated with a non-telephonic communication modality for contacting the respective caller; and
  - immediately in response to detecting user selection of the second contact object, initiating a communication with the respective caller via the non-telephonic communication modality corresponding to the second contact object.

11. The device of claim 10, including instructions for, while displaying the list of interactive items comprising missed telephone calls, displaying, within a respective single item in the list, a number indicating a plurality of consecutive missed telephone calls.

12. A method performed at a portable electronic device with a touch screen display, comprising:
- displaying a list on the touch screen display, the list comprising a first plurality of interactive displayed items associated with telephone calls,
  - wherein at least one interactive displayed item in the list is associated with a missed telephone call,
  - wherein at least one interactive displayed item associated with a missed telephone call is also associated with contact information stored in the portable electronic device, and
  - wherein each interactive displayed item associated with a missed telephone call and also associated with contact information includes a first interactive displayed portion and a second interactive displayed portion, the second interactive displayed portion being distinct from the first interactive displayed portion;
- wherein for each interactive displayed item associated with a missed telephone call and contact information, the portable electronic device is configured to:
  - receive a finger tap input in the first interactive displayed portion of the interactive displayed item, and immediately in response to that input to initiate a return telephone call to a telephone number associated with that interactive displayed item, and
  - receive a finger tap input in the second interactive displayed portion of the interactive displayed item, and immediately in response to that input to completely substituting display of the list with display of contact information for a caller corresponding to the that interactive displayed item, the displayed contact information including a plurality of contact objects, the plurality of contact objects including:
    - a first contact object comprising a telephone number associated with the caller, and
    - a second contact object associated with a non-telephonic communication modality for contacting the caller; and
- detecting a user tap input with the second contact object, and immediately in response to that input, initiating a communication with the corresponding caller through the non-telephonic communication modality corresponding to the second contact object.

13. The method of claim 12, wherein the second interactive displayed portion of each interactive displayed item is identified by an icon displayed within the interactive displayed item.

14. A portable electronic device, comprising:
one or more processors;
a touch screen display;
a computer readable storage medium containing instructions that when executed by the one or more processors perform operations in the portable electronic device, the instructions comprising:
instructions to display a list on the touch screen display, the list comprising a plurality of interactive displayed items associated with telephone calls,
wherein at least one interactive displayed item in the list is associated with a missed telephone call,
wherein at least one interactive displayed item associated with a missed telephone call is also associated with contact information stored in the portable electronic device, and
wherein each interactive displayed item associated with a missed telephone call and also associated with contact information includes a first interactive displayed portion and a second interactive displayed portion, the second interactive displayed portion being distinct from the first interactive displayed portion;
instructions to receive a finger tap input in the first interactive displayed portion of an interactive displayed item associated with both a missed call and contact information, and immediately in response to that input, to initiate a telephone call to a telephone number associated with that interactive displayed item;
instructions to receive a finger tap input in the second interactive displayed portion of an interactive displayed item associated with both a missed call and contact information, and immediately in response to that input to completely substituting display of the list with display of contact information for a caller corresponding to that interactive displayed item, the displayed contact information including simultaneous display of a plurality of contact objects, the plurality of contact objects including:
a first contact object associated with initiating a telephone call to the caller,
a second contact object associated with sending an email to the caller, and
a third contact object associated with sending an instant message to the caller; and
instructions to detect a finger tap input at any one contact object of the plurality of contact objects, and immediately in response to that input, to initiate a communication to the corresponding caller of the type corresponding to the contact object at which the input was detected.

15. The device of claim 14, wherein the second interactive displayed portion of each interactive displayed item is identified by an icon displayed within the item.

16. A method performed at a portable electronic device with a touch screen display, comprising:
displaying a list of items, the list comprising a plurality of interactive displayed items associated with telephone calls,
wherein at least one interactive displayed item in the list is associated with a missed telephone call and is also associated with contact information stored in the portable electronic device, and
wherein each such interactive displayed item associated with both a missed telephone call and contact information comprises at least a first interactive displayed portion and a second interactive displayed portion, the second interactive displayed portion being distinct from the first interactive displayed portion;
detecting a finger tap input at a first user selected interactive displayed item associated with both a missed telephone call and contact information, wherein the finger tap input is with the first interactive displayed portion of the selected interactive displayed item, and immediately in response to that input initiating a telephone call to a telephone number associated with the first user selected interactive displayed item;
detecting a finger tap input at a second user selected interactive displayed item associated with both a missed telephone call and contact information, where the finger tap input is with the second interactive displayed portion of the selected interactive displayed item, and immediately in response to that input completely substituting display of the list of items with display of contact information for a caller corresponding to the second user selected interactive displayed item, the displayed contact information including a plurality of contact objects comprising:
a first contact object associated with a telephone number for contacting the caller, and
a second contact object associated with a non-telephonic communication modality for contacting the caller; and
immediately in response to detecting user selection of the second contact object, initiating a communication with the corresponding caller through the non-telephonic communication modality corresponding to the second contact object.

17. The method of claim 16, wherein the second interactive displayed portion of each interactive displayed item is identified by an icon displayed within the interactive displayed item.

18. A non-transitory computer readable storage medium storing one or more programs, the one or more programs comprising instructions, which when executed by a portable electronic device with a touch screen display, cause the device to:
display a list on the touch screen display, the list comprising a first plurality of interactive displayed items associated with telephone calls,
wherein at least one interactive displayed item in the list is associated with a missed telephone call,
wherein at least one interactive displayed item associated with a missed telephone call is also associated with contact information stored in the portable electronic device, and
wherein each interactive displayed item associated with a missed telephone call and also associated with contact information includes a first interactive displayed portion and a second interactive displayed portion, the second interactive displayed portion being distinct from the first interactive displayed portion;
wherein for each interactive displayed item associated with a missed telephone call and contact information, the portable electronic device is configured to:
receive a finger tap input in the first interactive displayed portion of the interactive displayed item, and immediately in response to that input to initiate a return telephone call to a telephone number associated with that interactive displayed item, and
receive a finger tap input in the second interactive displayed portion of the interactive displayed item, and immediately in response to that input to completely substituting display of the list with display of display of contact information for a caller corresponding to that interactive displayed item, the displayed contact information including a plurality of contact objects, the plurality of contact objects including:
  a first contact object comprising a telephone number associated with the caller, and
  a second contact object associated with a non-telephonic communication modality for contacting the caller; and
detect a user tap input with the second contact object, and immediately in response to that input, initiate a communication with the corresponding caller through the non-telephonic communication modality corresponding to the second contact object.

19. A portable electronic device with a touch screen display, comprising:
memory;
one or more processors; and
one or more programs stored in the memory and configured for execution by the one or more processors, the one or more programs including instructions for:
displaying a list of items, the list comprising a plurality of interactive displayed items associated with telephone calls,
  wherein at least one interactive displayed item in the list is associated with a missed telephone call and is also associated with contact information stored in the portable electronic device, and
  wherein each such interactive displayed item associated with both a missed telephone call and contact information comprises at least a first interactive displayed portion and a second interactive displayed portion, the second interactive displayed portion being distinct from the first interactive displayed portion;
detecting a finger tap input at a first user selected interactive displayed item associated with both a missed telephone call and contact information, wherein the finger tap input is with the first interactive displayed portion of the selected interactive displayed item, and immediately in response to that input initiating a telephone call to a telephone number associated with the first user selected interactive displayed item;
detecting a finger tap input at a second user selected interactive displayed item associated with both a missed telephone call and contact information, where the finger tap input is with the second interactive displayed portion of the selected interactive displayed item, and immediately in response to that input completely substituting display of the list of interactive items with display of contact information for a caller corresponding to the second user selected interactive displayed item, the displayed contact information including a plurality of contact objects comprising:
  a first contact object associated with a telephone number for contacting the caller, and
  a second contact object associated with a non-telephonic communication modality for contacting the caller; and
  immediately in response to detecting user selection of the second contact object, initiating a communication with the corresponding caller through the non-telephonic communication modality corresponding to the second contact object.

20. The device of claim 19, wherein the second interactive displayed portion of each interactive displayed item is identified by an icon displayed within the interactive displayed item.

21. A non-transitory computer readable storage medium storing one or more programs, the one or more programs comprising instructions, which when executed by a portable electronic device with a touch screen display, cause the device to:
display a list of items, the list comprising a plurality of interactive displayed items associated with telephone calls,
  wherein at least one interactive displayed item in the list is associated with a missed telephone call and is also associated with contact information stored in the portable electronic device, and
  wherein each such interactive displayed item associated with both a missed telephone call and contact information comprises at least a first interactive displayed portion and a second interactive displayed portion, the second interactive displayed portion being distinct from the first interactive displayed portion;
detect a finger tap input at a first user selected interactive displayed item associated with both a missed telephone call and contact information, wherein the finger tap input is with the first interactive displayed portion of the selected interactive displayed item, and immediately in response to that input initiate a telephone call to a telephone number associated with the first user selected interactive displayed item;
detect a finger tap input at a second user selected interactive displayed item associated with both a missed telephone call and contact information, where the finger tap input is with the second interactive displayed portion of the selected interactive displayed item, and immediately in response to that input completely substitute display of the list of items with display of contact information for a caller corresponding to the second user selected interactive displayed item, the displayed contact information including a plurality of contact objects comprising:
  a first contact object associated with a telephone number for contacting the caller, and
  a second contact object associated with a non-telephonic communication modality for contacting the caller; and
immediately in response to detecting user selection of the second contact object, initiate a communication with the corresponding caller through the non-telephonic communication modality corresponding to the second contact object.

22. The computer readable storage medium of claim 21, wherein the second interactive displayed portion of each interactive displayed item is identified by an icon displayed within the interactive displayed item.

* * * * *

(12) EX PARTE REEXAMINATION CERTIFICATE (10277th)
United States Patent
Forstall et al.

(10) Number: US 8,014,760 C1
(45) Certificate Issued: Aug. 28, 2014

(54) MISSED TELEPHONE CALL MANAGEMENT FOR A PORTABLE MULTIFUNCTION DEVICE

(75) Inventors: Scott Forstall, Mountain View, CA (US); Greg Christie, San Jose, CA (US); Scott Herz, Santa Clara, CA (US); Imran Chaudhri, San Francisco, CA (US); Michael Matas, Palo Alto, CA (US); Marcel Van Os, San Francisco, CA (US); Stephen Q. Lemay, San Francisco, CA (US)

(73) Assignee: Apple Inc., Cupertino, CA (US)

Reexamination Request:
No. 90/012,893, Jun. 14, 2013

Reexamination Certificate for:
Patent No.: 8,014,760
Issued: Sep. 6, 2011
Appl. No.: 11/769,694
Filed: Jun. 27, 2007

Related U.S. Application Data

(60) Provisional application No. 60/879,469, filed on Jan. 8, 2007, provisional application No. 60/879,253, filed on Jan. 7, 2007, provisional application No. 60/883,782, filed on Jan. 6, 2007, provisional application No. 60/824,769, filed on Sep. 6, 2006.

(51) Int. Cl.
*H04M 1/725* (2006.01)
*H04M 3/42* (2006.01)
*H04M 3/00* (2006.01)
*H04M 1/56* (2006.01)

(52) U.S. Cl.
USPC ............. 455/412.2; 379/142.01; 379/201.01; 379/418

(58) Field of Classification Search
None
See application file for complete search history.

(56) References Cited

To view the complete listing of prior art documents cited during the proceeding for Reexamination Control Number 90/012,893, please refer to the USPTO's public Patent Application Information Retrieval (PAIR) system under the Display References tab.

*Primary Examiner* — Zoila Cabrera

(57) ABSTRACT

In one aspect of the invention, a computer-implemented method is disclosed for use in conjunction with a portable electronic device with a touch screen display. A list of items comprising missed telephone calls is displayed. Upon detecting user selection of an item in the list, contact information is displayed for a respective caller corresponding to the user selected item. The displayed contact information includes a plurality of contact objects that include a first contact object, comprising a telephone number object having a first telephone number associated with the missed telephone call, and a second contact object. Upon detecting user selection of the second contact object, a communication with the respective caller is initiated via a modality corresponding to the second contact object.

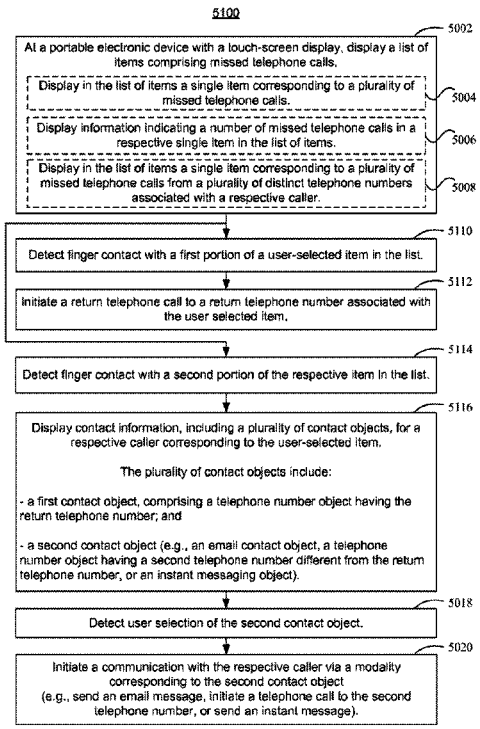

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-11 is confirmed.

Claims 12-22 are cancelled.

\* \* \* \* \*